US011895048B2

(12) United States Patent
Liu et al.

(10) Patent No.: US 11,895,048 B2
(45) Date of Patent: Feb. 6, 2024

(54) SOUNDING REFERENCE SIGNAL ANTENNA SWITCHING IN SCHEDULED ENTITIES HAVING AT LEAST FOUR ANTENNAS

(71) Applicant: QUALCOMM Incorporated, San Diego, CA (US)

(72) Inventors: Le Liu, Fremont, CA (US); Alberto Rico Alvarino, San Diego, CA (US); Peter Gaal, San Diego, CA (US); Alexandros Manolakos, Escondido, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/188,565

(22) Filed: Mar. 1, 2021

(65) Prior Publication Data

US 2021/0281373 A1 Sep. 9, 2021

Related U.S. Application Data

(63) Continuation of application No. 16/270,438, filed on Feb. 7, 2019, now Pat. No. 10,938,529.
(Continued)

(51) Int. Cl.
*H04L 5/00* (2006.01)
*H04B 7/0413* (2017.01)
(Continued)

(52) U.S. Cl.
CPC ......... *H04L 5/0048* (2013.01); *H04B 7/0413* (2013.01); *H04B 7/0456* (2013.01);
(Continued)

(58) Field of Classification Search
CPC . H04L 5/0048; H04L 5/0051; H04L 25/0224; H04L 5/0007; H04L 5/0023;
(Continued)

(56) References Cited

U.S. PATENT DOCUMENTS 8,938,247 B2 1/2015 Gorokhov et al.
2011/0200143 A1 8/2011 Koo et al.
(Continued)

FOREIGN PATENT DOCUMENTS

CN 102356675 A 2/2012
CN 104639223 A 5/2015
(Continued)

OTHER PUBLICATIONS

Taiwan Search Report—TW108104414—TIPO—dated Feb. 25, 2022.
(Continued)

*Primary Examiner* — Eric Myers
(74) *Attorney, Agent, or Firm* — Loza & Loza LLP

(57) ABSTRACT

Aspects directed towards sounding reference signal (SRS) antenna switching are disclosed. In one example, an SRS configuration is received from a network in which at least four antennas of a scheduled entity are configured based on the SRS configuration. Here, the SRS configuration configures at least one antenna to simultaneously support SRS antenna switching and an uplink (UL) multiple-input multiple-output (MIMO) communication. An SRS communication is then transmitted according to the SRS configuration. In another example, a transmission capability reporting is received from a scheduled entity comprising at least four antennas. A determination is then made of whether the scheduled entity may simultaneously support SRS antenna switching and an UL MIMO communication. An SRS configuration is then generated for the scheduled entity
(Continued)

based on the determination in which a default SRS configuration configures at least one antenna to simultaneously support the SRS antenna switching and the UL MIMO communication.

20 Claims, 39 Drawing Sheets

Related U.S. Application Data

(60) Provisional application No. 62/657,668, filed on Apr. 13, 2018, provisional application No. 62/641,222, filed on Mar. 9, 2018, provisional application No. 62/634,707, filed on Feb. 23, 2018, provisional application No. 62/710,595, filed on Feb. 16, 2018, provisional application No. 62/630,737, filed on Feb. 14, 2018.

(51) Int. Cl.
| | |
|---|---|
| *H04B 7/06* | (2006.01) |
| *H04B 7/0456* | (2017.01) |
| *H04L 25/02* | (2006.01) |
| *H04W 72/044* | (2023.01) |
| *H04B 7/0404* | (2017.01) |
| *H04W 72/21* | (2023.01) |

(52) U.S. Cl.
CPC ......... *H04B 7/0604* (2013.01); *H04B 7/0613* (2013.01); *H04L 5/0051* (2013.01); *H04L 25/0224* (2013.01); *H04B 7/0404* (2013.01); *H04L 5/0007* (2013.01); *H04L 5/0023* (2013.01); *H04W 72/044* (2013.01); *H04W 72/21* (2023.01)

(58) Field of Classification Search
CPC .. H04B 7/0413; H04B 7/0456; H04B 7/0604; H04B 7/0613; H04B 7/0404; H04W 72/0413; H04W 72/044
See application file for complete search history.

(56) References Cited

U.S. PATENT DOCUMENTS

| | | |
|---|---|---|
| 2012/0014349 A1 | 1/2012 | Chung et al. |
| 2019/0253214 A1 | 8/2019 | Liu et al. |
| 2020/0052853 A1 | 2/2020 | Qin et al. |

FOREIGN PATENT DOCUMENTS

| | | | |
|---|---|---|---|
| JP | 2019514268 A | 5/2019 | |
| WO | WO-2010124241 A2 | 10/2010 | eb |
| WO | 2016130398 A1 | 8/2016 | |
| WO | 2017173388 A1 | 10/2017 | |

OTHER PUBLICATIONS

International Search Report and Written Opinion—PCT/US2019/017356—ISA/EPO—dated May 20, 2019.

Qualcomm Incorporated: "Capability for SRS Antenna Switching," 3GPP Draft; R1-1807123 Capability of SRS Antenna Switching, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018, XP051442321, 3 Pages, Retrieved from the Internet: URL: http://www.3gpp.org/ftp/Meetings%5F3GPP%5FSYNC/RAN1/Docs/ [retrieved on May 20, 2018] the whole document.

Qualcomm Incorporated: "Remaining Details on SRS," 3GPP Draft; R1-1720670 SRS, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051370131, 7 Pages, Retrieved from the Internet: URL: http://www.3gpp.org/ftp/tsg%5Fran/WG1%5FRL1/TSGR1%5F91/Docs/ [retrieved on Nov. 18, 2017] section 4, section 6.

Qualcomm Incorporated: "Remaining Details on SRS", 3GPP Draft; 3GPP TSG RAN WG1 Meeting 90bis, R1-1718549, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017 (Oct. 8, 2017), 9 Pages, XP051341730, Retrieved from the Internet: URL: http://www.3gpp.org/ftp/Meetings_3GPP_SYNC/RAN1/Docs/ [retrieved on Oct. 8, 2017], p. 1-p. 5.

Qualcomm Incorporated: "SRS Antenna Switching for 1T4R and 2T4R", 3GPP Draft, 3GPP TSG-RAN WG1 Meeting #92bis,R1-1805278 SRS Antenna Switching Rev, 3rd Generation Partnership Project (3GPP), Mobile Competence Centre; 650, Route Des Lucioles; F-06921 Sophia-Antipolis Cedex; France, vol. RAN WG1, No. Sanya, China, Apr. 16, 2018-Apr. 20, 2018, Apr. 15, 2018, XP051427507, 19 pages, Retrieved from the Internet: URL: http://www.3gpp.org/ftp/Meetings%5F3GPP%5FSYNC/RAN1/Docs/ [retrieved on Apr. 15, 2018] the whole document, Section 2, Section 4.

Huawei., et al., "Correction on SRS Antenna Switching in 38.214", R1-1800906, 3GPP TSG-RAN WG1 Ad Hoc Meeting, [Draft] Change Request (38.214, Current version: 15.0.0), Vancouver, Canada, Jan. 22-26, 2018, Jan. 12, 2018, 2 Pages.

Huawei, et al., "On SRS Antenna Switching", R1-1720767, 3GPP TSG RAN WG1 Meeting 91, Reno, USA, Nov. 27-Dec. 1, 2017, Nov. 18, 2017, 3 Pages.

Qualcomm Incorporated: "SRS Antenna Switching for 1T4R and 2T4R", R1-1802305, 3GPP TSG RAN WG1 Meeting #92, Athens, Greece, Feb. 26-Mar. 2, 2018, Feb. 17, 2018, pp. 1-5.

Qualcomm Incorporated: "Support of Multiple Antennas for SRS Switching", 3GPP TSG RAN WG1 Meeting #86bis, R1-1609986, Lisbon, Portugal Oct. 10-14, 2016, pp. 1-3, Oct. 1, 2016.

FIG. 9

| K=4 | start | | | |
|---|---|---|---|---|
| n_srs | 0 | 1 | 2 | 3 |
| 0 | 0 | | | |
| 1 | | | 1 | |
| 2 | | 2 | | |
| 3 | | | | 3 |
| 4 | 1 | | | |
| 5 | | | 2 | |
| 6 | | 3 | | |
| 7 | | | | 0 |
| 8 | 2 | | | |
| 9 | | | 3 | |
| 10 | | 0 | | |
| 11 | | | | 1 |
| 12 | 3 | | | |
| 13 | | | 0 | |
| 14 | | 1 | | |
| 15 | | | | 2 |

| K=4 | start | | | | | | |
|---|---|---|---|---|---|---|---|
| n_srs | 0 | | 1 | | 2 | | 3 |
| 0 | pair0 | | | | | | |
| 1 | | | | | pair1 | | |
| 2 | | | pair0 | | | | |
| 3 | | | | | | | pair1 |
| 4 | pair1 | | | | | | |
| 5 | | | | | pair0 | | |
| 6 | | | pair1 | | | | |
| 7 | | | | | | | pair0 |

| K=8 n_srs | f0 | f1 | f2 | f3 | f4 | f5 start | f6 | f7 |
|---|---|---|---|---|---|---|---|---|
| 0 | | | | | | 0 | | |
| 1 | | 1 | | | | | | |
| 2 | | | | | | | | 2 |
| 3 | | | | 3 | | | | |
| 4 | | | | | 0 | | | |
| 5 | 1 | | | | | | | |
| 6 | | | | | | | 2 | |
| 7 | | | 3 | | | | | |
| 8 | | | | | | 1 | | |
| 9 | | 2 | | | | | | |
| 10 | | | | | | | | 3 |
| 11 | | | | 0 | | | | |
| 12 | | | | | 1 | | | |
| 13 | 2 | | | | | | | |
| 14 | | | | | | | 3 | |
| 15 | | | 0 | | | | | |
| 16 | | | | | | 2 | | |
| 17 | | 3 | | | | | | |
| 18 | | | | | | | | 0 |
| 19 | | | | 1 | | | | |
| 20 | | | | | 2 | | | |
| 21 | 3 | | | | | | | |
| 22 | | | | | | | 0 | |
| 23 | | | 1 | | | | | |
| 24 | | | | | | 3 | | |
| 25 | | 0 | | | | | | |
| 26 | | | | | | | | 1 |
| 27 | | | | 2 | | | | |
| 28 | | | | | 3 | | | |
| 29 | 0 | | | | | | | |
| 30 | | | | | | | 1 | |
| 31 | | | 2 | | | | | |

| n_SRS | ant_ID | f0 | f1 | f2 | f3 | f4 | f5 | f6 | f7 |
|---|---|---|---|---|---|---|---|---|---|
| 0 | 0 |  |  |  |  |  | 0 |  |  |
| 1 | 1 |  | 1 |  |  |  |  |  |  |
| 2 | 2 |  |  |  |  |  |  |  | 2 |
| 3 | 3 |  |  |  | 3 |  |  |  |  |
| 4 | 1 |  |  |  |  | 1 |  |  |  |
| 5 | 2 | 2 |  |  |  |  |  |  |  |
| 6 | 3 |  |  |  |  |  |  | 3 |  |
| 7 | 0 |  |  | 0 |  |  |  |  |  |
| 8 | 1 |  |  |  |  |  | 1 |  |  |
| 9 | 2 |  | 2 |  |  |  |  |  |  |
| 10 | 3 |  |  |  |  |  |  |  | 3 |
| 11 | 0 |  |  |  | 0 |  |  |  |  |
| 12 | 2 |  |  |  |  | 2 |  |  |  |
| 13 | 3 | 3 |  |  |  |  |  |  |  |
| 14 | 0 |  |  |  |  |  |  | 0 |  |
| 15 | 1 |  |  | 1 |  |  |  |  |  |
| 16 | 2 |  |  |  |  |  | 2 |  |  |
| 17 | 3 |  | 3 |  |  |  |  |  |  |
| 18 | 0 |  |  |  |  |  |  |  | 0 |
| 19 | 1 |  |  |  | 1 |  |  |  |  |
| 20 | 3 |  |  |  |  | 3 |  |  |  |
| 21 | 0 | 0 |  |  |  |  |  |  |  |
| 22 | 1 |  |  |  |  |  |  | 1 |  |
| 23 | 2 |  |  | 2 |  |  |  |  |  |
| 24 | 3 |  |  |  |  |  | 3 |  |  |
| 25 | 0 |  | 0 |  |  |  |  |  |  |
| 26 | 1 |  |  |  |  |  |  |  | 1 |
| 27 | 2 |  |  |  | 2 |  |  |  |  |
| 28 | 0 |  |  |  |  | 0 |  |  |  |
| 29 | 1 | 1 |  |  |  |  |  |  |  |
| 30 | 2 |  |  |  |  |  |  | 2 |  |
| 31 | 3 |  |  |  | 3 |  |  |  |  |

| | AP pair {0,1} | | | AP pair {2,3} | | |
|---|---|---|---|---|---|---|
| Rank1 | [1,1,0,0] | [1,j,0,0] | [1,-1,0,0] | [1,-j,0,0] | [0,0,1,1] | [0,0,1,j] | [0,0,1,-1] | [0,0,1,-j] |
| Rank2 | $\begin{bmatrix}1 & 0\\0 & 1\\0 & 0\\0 & 0\end{bmatrix}$ | | [0,1,0,0] | | [0,0,1,0] | $\begin{bmatrix}0 & 0\\0 & 0\\1 & 0\\0 & 1\end{bmatrix}$ | |

Alternative signaling: instead of signaling the codebook itself (e.g. 12 possibilities for R1, 2 for R2),
* Method 1: use 2x2 codebook + 1 bit RRC signaling to indicate the AP pair is {0,1} or {2,3}
* Method 2: use 2x2 codebook + LTE two DCI CRC masks to indicate the AP pair is {0,1} or {2,3}

Codebook for 2x2 MIMO (TS 36.211, Table 5.3.3A.2-1). Equivalences for the first two entries shown in both tables

| Codebook index | Number of layers v=1 | v=2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |
| 4 | $\begin{bmatrix}1\\0\end{bmatrix}$ | — |
| 5 | $\begin{bmatrix}0\\1\end{bmatrix}$ | — |

FIG. 34

| Rank1 | [1,1,0,0] | [1,j,0,0] | [1,-1,0,0] | [1,-j,0,0] | | |
|---|---|---|---|---|---|---|
| | [1,0,1,0] | [1,0,j,0] | [1,0,-1,0] | [1,0,-j,0] | | |
| | [1,0,0,1] | [1,0,0,j] | [1,0,0,-1] | [1,0,0,-j] | | |
| | [1,0,0,0] | [0,1,0,0] | | | [0,0,1,0] | [0,0,0,1] |
| Rank2 | $\begin{bmatrix}1&0\\0&1\\0&0\\0&0\end{bmatrix}$ | $\begin{bmatrix}1&0\\0&0\\0&1\\0&0\end{bmatrix}$ | | | | |

- The codebook can be extended with all possible combinations (new entries highlighted)
  - Alternatively, 2x2 codebook + 2-bit RRC signaling to indicate which AP pair is for PUSCH

- For all possible Rx antenna combinations, we can set $A_p=3$ antenna pairs for SRS 2T4R and the UE will sound all the K subbands.

FIG. 35

Codebook examples for Opt2b

| Rank1 | [1,1,0,0] | [1,j,0,0] | [1,-j,0,0] | [1,-1,0,0] | [0,0,1,1] | [0,0,1,j] | [0,0,1,-j] | [0,0,1,-1] |
|---|---|---|---|---|---|---|---|---|
| | [1,0,1,0] | [1,0,j,0] | [1,0,-j,0] | [1,0,-1,0] | [0,1,0,1] | [0,1,0,j] | [0,1,0,-j] | [0,1,0,-1] |
| | [1,0,0,1] | [1,0,0,j] | [1,0,0,-j] | [1,0,0,-1] | [0,1,1,0] | [0,1,j,0] | [0,1,-j,0] | [0,1,-1,0] |
| | [1,0,0,0] | [0,1,0,0] | | | [0,0,1,0] | [0,0,0,1] | | |
| Rank2 | $\begin{bmatrix}1&0\\0&1\\0&0\\0&0\end{bmatrix}$ | $\begin{bmatrix}1&0\\0&0\\0&1\\0&0\end{bmatrix}$ | $\begin{bmatrix}1&0\\0&0\\0&0\\0&1\end{bmatrix}$ | | $\begin{bmatrix}0&0\\1&0\\0&1\\0&0\end{bmatrix}$ | $\begin{bmatrix}0&0\\1&0\\0&0\\0&1\end{bmatrix}$ | $\begin{bmatrix}0&0\\0&0\\1&0\\0&1\end{bmatrix}$ | |

SOUNDING REFERENCE SIGNAL ANTENNA SWITCHING IN SCHEDULED ENTITIES HAVING AT LEAST FOUR ANTENNAS

CLAIM OF PRIORITY UNDER 35 U.S.C. § 119

This application is a continuation of U.S. patent application Ser. No. 16/270,438 filed Feb. 7, 2019, and which claims priority to and the benefit of U.S. provisional patent application No. 62/630,737 filed on Feb. 14, 2018; U.S. provisional patent application No. 62/710,595 filed on Feb. 16, 2018; U.S. provisional patent application No. 62/634,707 filed on Feb. 23, 2018; U.S. provisional patent application No. 62/641,222 filed on Mar. 9, 2018; and U.S. provisional patent application No. 62/657,668 filed on Apr. 13, 2018. The content of each of these applications are incorporated herein by reference as if fully set forth below in its entirety and for all applicable purposes.

TECHNICAL FIELD

The technology discussed below relates generally to wireless communication systems, and more particularly, to sounding reference signal (SRS) antenna switching in scheduled entities having at least four antennas.

INTRODUCTION

In a wireless communication system, a sounding reference signal (SRS) may be used to characterize a wireless carrier, enabling accurate and dynamic adaptation of communication signaling based on the carrier characterization. An SRS may be configured as a wideband signal transmitted on one or more symbols on an uplink carrier by a mobile device. The SRS provides a measurement reference, which the network may use to discover information relating to the uplink carrier quality. The network can then use its measurements or calculations based on the SRS for any channel-dependent scheduling that it may send to the mobile device for scheduling uplink transmissions, such as frequency-selective resource allocation. Further, the network may use the SRS for uplink power control, time tracking, or adaptive antenna switching for transmit diversity.

In a fifth generation (5G) new radio (NR) access network, the format and configuration of an SRS may be different from that of prior access networks. In particular, because an NR access network may use different frequency bands, may have different timing and latency requirements, and may use different transmission schemes and channel structures in comparison to legacy access networks, the sounding procedure and the configuration of an SRS from those earlier standards may be less than adequate. Research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduled entity are disclosed. In one example, a sounding reference signal (SRS) configuration is received from a network in which at least four antennas of the scheduled entity are configured based on the SRS configuration. For this particular example, the SRS configuration configures at least one of the at least four antennas to simultaneously support SRS antenna switching and an uplink (UL) multiple-input multiple-output (MIMO) communication. An SRS communication is then transmitted according to the SRS configuration.

In another aspect, a scheduled entity is disclosed. The scheduled entity can include a processor communicatively coupled to each of a receiving circuitry, an antennae circuitry, and a transmitting circuitry. For this example, the receiving circuitry can be configured to receive an SRS configuration from a network. The antennae circuitry can be configured to configure at least four antennas of a scheduled entity based on the SRS configuration. Here, the SRS configuration configures at least one of the at least four antennas to simultaneously support SRS antenna switching and an UL MIMO communication. The transmitting circuitry can be configured to transmit an SRS communication according to the SRS configuration.

Various aspects directed towards a scheduling entity are also disclosed. In a particular example, a transmission capability reporting is received from a scheduled entity comprising at least four antennas. A determination is then made based on the transmission capability reporting of whether the scheduled entity may simultaneously support SRS antenna switching and an UL MIMO communication. In this example, an SRS configuration is then generated for the scheduled entity based on the determination in which a default SRS configuration comprises configuring at least one of the at least four antennas to simultaneously support the SRS antenna switching and the UL MIMO communication.

In another aspect, a scheduling entity is disclosed. A scheduling entity can include a processor communicatively coupled to each of a receiving circuitry, a determination circuitry, and a generating circuitry. For this example, the receiving circuitry can be configured to receive a transmission capability reporting from a scheduled entity that includes at least four antennas. The determination circuitry can be configured to perform a determination based on the transmission capability reporting of whether the scheduled entity may simultaneously support SRS antenna switching and an UL MIMO communication. The generating circuitry can be configured to generate an SRS configuration for the scheduled entity based on the determination in which a default SRS configuration comprises configuring at least one of the at least four antennas to simultaneously support the SRS antenna switching and the UL MIMO communication.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 illustrates an exemplary SRS 1T4R antenna switching for a UE with four antennas on four subbands.

FIG. 10 illustrates an exemplary SRS 2T4R antenna switching for a UE with two antenna pairs and frequency hopping enabled.

FIG. 14 illustrates an SRS 1T4R pattern that includes a first exemplary shift in accordance with the configuration of parameters associated with FIG. 13.

FIG. 15 illustrates an SRS 1T4R pattern that includes a second exemplary shift in accordance with the configuration of parameters associated with FIG. 13.

FIG. 17 illustrates an SRS 1T4R pattern that includes a first exemplary shift in accordance with the configuration of parameters associated with FIG. 16.

FIG. 18 illustrates an SRS 1T4R pattern that includes a second exemplary shift in accordance with the configuration of parameters associated with FIG. 16.

FIG. 25 illustrates an exemplary SRS 1T4R pattern in accordance with a fifth configuration of parameters.

FIG. 26 illustrates an SRS 1T4R pattern that includes a first exemplary shift in accordance with the configuration of parameters associated with FIG. 25.

FIG. 27 illustrates an SRS 1T4R pattern that includes a second exemplary shift in accordance with the configuration of parameters associated with FIG. 25.

FIG. 28 illustrates an exemplary SRS 1T4R pattern in accordance with a sixth configuration of parameters.

FIG. 33 illustrates an exemplary utilization of a 4×2 MIMO codebook for a predefined subset of antenna pair combinations according to some aspects of the disclosure.

FIG. 34 illustrates another exemplary utilization of a 4×2 MIMO codebook for a predefined subset of antenna pair combinations according to some aspects of the disclosure.

FIG. 35 illustrates an exemplary utilization of a 4×2 MIMO codebook for all possible antenna pair combinations according to some aspects of the disclosure.

DETAILED DESCRIPTION

Figure 1:
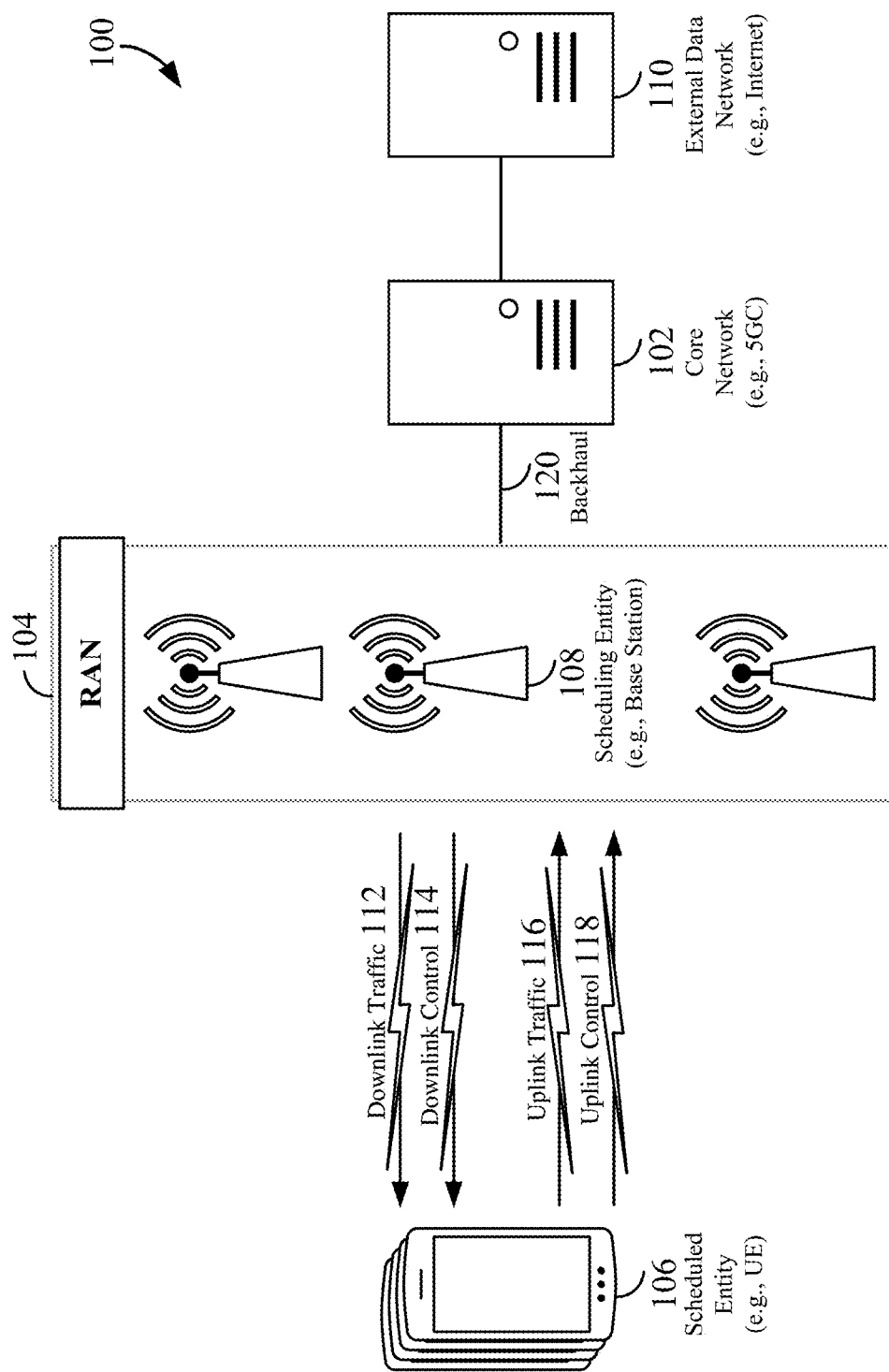
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Beamforming: directional signal transmission or reception. For a beamformed transmission, the amplitude and phase of each antenna in an array of antennas may be precoded, or controlled to create a desired (e.g., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

1. In single-user MIMO, the transmitter sends one or more streams to the same receiver, taking advantage of capacity gains associated with using multiple Tx, Rx antennas in rich scattering environments where channel variations can be tracked.
2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy.

1. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

The aspects disclosed herein are generally directed towards sounding reference signal (SRS) antenna switching in scheduled entities having at least four antennas. To this end, it should be noted that an agreement was reached in LTE Rel-15 to support SRS antenna switching for scheduled entities having a 1T4R antenna configuration (i.e., one transmit antenna and four receive antennas) or a 2T4R antenna configuration (i.e., two transmit antennas and four receive antennas). For efficiency, it would thus be desirable to design particular SRS configurations for 1T4R and 2T4R in which the SRS may be leveraged to perform additional functions besides SRS antenna switching. For instance, as disclosed herein, it is contemplated that the SRS may be used to simultaneously support SRS antenna switching and uplink (UL) multiple-input multiple-output (MIMO) communications. Exemplary configurations for SRS antenna switching and how such configurations relate to UE capability are provided, as well as details regarding an exemplary UE sounding procedure for when UEs that may or may not be enabled for frequency hopping.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
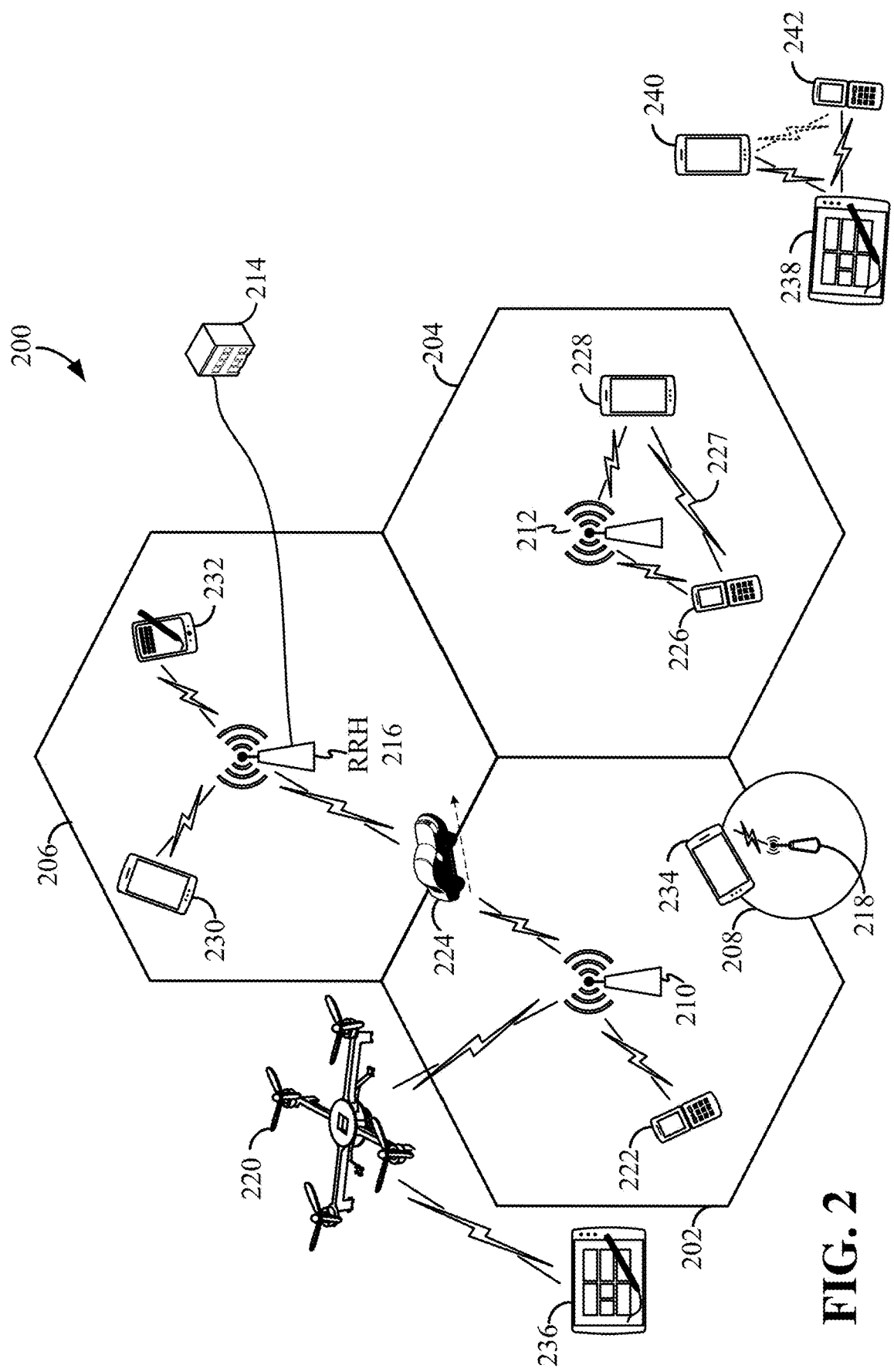
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
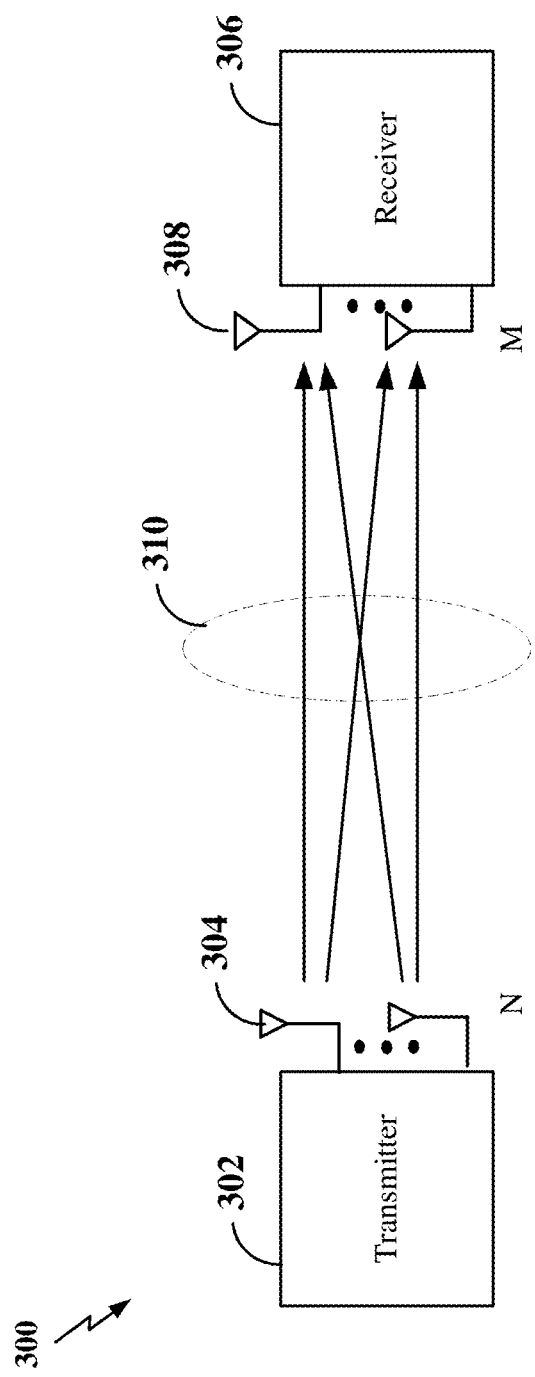
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RB s 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
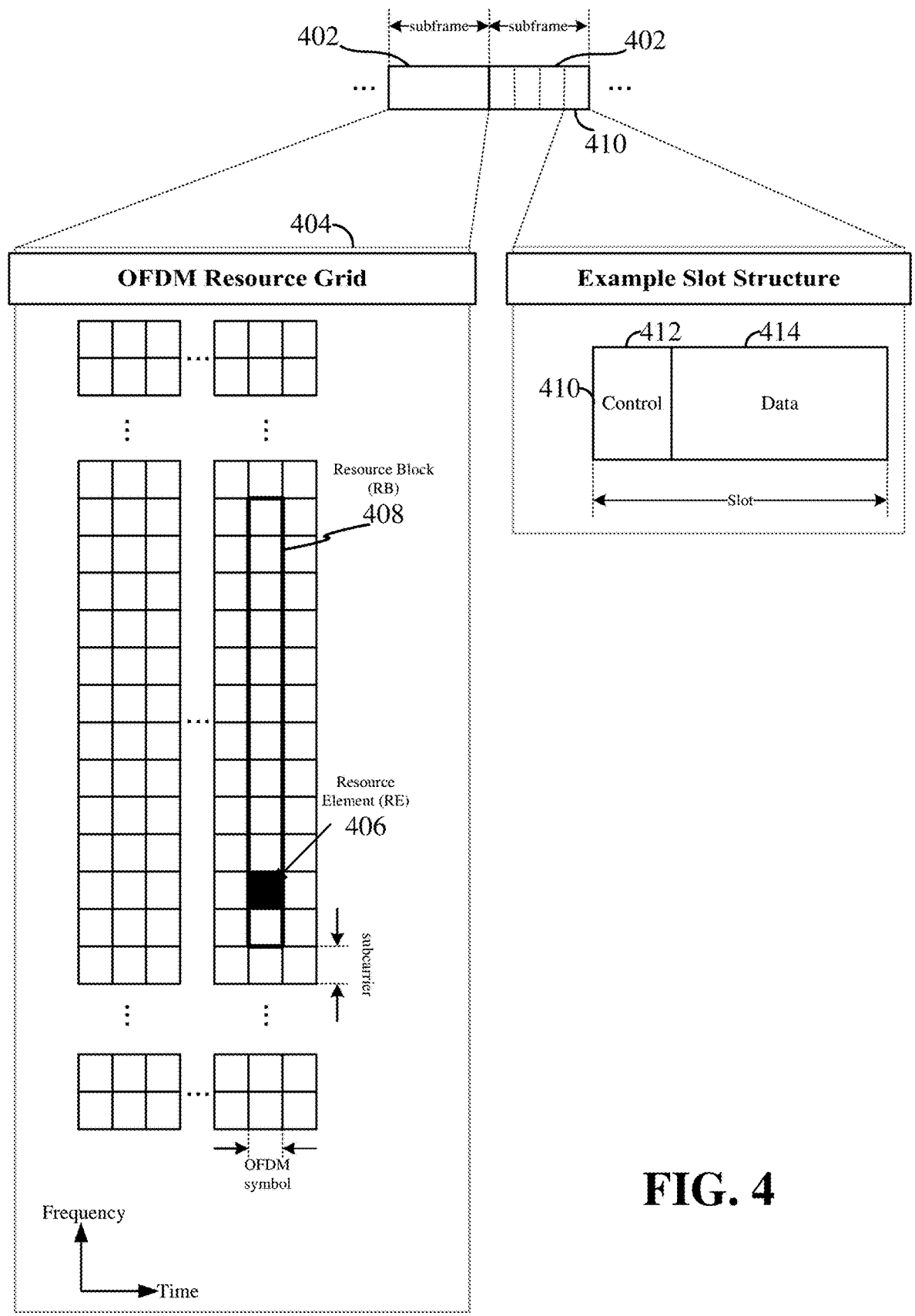
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIB s), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

EXEMPLARY IMPLEMENTATIONS

As previously stated, an agreement was reached in LTE Rel-15 to support SRS antenna switching for scheduled entities having a 1T4R antenna configuration (i.e., one transmit antenna selected from four receive antennas) or a 2T4R antenna configuration (i.e., two transmit antennas selected from four receive antennas). Here, it should be noted that, although a primary motivation for supporting SRS antenna switching in 1T4R and 2T4R was to enable DL beamforming in time division duplex (TDD) bands by exploiting channel reciprocity, SRS is also used for uplink (UL) sounding (e.g. PUSCH scheduling/beamforming). Accordingly, it would be desirable to utilize SRS in 1T4R and 2T4R for both SRS antenna switching and UL sounding (e.g. for PUSCH scheduling/beamforming). For instance, as disclosed herein, it is contemplated that the SRS may be used to simultaneously support UL antenna switching and UL multiple-input multiple-output (MIMO) communications.

Connection with UE Capability

Figure 5:
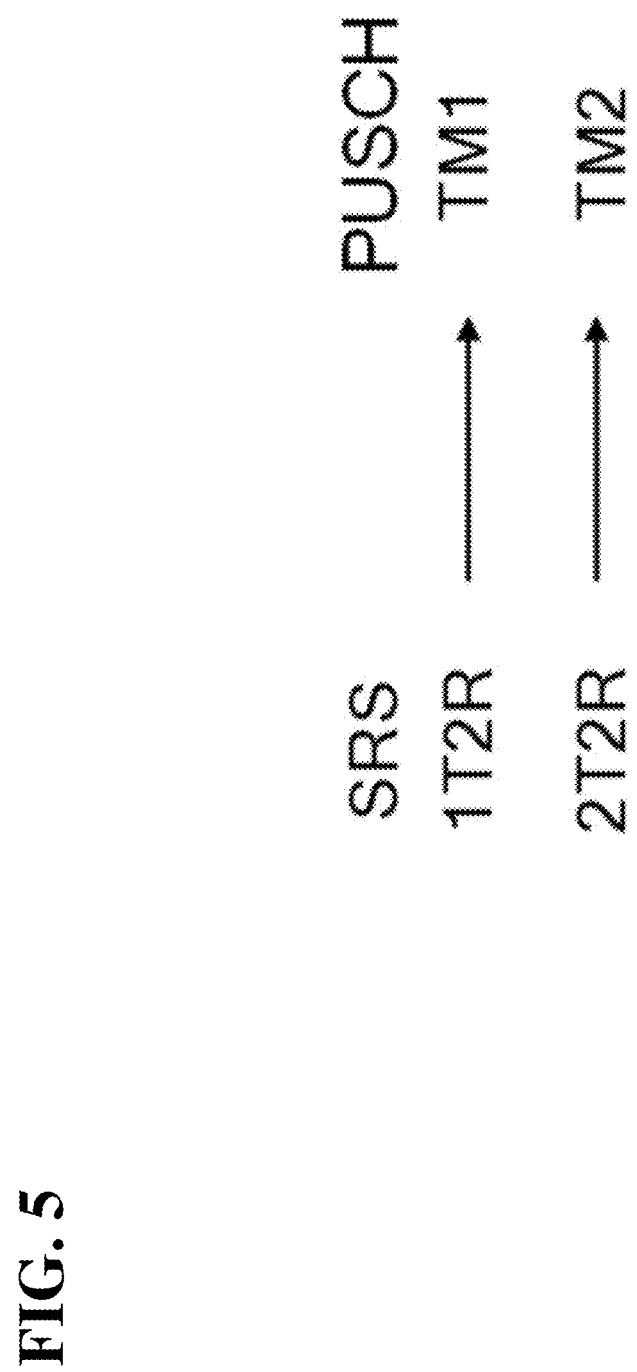
FIG. 5 illustrates an exemplary relationship between sounding reference signal (SRS) antenna switching for 1-T4R and 2T4R in accordance with current Long Term Evolution (LTE) standards.

How to configure SRS antenna switching is dependent on UE capability. Namely, it should be noted that an eNB already knows the number of the antenna ports and the number of transmit antenna chains of the UE. Beyond that, however, the UE's antenna switching capability should also be considered. For instance, since a UE with only one RF chain cannot support UL MIMO, it is contemplated that such UE could be configured to use LTE SRS antenna switching 1T2R. In LTE, however, it should be noted that a UE with more than one RF chain can only support UL MIMO for data transmission so long as the SRS is also in "MIMO mode" and not in switching mode (See e.g., the relationship illustrated in FIG. 5), whereas LTE SRS antenna switching currently only supports 1T2R when UL MIMO is disabled. Indeed, the current specification in 3GPP TS36.213 for UE transmit antenna selection states, "A UE configured with transmit antenna selection for a serving cell is not expected to be configured with more than one antenna port for any uplink physical channel or signal for any configured serving cell, or . . . ."

As disclosed herein however, it is contemplated that there may be some special cases in which the UE has two chains for UL MIMO data transmission, but has limited antenna switching capability due to the Original Equipment Manufacturer (OEM) product. For example, the first transmit chain may be fixed to a particular antenna port of the UE (e.g., port 0), whereas the second transmit chain may be switchable to another UE antenna port (e.g., ports 1-3). Without knowing such limitation, the eNB may configure the SRS antenna switching 2T4R with two SRS resources for two different antenna pairs. The UE could only select two UE antenna pairs among {0,1} {0,2} and {0,3}, not matched with the expectation of the eNB side. For this special case, the eNB could configure SRS antenna switching 1T4R instead of 2T4R to get SRS on 0-3 antenna ports, wherein the UE may use the first transmit chain or the second transmit chain 2 in different SRS instances. Therefore, a UE capable of UL MIMO could be configured by the eNB to use SRS antenna switching 1T4R, based on the reported UE antenna switching capability. Moreover, it is contemplated that a UE may be configured to provide the network with a UE capability report with respect to 1T4R and 2T4R functionality with two or three antenna pairs. For instance, with respect to 2T4R functionality with two antenna pairs, it is further contemplated that predefined pairs {0,1} and {2,3} may be used, whereas predefined pairs {0,1}, {0,2}, and {0,3} may be used for 2T4R functionality with three antenna pairs.

Figure 6:
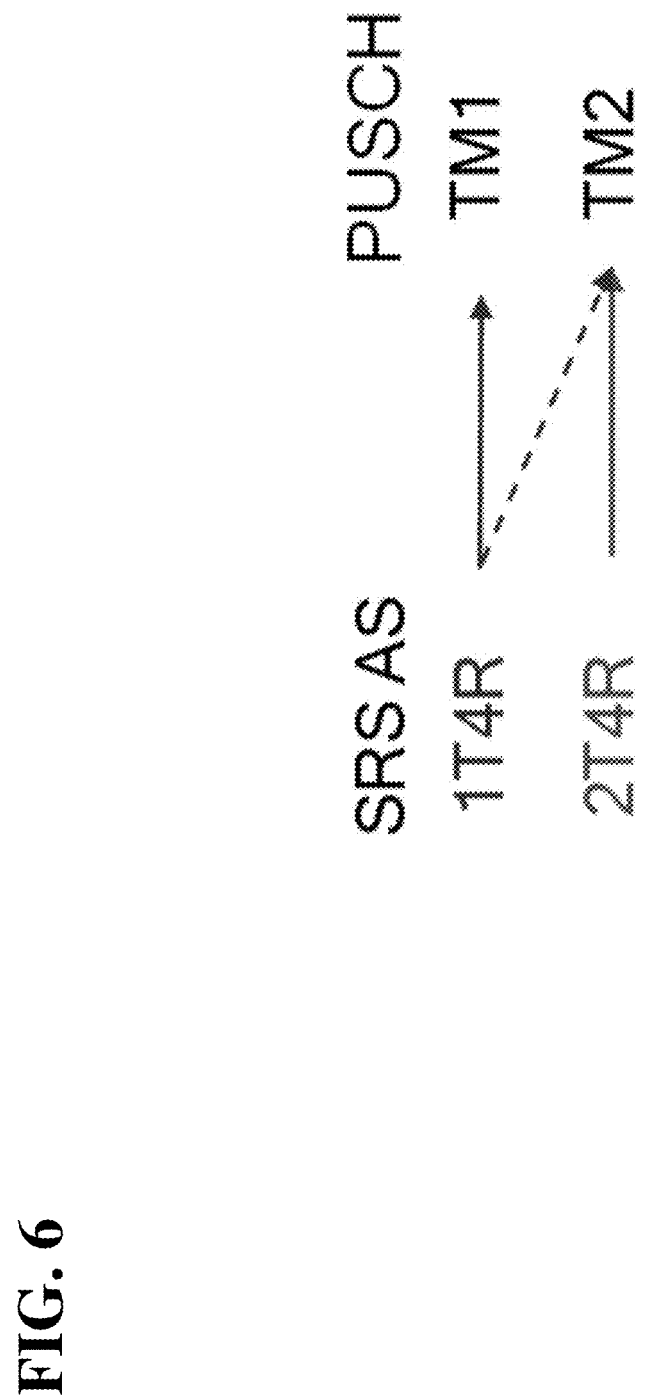
FIG. 6 illustrates an exemplary relationship between SRS antenna switching for 1T4R and 2T4R with uplink (UL) transmission capability.

It should be noted that a UE with a single chain and 4 antenna ports may be readily configured for 1T4R SRS antenna switching while UL MIMO is disabled. However, if a UE has two chains and is flexible to make combinations between the 4 antenna ports and RF chains, the eNB could configure the UE for 2T4R SRS antenna switching, wherein UL MIMO is allowed for data transmission at the same time. The relationship between 1T4R and 2T4R SRS antenna switching and UL transmission capability is summarized in FIG. 6. Here, it should be appreciated that 1T4R and 2T4R are not necessarily simultaneously configured, depending on the UE capability (e.g., the UE's RF chain).

As disclosed herein it is thus contemplated that SRS antenna switching could be configured based on the reported UE capability to support 1T4R and/or 2T4R. It is further contemplated that various combinations of SRS antenna switching and UL mode can be supported including, for example: 1T4R with TM1; 1T4R with TM2 (for cases where the UE has limitation on UE antenna switching); and 2T4R with TM2. Here, even for downlink channel reciprocity, it should be noted that the antenna switching capability of a UE may also be considered for SRS configuration.

In another aspect disclosed herein, it is contemplated that the capability for antenna switching could be band-specific in addition to UE-specific, since a UE may have antenna switching limitations for some frequency bands. Accordingly, it is contemplated that an eNB could configure the SRS antenna switching mode for 1T2R/1T4R/2T4R for each of the configured component carriers (CCs). To facilitate such configurations, the antenna switching capability of a UE (e.g., 1T4R and 2T4R) may be reported per-band of band combination. Based on the reported UE capability, the eNB may then configure the SRS antenna switching mode for 1T2R/1T4R/2T4R per CC.

Equations for SRS Antenna Switching

Figure 7:
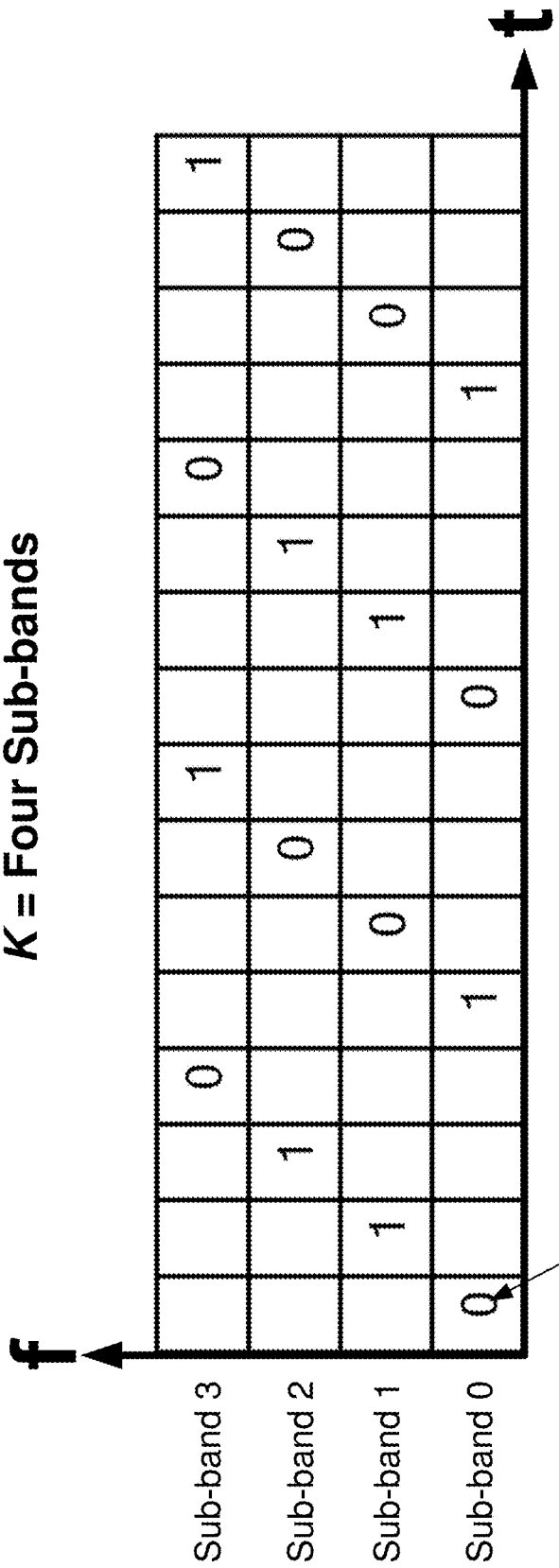
FIG. 7 illustrates an exemplary frequency hopping that facilitates SRS antenna switching within a 1T2R configuration.

For background purposes, it should be noted that SRS antenna switching is commonly performed via frequency hopping. For instance, an exemplary frequency hopping on four sub-bands (e.g., K=4) is demonstrated in FIG. 7 for SRS 1T2R, which utilizes the legacy equation proposed in 3GPP TS36.213 below:

When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS})=n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases}$$

$$\beta = \begin{cases} 1 & \text{when } K \bmod (4) = 0 \\ 0 & \text{otherwise} \end{cases}$$

when frequency hopping is enabled (i.e., $b_{hop} < B_{SRS}$), wherein
$a(n_{SRS})$=UE selected antenna port to transmit at time $n_{SRS}$;
K=total number of sub-bands for SRS frequency hopping;
Values $B_{SRS}$, $b_{hop}$, $N_b$, and $n_{SRS}$ are given in Subclause 5.5.3.2; and $$K = \prod_{b'=b_{hop}}^{B_{SRS}} N_{b'} \text{ (where } N_{b_{hop}} = 1 \text{ regardless of the } N_b \text{ value)},$$

except when a single SRS transmission is configured for the UE.

For SRS 1T4R, it should be noted that other methods have been proposed. For instance, as proposed in R1-1721229, frequency hopping for SRS 1T4R may utilize the equation below:

$$a(n_{SRS}) = \begin{cases} (n_{SRS} + \gamma \lfloor n_{SRS}/4 \rfloor + \beta \cdot \lfloor n_{SRS}/K \rfloor) \bmod 4 & \text{when } K \text{ is even} \\ n_{SRS} \bmod 4 & \text{when } K \text{ is odd} \end{cases}$$

where $$\beta = \begin{cases} 1 & \text{when } K \bmod N = 0, \text{ where } N = 6, 8, 10 \\ 0 & \text{otherwise} \end{cases}$$

and where $$\gamma = \begin{cases} 0 & \text{when } K \bmod M = 0, \text{ where } M = 6, 10 \\ 1 & \text{otherwise} \end{cases}$$

The above equation for SRS 1T4R, however, undesirably involves multiple new parameters and is not easily extendable to other use cases. For the enhanced SRS antenna switching with 1T4R and 2T4R disclosed herein, it is contemplated that a UE may be configured to transmit SRS on $N_p=\{1 \text{ or } 2\}$ antenna ports, wherein a new parameter $\Lambda_p$ is defined as the number of UE antennas or UE antenna pairs. It is further contemplated that $\Lambda_p$ may be configured by a higher layer based on the UE capability (i.e., the number of antennas or antenna pairs may be considered when determining the SRS pattern).

Exemplary cases for when $N_p=1$ and $N_p=2$ are provided in accordance with aspects disclosed herein. For instance, when $N_p=1$, $\Lambda$, may be the total number of UE antenna ports, wherein the index $a(n_{SRS})$ is the UE antenna port transmitting the SRS at time $n_{SRS}$. When $N_p=2$, $\Lambda_p$ may be the number of UE antenna pairs, wherein the index $a(n_{SRS})$ represents the UE antenna pair transmitting the SRS at time $n_{SRS}$.

In a particular aspect disclosed herein, it is contemplated that the index $a(n_{SRS})$ of the UE antenna or antenna pair that transmits the SRS at time $n_{SRS}$ may be given by:

$$a(n_{SRS}) = n_{SRS} \bmod \Lambda_p,$$

for both partial and full sounding bandwidth, when frequency hopping is disabled (i.e., $b_{hop} \geq B_{SRS}$); and $$a(n_{SRS}) = \begin{cases} (n_{SRS} + \lfloor n_{SRS}/\max\lfloor \Lambda_p, K \rfloor \rfloor) \bmod \Lambda_p & \text{when } K \text{ is even} \\ n_{SRS} \bmod \Lambda_p & \text{when } K \text{ is odd} \end{cases}$$

when frequency hopping is enabled (i.e., $b_{hop} < B_{SRS}$).

It should be noted that the above equations contemplated for the enhanced SRS antenna switching with 1T4R and 2T4R disclosed herein have no impact on the legacy case of 1T2R. Furthermore, it is noted that these equations can be readily extended to an arbitrary number $\Lambda_p$ of UE antennas or UE antenna pairs for both a no frequency hopping case and frequency hopping case, such as 1T8R, 2T8R, etc., for further forward compatibility. Desirably, except for $n_{SRS}$, $\Lambda_p$ and K, no other parameters are needed to determine $a(n_{SRS})$.

Figure 8:
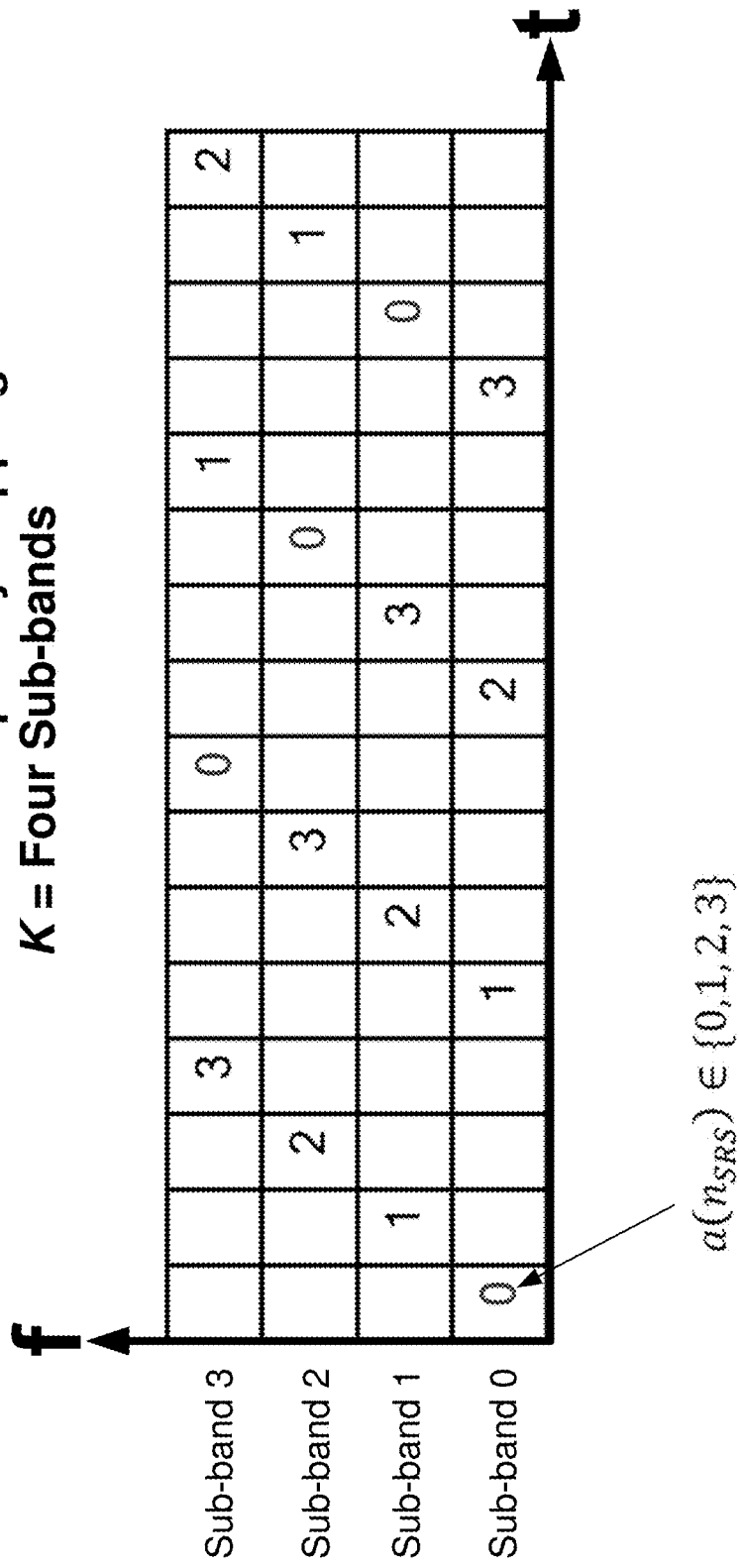
FIG. 8 illustrates an exemplary frequency hopping that facilitates SRS antenna switching within a 1T4R configuration according to some aspects of the disclosure.

An exemplary frequency hopping case on four sub-bands is demonstrated in FIG. 8 for SRS 1T4R, which utilizes the above equation disclosed herein. For SRS antenna switching with 1T4R, it is contemplated that $N_p=1$ and that the eNB configures four different SRS resources for $\Lambda_p=4$ antennas. When frequency hopping for a total of 4 subbands is enabled (i.e., K=4), the antenna switching in different SRS instances based on the above equations for enhanced SRS antenna switching is shown in FIG. 9. As illustrated, the SRS transmission of each antenna {0, 1, 2, 3} has the same opportunity per subband, wherein the total duration to get the sounding of all the UE antennas over all subbands requires $(\Lambda_p \cdot K)$ instances.

For SRS antenna switching with 2T4R where $N_p=2$ and $\Lambda_p=2$, it is contemplated that an eNB may configure two different SRS resources for antenna pair 0 and antenna pair 1 (e.g., {0,1} and {2,3}). Assuming the same number of K subbands as the 1T4R example illustrated in FIG. 9 where $\Lambda_p=4$, by using $\Lambda_p=2$ here for 2T4R, the required sounding instances ($\Lambda_p \cdot K$) to get the sounding of all the UE antennas is reduced 50%, as illustrated in FIG. 10.

Figure 11:
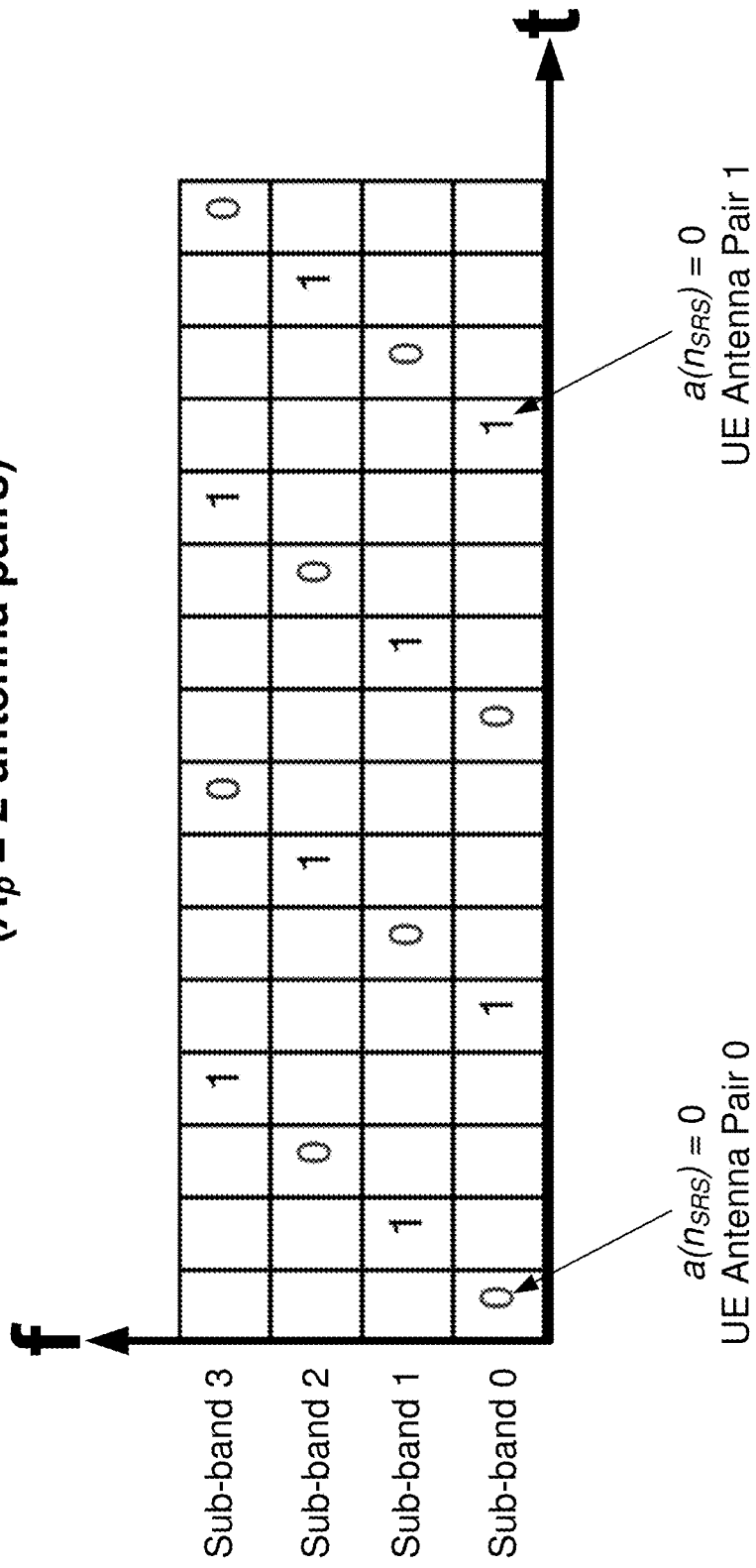
FIG. 11 illustrates an exemplary frequency hopping that facilitates SRS antenna switching within a 2T4R configuration according to some aspects of the disclosure.
Figure 12:
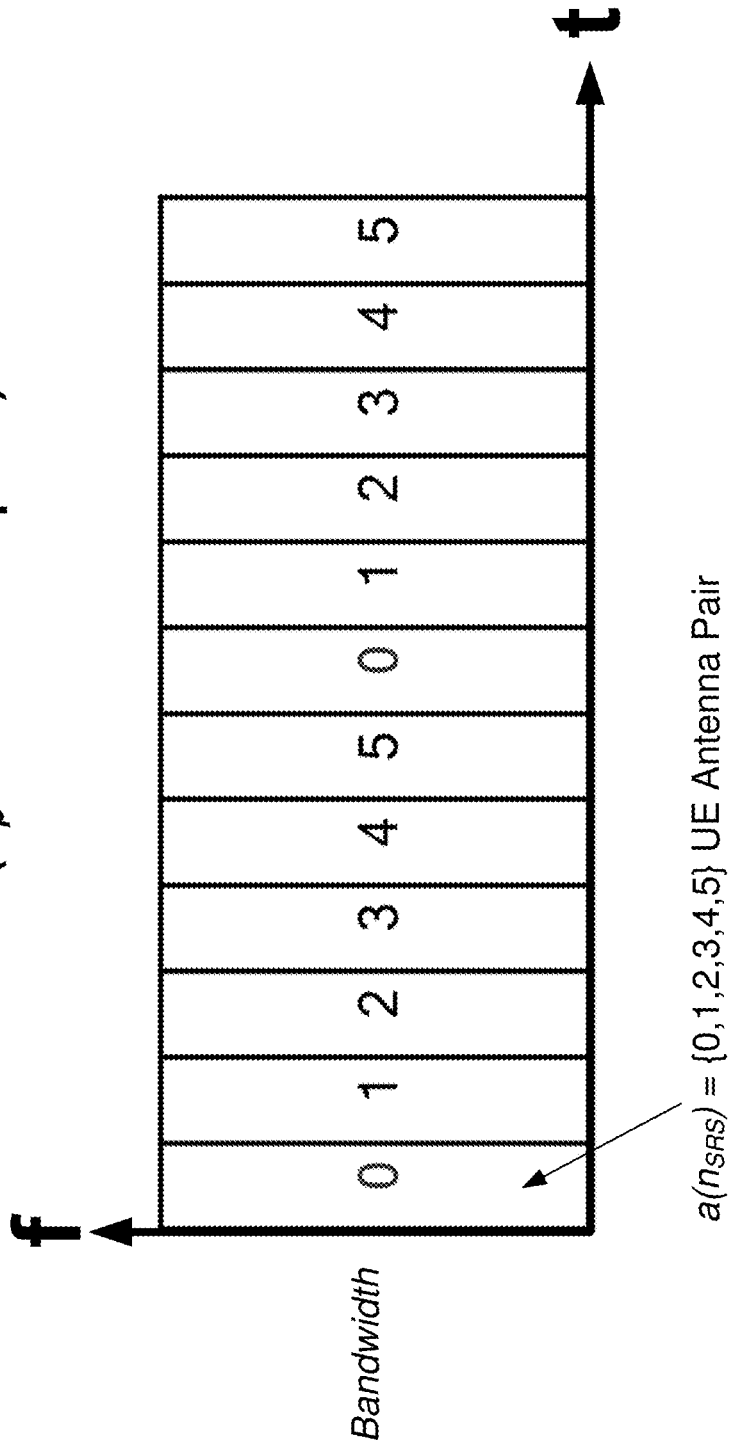
FIG. 12 illustrates an exemplary SRS antenna switching with no frequency hopping within a 2T4R configuration according to some aspects of the disclosure.

More examples are provided herein for SRS antenna switching with 2T4R, where $N_p=2$ and where there could be $\Lambda_p=\{2\sim6\}$ antenna pairs to be sounded. As previously stated, the configuration of $\Lambda_p$ may be dependent on UE capabilities per band. Furthermore, the SRS of each antenna pair can be estimated by the eNB at the same time with a coherent phase, which enables the eNB to facilitate UL beamforming. From the UE perspective, it is noted that there are three possible combinations of two complementary UE antenna pairs, such as {0,1} and {2,3}, {0, 2} and {1, 3}, and {0, 4} and {1, 3}. If the UE has the flexibility to pair all different UE antennas, the eNB can select the best UE pair for the UL data transmission. As a tradeoff, the required total ($\Lambda_p \cdot K$) instances become larger when $\Lambda_p$ increases. For example, for an edge UE that has to perform SRS using frequency hopping over K subbands due to limited power, the number of UE antenna pairs could be limited to $\Lambda_p=2$ as shown in FIG. 11, wherein the two UE antenna pairs are pre-defined, such as {0,1} and {2,3}. The total sounding overhead costs eight SRS instances to get the SRS for the selected two UE pairs over K=4 subbands. For a center UE that is configured using SRS without frequency hopping, as illustrated in FIG. 12, the eNB may configure a maximum of $\Lambda_p=6$ antenna pairs to be sounded, wherein the total sounding overhead is six SRS instances to get all the SRS for all the different UE antenna pairs over the configured bandwidth.

Modification of SRS Antenna Switching Equations

In another aspect of the disclosure, modifications to the above equation are contemplated. For example, a particular modification is contemplated to take into account an additional shift in the UE antenna index (or UE antenna pair index) every $\Lambda_p$ SRS instances for special cases, wherein the special cases may be based on K, $\Lambda_p$, and/or a higher-layer parameter freqDomainPosition, $n_{RRC}$, as the configured starting frequency position index for hopping. An exemplary modification to the above equation may thus be:

$a(n_{SRS}) =$ $$\begin{cases} (n_{SRS} + \lfloor n_{SRS}/\max(\Lambda_p, K) \rfloor + \beta' \lfloor n_{SRS}/\Lambda_p \rfloor) \bmod \Lambda_p & \text{when } K \text{ is even} \\ n_{SRS} \bmod \Lambda_p & \text{when } K \text{ is odd} \end{cases}$$

where $$\beta' = \begin{cases} 1 & \text{if } (K \bmod (2\Lambda_p) = 0) \text{ and } (n_{RRC} \bmod \Lambda_p) = 0) \\ 0 & \text{else} \end{cases}$$

or alternatively, $$\beta' = \begin{cases} 1 & \text{if } (K \bmod (4\Lambda_p) = 0) \\ 0 & \text{else} \end{cases}$$

Particular examples of how the above equation may be used are provided herein. For instance, in a first example, where $\Lambda_p=4$, the above equation becomes:

$$a(n_{SRS}) = \begin{cases} (n_{SRS} + \lfloor n_{SRS}/K \rfloor + \beta' \lfloor n_{SRS}/4 \rfloor) \bmod 4 & \text{when } K \text{ is even} \\ n_{SRS} \bmod 4 & \text{when } K \text{ is odd} \end{cases}$$

where $$\beta' = \begin{cases} 1 & \text{if } (K \bmod 8 = 0) \text{ and } (n_{RRC} \bmod 4 = 0) \\ 0 & \text{else} \end{cases}$$

or alternatively, $$\beta' = \begin{cases} 1 & \text{if } (K \bmod 16 = 0) \\ 0 & \text{else} \end{cases}$$

In a second example, where $\Lambda_p=2$, the aforementioned equation becomes:

$$a(n_{SRS}) = \begin{cases} (n_{SRS} + \lfloor n_{SRS}/K \rfloor + \beta' \lfloor n_{SRS}/2 \rfloor) \bmod 2 & \text{when } K \text{ is even} \\ n_{SRS} \bmod 2 & \text{when } K \text{ is odd} \end{cases}$$

where $$\beta' = \begin{cases} 1 & \text{if } (K \bmod 4 = 0) \text{ and } (n_{RRC} \bmod 2 = 0) \\ 0 & \text{else} \end{cases}$$

or alternatively, $$\beta' = \begin{cases} 1 & \text{if } (K \bmod 8 = 0) \\ 0 & \text{else} \end{cases}$$

For this particular example, when $\beta'=1$ (e.g., if K mod 4=0 and even $n_{RRC}$), it should be noted that the above is equivalent to the legacy equation for 1T2R, where K mod 4=0 and $\beta=1$, as shown by:

$$a(n_{SRS}) = \begin{cases} (n_{SRS} + \lfloor n_{SRS}/2 \rfloor + \beta \lfloor n_{SRS}/K \rfloor) \bmod 2 & \text{when } K \text{ is even} \\ n_{SRS} \bmod 2 & \text{when } K \text{ is odd} \end{cases}$$

where $$\beta = \begin{cases} 1 & \text{when } K \bmod (4) = 0 \\ 0 & \text{otherwise} \end{cases}$$

In yet another aspect of the disclosure, modifications to the aforementioned equation for $a(n_{srs})$ are contemplated for when $\Lambda_p$ may be an even number, e.g., $\Lambda_p=2$, or 4; or $\Lambda_p$ may be an odd number, e.g., $\Lambda_p=3$. For example, when $\Lambda_p$ is an even number or an odd number, it is contemplated that $a(n_{srs})$ may be calculated according to the modification below:

$$a(n_{srs}) = \left(n_{srs} + \left\lfloor \frac{n_{srs}}{\max(\Lambda_p, K)} \right\rfloor\right) \bmod \Lambda_p$$

when K and $\Lambda_p$ are even or $\Lambda_p$ is odd with mod $(K, \Lambda_p) = 0$ and $$a(n_{srs}) = n_{srs} \bmod \Lambda_p$$

for all other values for K

For this particular modification, it should thus be noted that K is a multiple of $\Lambda_p$, when mod$(K, \Lambda_p)=0$. It should also be noted that this particular modification can be further modified to take into account an additional shift in the UE antenna index (or UE antenna pair index) every $\Lambda_p$ SRS instances, wherein such shift is generally desired when K is a multiple of $\Lambda_p$ and reset every K instances within the range of $[0, \ldots (K/\Lambda_p)]$. If K is smaller than $$\Lambda_p, \mathrm{mod}\left(\left[\frac{n_{srs}}{\Lambda_p}\right], 1\right) = 0$$

and no additional shift is introduced. Namely, regardless of whether $\Lambda_p$ is an even number or an odd number, it is contemplated that $a(n_{srs})$ may be calculated according to the modification below:

$$a(n_{srs}) = \left(n_{srs} + \left[\frac{n_{srs}}{\max(\Lambda_p, K)}\right] + \mathrm{mod}\left(\left[\frac{n_{srs}}{\Lambda_p}\right], \left[\frac{\max(\Lambda_p, K)}{\Lambda_p}\right]\right)\right) \mathrm{mod} \, \Lambda_p$$

when $K$ and $\Lambda_p$ are even or $\Lambda_p$ is odd with $\mathrm{mod}(K, \Lambda_p) = 0$ and $$a(n_{srs}) = n_{srs} \, \mathrm{mod} \, \Lambda_p$$

for all other values for K

To further limit the case of introducing the additional shift in the UE antenna index (or UE antenna pair index) every $\Lambda_p$ SRS instances, a parameter may be multiplexed with the additional shift as:

$$a(n_{srs}) = \left(n_{srs} + \left[\frac{n_{srs}}{\max(\Lambda_p, K)}\right] + \beta \cdot \mathrm{mod}\left(\left[\frac{n_{srs}}{\Lambda_p}\right], \left[\frac{\max(\Lambda_p, K)}{\Lambda_p}\right]\right)\right) \mathrm{mod} \, \Lambda_p$$

when $K$ and $\Lambda_p$ are even or $\Lambda_p$ is odd with $\mathrm{mod}(K, \Lambda_p) = 0$ and $$a(n_{srs}) = n_{srs} \, \mathrm{mod} \, \Lambda_p$$

for all other values for K
where $\beta=1$ if $\mathrm{mod}(K, 2\Lambda_p)=0$; otherwise $\beta=0$.
Another example is to further limit the case of introducing the additional shift in the UE antenna index (or UE antenna pair index) by using a parameter $\beta'$ to be multiplexed with the additional shift as:

$$a(n_{srs}) = \left(n_{srs} + \left[\frac{n_{srs}}{\max(\Lambda_p, K)}\right] + \beta' \cdot \mathrm{mod}\left(\left[\frac{n_{srs}}{\Lambda_p}\right], \left[\frac{\max(\Lambda_p, K)}{\Lambda_p}\right]\right)\right) \mathrm{mod} \, \Lambda_p$$

when $K$ and $\Lambda_p$ are even or $\Lambda_p$ is odd with $\mathrm{mod}(K, \Lambda_p) = 0$ and $$a(n_{srs}) = n_{srs} \, \mathrm{mod} \, \Lambda_p$$

for all other values for K
where $\beta'$ is set based on $N_b$ is specified by Table 5.5.3.2-1 through Table 5.5.3.2-4 for each uplink bandwidth $N_{RB}^{UL}$ in TS36.213 and $K=N_0 \cdot N_1 \cdot N_2$. For example, $$\beta' = \begin{cases} 1, & \text{if } N_1 = 2, N_2 = 2 \\ 0, & \text{otherwise} \end{cases} \text{in case of } \Lambda_p = 4;$$

$$\beta' = \begin{cases} 1, & \text{if } N_1 \, \mathrm{mod} \, 2 = 0 \\ 0, & \text{otherwise} \end{cases} \text{in case of } \Lambda_p = 2.$$

In case of $\Lambda_p=4$, the additional shift of $\mathrm{mod}([n_{srs}/4] \cdot [K/4])$ is applied for K={8, 12, 16, 20, 24} with $N_1=2$ and $N_2=2$ can avoid the same antenna port to be mapped in the same BW/4 subband within every K SRS instances. In case of $\Lambda_p=2$, the additional shift of mod $\mathrm{mod}([n_{srs}/2] \cdot [K/2])$ is applied for K={2, 4, 6, 8, 10, 12, 16, 20, 24} with $N_1=2, 4$ or 6 can avoid the same antenna port to be mapped in the same BW/2 subband within every K SRS instances.

Exemplary Modifications of SRS 1T4R Patterns

With respect to SRS 1T4R, it is noted that without an additional shift within K instances, the same UE antenna port may be concentrated in the same BW/4 subband. In such circumstances, the UE thus cannot get the SRS of all the information of the four BW/4 subbands in the first K SRS instances. If a further change to the SRS pattern is desired to obtain the sample per BW/4 subband in the shortest time, the additional shift disclosed herein is introduced. However, it should be noted that the additional shift of $\lfloor n_{SRS}/4 \rfloor$ contemplated herein may be further modified for cases where K is even.

For reference purposes, Table 1 is provided below to summarize the corresponding value $N_b$ for each even value K specified in Table 5.5.3.2-1 through Table 5.5.3.2-4 of TS36.213 for each uplink bandwidth $N_{RB}^{UL}$ in TS36.213 and where $K=N_0 \cdot N_1 \cdot N_2$.

TABLE 1

| Even K and $N_b$ | | | | |
|---|---|---|---|---|
| K | $N_0$ | $N_1$ | $N_2$ | $N_3$ |
| 2 | 1 | 2 | 1 | 1 |
| 4 | 1 | 4 | 1 | 1 |
| 6 | 1 | 6 | 1 | 1 |
| 8 | 1 | 2 | 2 | 2 |
| 10 | 1 | 2 | 5 | 1 |
| 12 | 1 | 2 | 2 | 3 |
| 12 | 1 | 3 | 2 | 2 |
| 16 | 1 | 2 | 2 | 4 |
| 18 | 1 | 3 | 2 | 3 |
| 20 | 1 | 2 | 2 | 5 |
| 24 | 1 | 2 | 2 | 6 |
| 24 | 1 | 3 | 2 | 4 |

For this particular example, it is assumed that the frequency position for SRS hopping is defined based on each $N_b$ as defined by TS36.213, wherein $$F_b(n_{SRS}) = \begin{cases} (N_b/2)\left[\frac{n_{SRS} \mathrm{mod} \prod_{b'=b_{hop}}^{b} N_{b'}}{\prod_{b'=b_{hop}}^{b-1} N_{b'}}\right] + \left[\frac{n_{SRS} \mathrm{mod} \prod_{b'=b_{hop}}^{b} N_{b'}}{2\prod_{b'=b_{hop}}^{b-1} N_{b'}}\right] & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases}$$

Accordingly, if $N_1=2$, $F_1=\{01010101 \ldots\}$, which defines the SRS location of BW/2 subband. If $N_1=2$ and $N_2=2$, $F_2=\{00110011 \ldots\}$, which defines the relative BW/4 location within the BW/2. Therefore, when the antenna port is mapped into the band with the same $F_1$ and $F_2$, it will be in the same BW/4, wherein $F_1$ and $F_2$ are repeated every four instances. If the four antenna ports for SRS 1T4R shift in the same order (e.g., as {01230123 ...}) during the K instances (i.e., where K=8, 12, 16, 20, 24), the same antenna port will be mapped into the same BW/4 every four instances.

It should be noted that the cases with $N_1=2$ and $N_2=2$ include K=8, K=12, K=16, K=20, and K=24. It should be further noted that when K=12 and K=24, other cases exist where $N_1=3$ and/or $N_2=2$. For instance, if $N_1=3$, $F_1=\{012012012 \ldots\}$, which defines the SRS location of BW/3. Also, if $N_1=3$ and $N_2=2$, $F_2=\{000111000111 \ldots\}$, which defines the relative BW/6 location within the BW/3.

Here, even if four antenna ports shift as {01230123 . . . } during the K instances, each antenna port will desirably not be mapped into the same BW/3 or BW/6 every four SRS instances.

Figure 13:
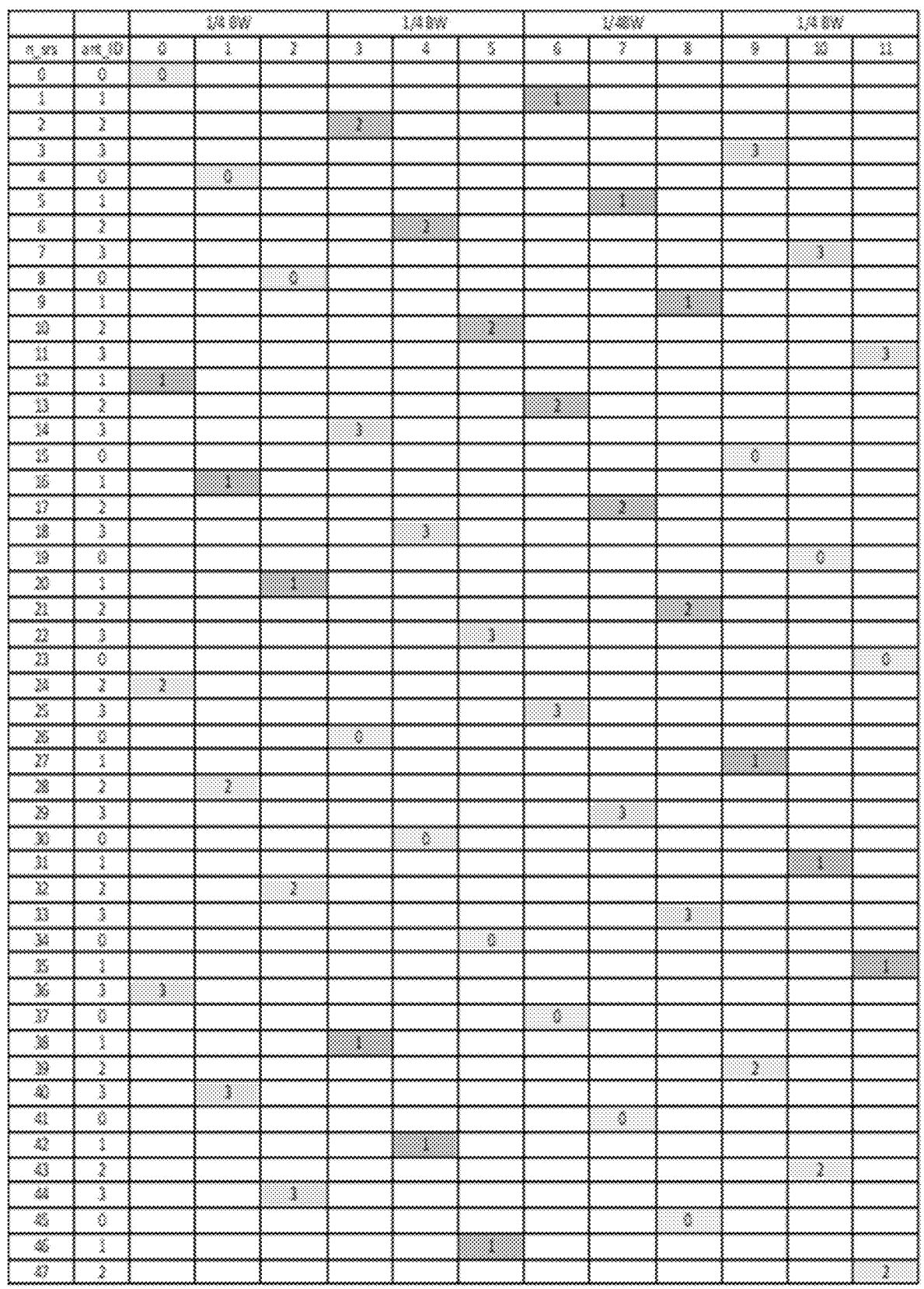
FIG. 13 illustrates an exemplary SRS 1T4R pattern in accordance with a first configuration of parameters.
Figure 14:
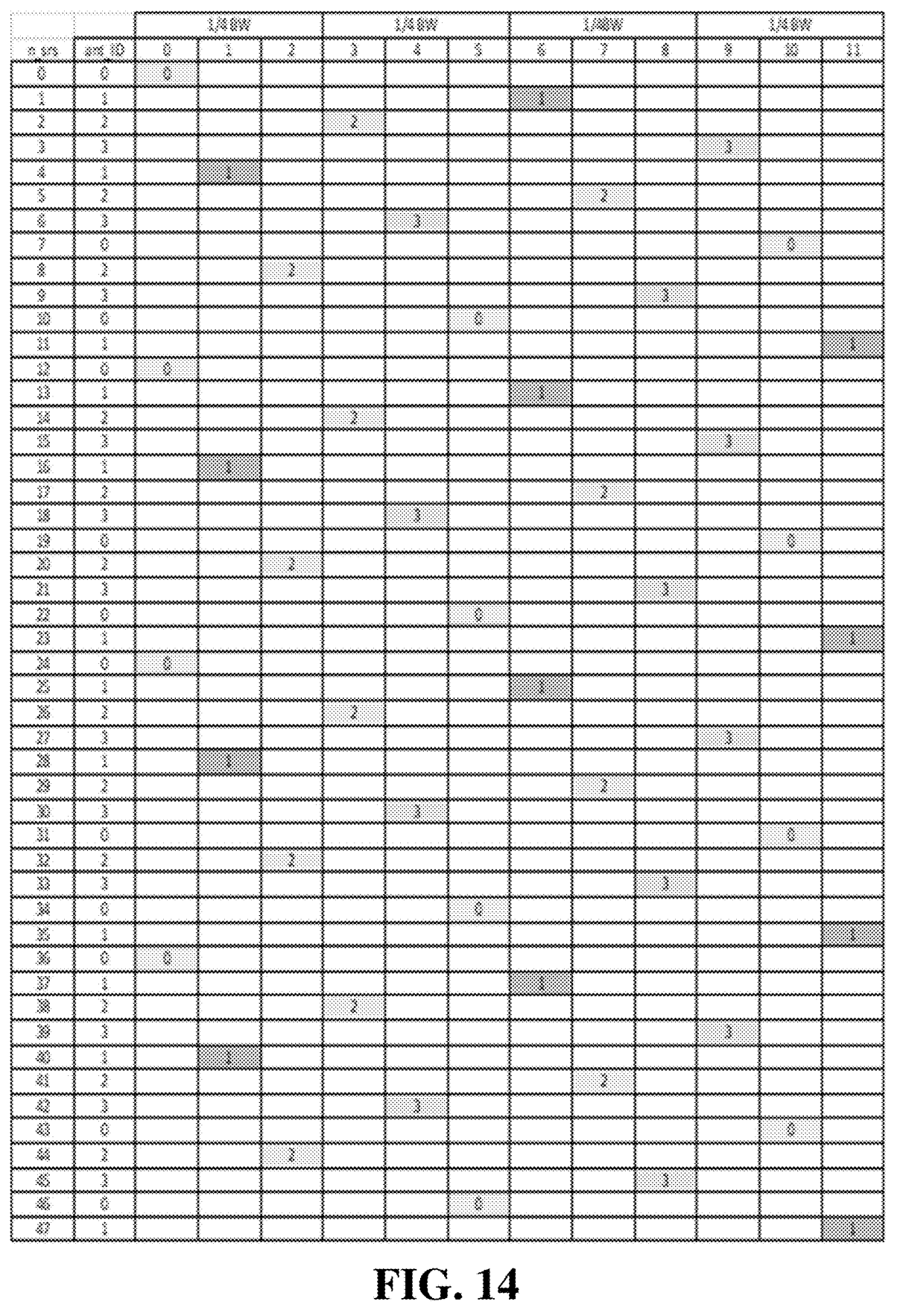
Figure 15:
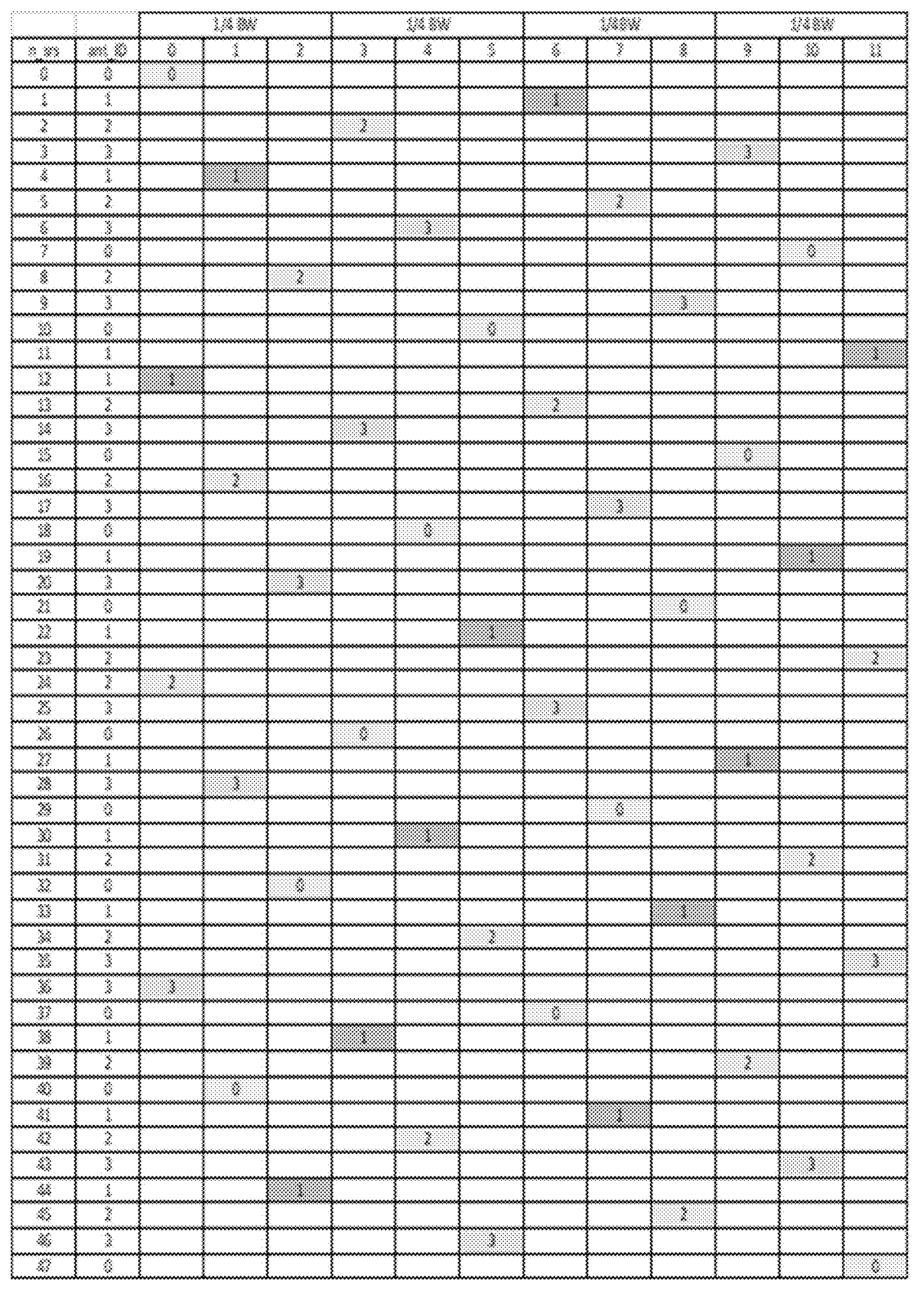

Referring next to FIGS. 13-15, various SRS 1T4R patterns are provided for K=12 with $N_1$=2 and $N_2$=2. In FIG. 13, for instance, an SRS pattern is provided using the equations disclosed herein without an additional shift. For this example, the antenna port is shifted as {012301230123} in the first K=12 instances and as {123012301230} in the second K instances. The antenna port 0 is mapped in the first BW/4 within $n_{SRS}$=0~11, which is similar to the case where K=16 (See e.g., R1-1803957, "On support of SRS antenna switching for 1T4R and 2TR antenna configurations", Huawei, HiSilicon, 3GPP TSG-RAN1 #92bis) and the case where K=24 which is discussed later with reference to FIGS. 19-21. Here, it should be noted that adding the aforementioned shift of $\lfloor n_{SRS}/4 \rfloor$, as shown in FIG. 14, will not work since the same pattern is repeated every twelve instances and the antenna ports cannot be equally distributed in every BW/K. An example of such occurrence is when antenna port 0 is sent on the $1^{st}$ subband of BW/12 at $n_{SRS}$=0, 12, 24, 36, but is never sent on the $2^{nd}$, $3^{rd}$, or $4^{th}$ subbands of BW/12 within the required total time of 4K SRS instances. The reason why the same pattern repeats every K instances is because of the total shift for each r/SRS, which is the summation of the original shift of $\lfloor n_{SRS}/K \rfloor$ and the additional shift of $\lfloor n_{SRS}/4 \rfloor$ and will be equivalent to 0 at $n_{SRS}$={K, 2K, 3K}, i.e., $$\left(\left\lfloor \frac{n_{SRS}}{K} \right\rfloor + \left\lfloor \frac{n_{SRS}}{4} \right\rfloor\right) \bmod 4 = (x + 3x) \bmod 4 = (4x) \bmod 4 = 0 (x = 1, 2, 3)$$

In order to solve the problem illustrated in FIG. 14, it is contemplated that the additional shift of $\lfloor n_{SRS}/4 \rfloor \bmod \lfloor K/4 \rfloor$ may be used, which is within the range of {0, 1, . . . , $\lfloor K/4 \rfloor$−1}. It is further contemplated that the total shift of $$\left(\left\lfloor \frac{n_{SRS}}{K} \right\rfloor + \left\lfloor \frac{n_{SRS}}{4} \right\rfloor \bmod \left\lfloor \frac{K}{4} \right\rfloor\right)$$

will not be reset to 0 when $n_{SRS}$={K, 2K, 3K}. An exemplary pattern that uses the additional shift of $\lfloor n_{SRS}/4 \rfloor \bmod \lfloor K/4 \rfloor$ disclosed herein is provided in FIG. 15. As illustrated, it can be seen that each antenna port is equally distributed in every smallest BW/K subband and also equally distributed in all BW/4 subbands every K SRS instances, which solves the problems illustrated in both FIG. 13 and FIG. 14.

Figure 16:
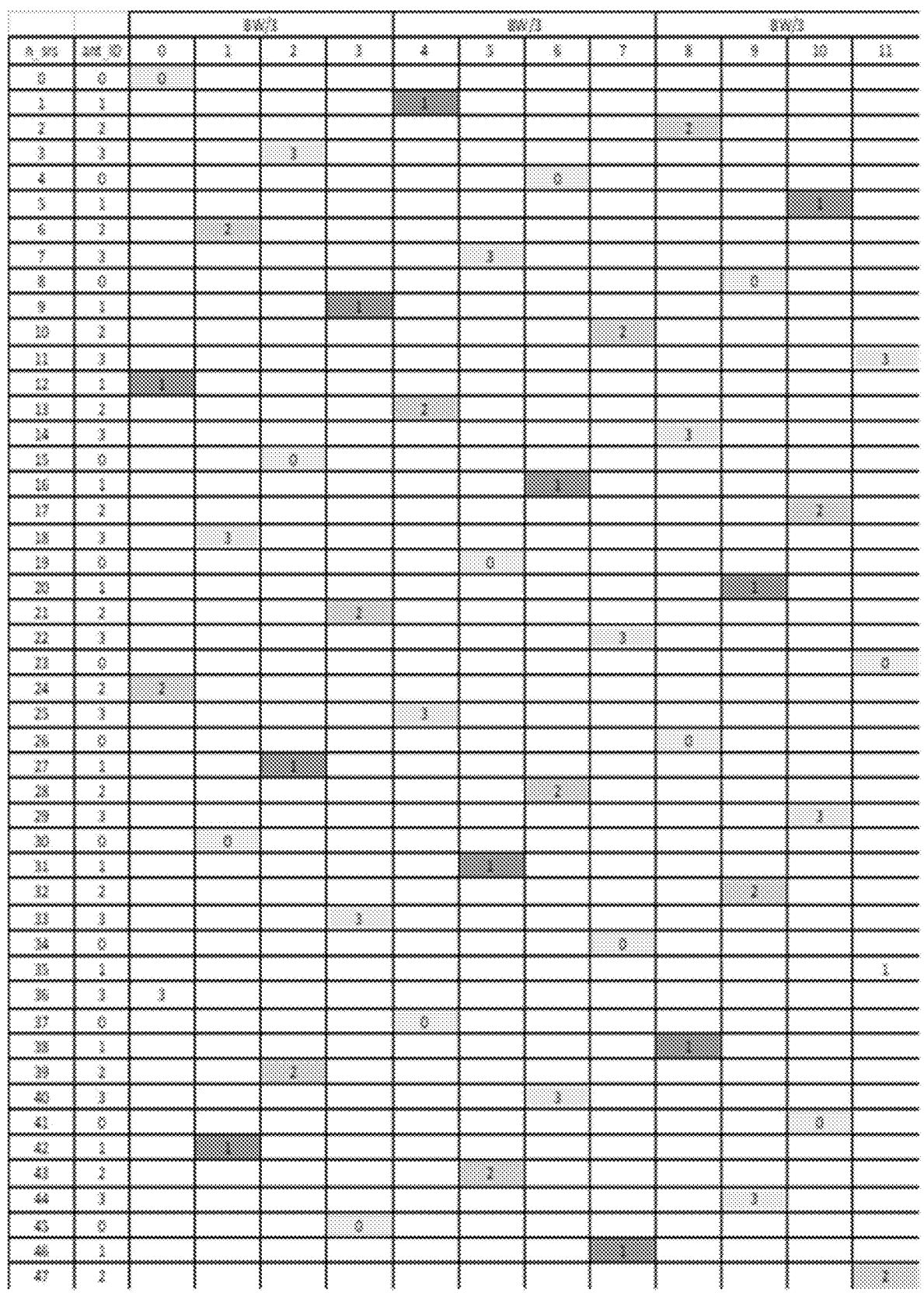
FIG. 16 illustrates an exemplary SRS 1T4R pattern in accordance with a second configuration of parameters.
Figure 17:
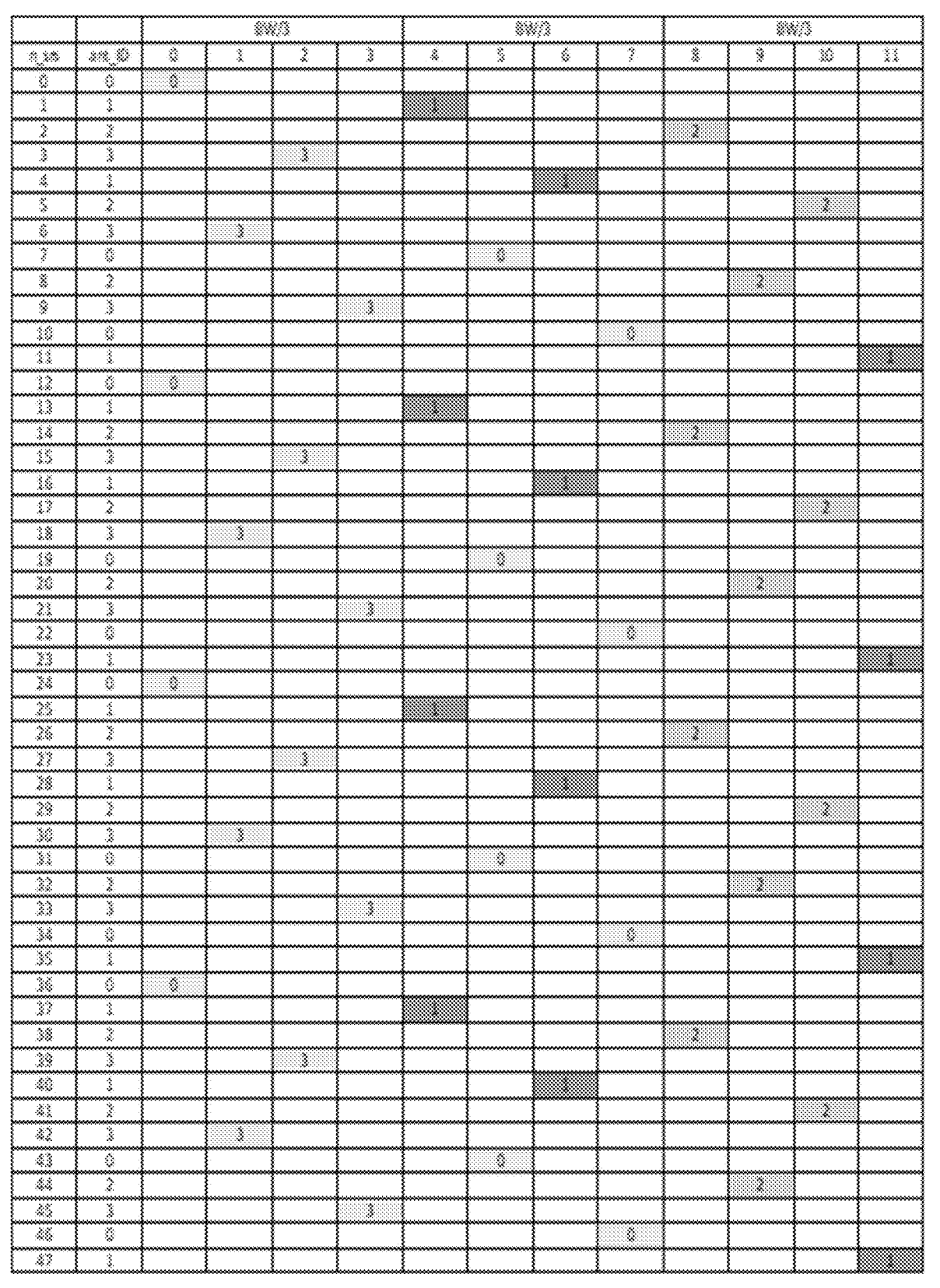
Figure 18:
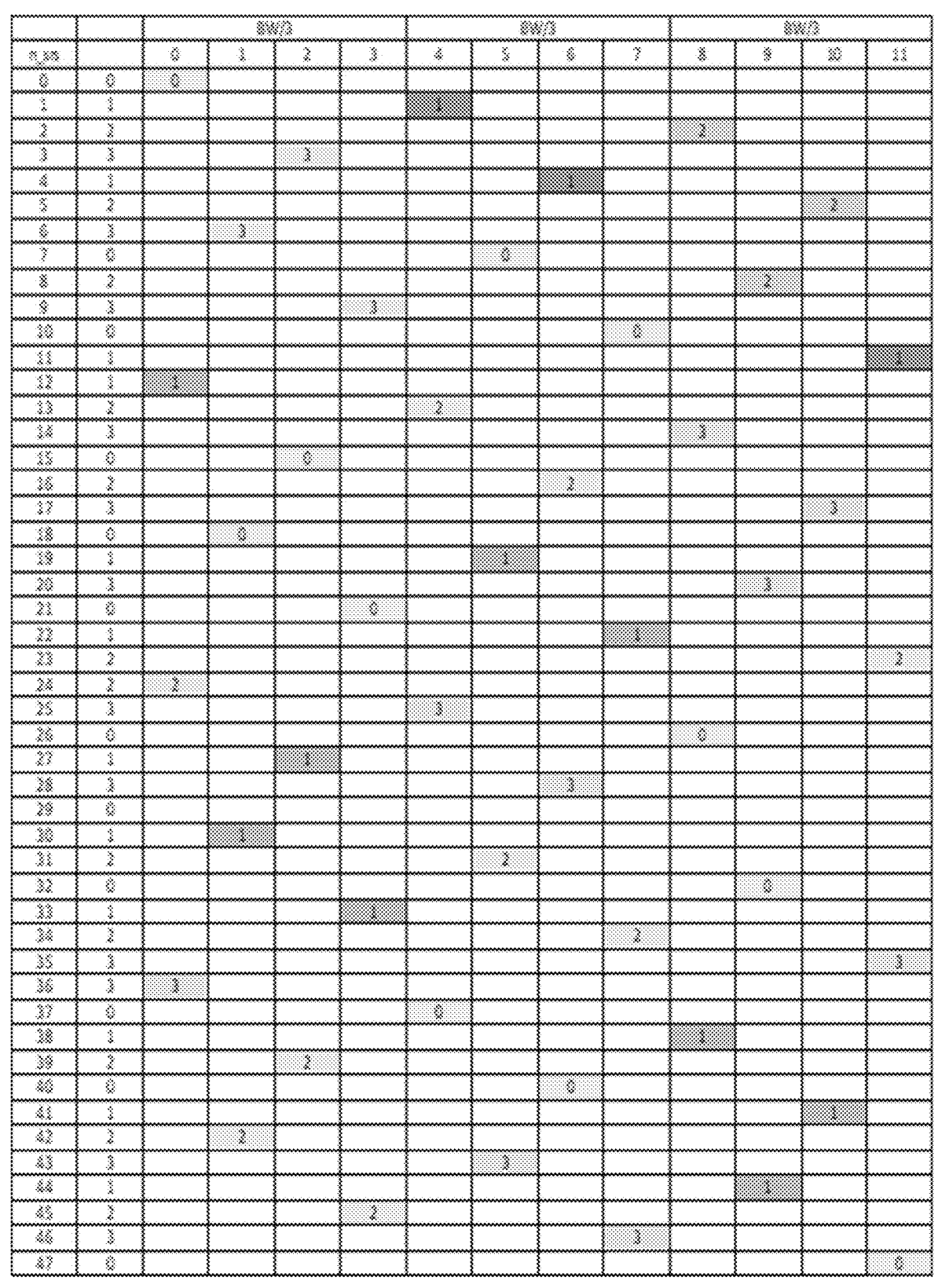

As previously mentioned, for K=12, there is a first case where $N_1$=2 and $N_2$=2, and a second case where $N_1$=3 and $N_2$=2. For the case where $N_1$=3 and $N_2$=2, various SRS patterns are provided for comparison in FIGS. 16-18, wherein FIG. 16 illustrates an SRS pattern without a shift; FIG. 17 illustrates an SRS pattern with the additional shift of $\lfloor n_{SRS}/4 \rfloor$; and FIG. 18 illustrates an SRS pattern with the additional shift of $\lfloor n_{SRS}/4 \rfloor \bmod \lfloor K/4 \rfloor$. For this particular case, the SRS pattern illustrated in FIG. 16 may be the most desirable, since each antenna port may be distributed per BW/3 subband every 12 instances. It should be noted that the pattern in FIG. 17 does not work, since the same pattern is repeated every 12 instances, and because antenna port 3 is only located in the $1^{st}$ BW/3, and antenna port 2 is only in the $3^{rd}$ BW/3. The SRS pattern illustrated in FIG. 18 with the additional shift of $\lfloor n_{SRS}/4 \rfloor \bmod \lfloor K/4 \rfloor$ may be more desirable than the SRS pattern illustrated in FIG. 17, but requires a longer time to get each antenna's SRS in all BW/3 subbands than the SRS pattern illustrated in FIG. 16.

Figure 19:
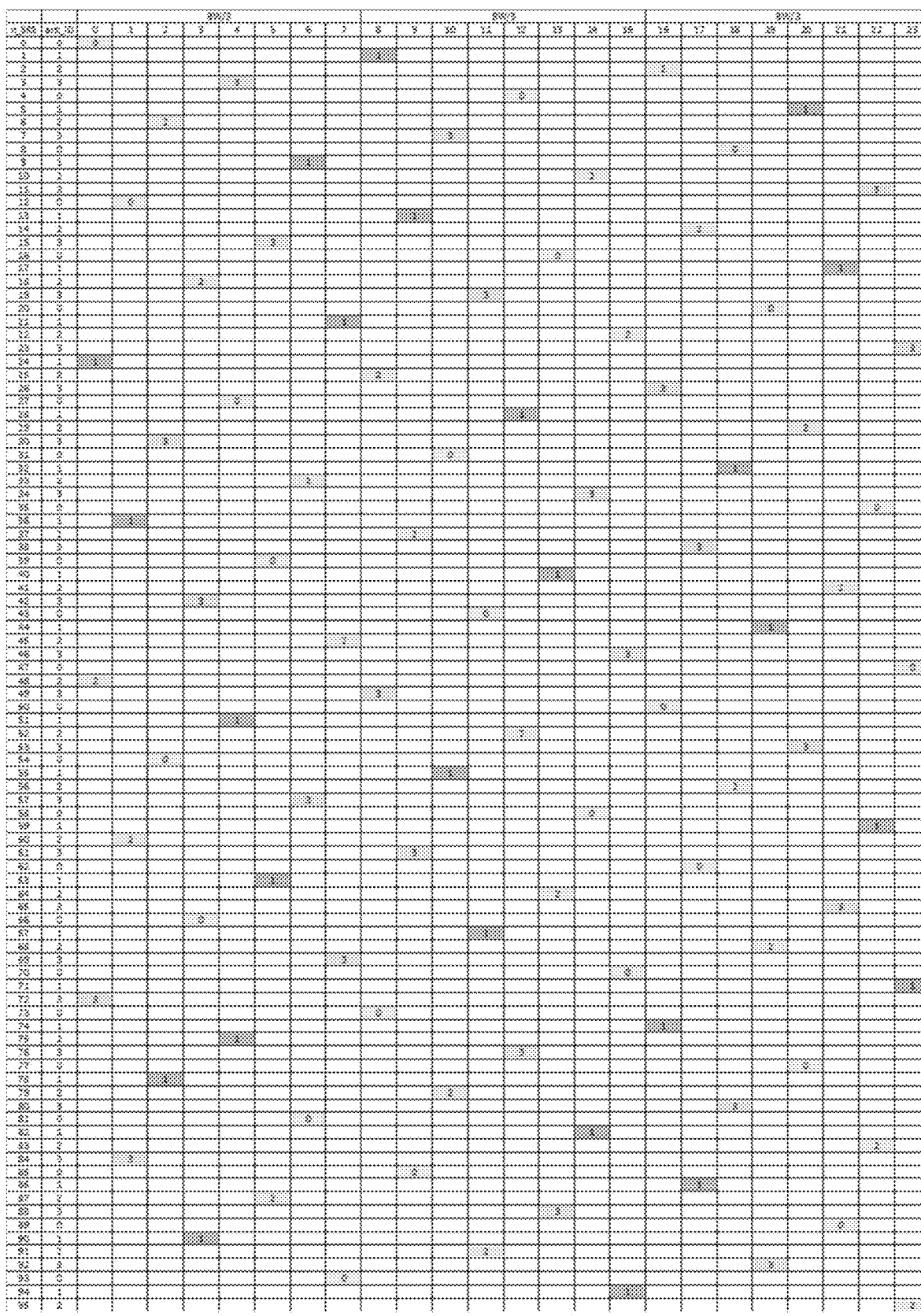
FIG. 19 illustrates an exemplary SRS 1T4R pattern in accordance with a third configuration of parameters.
Figure 20:
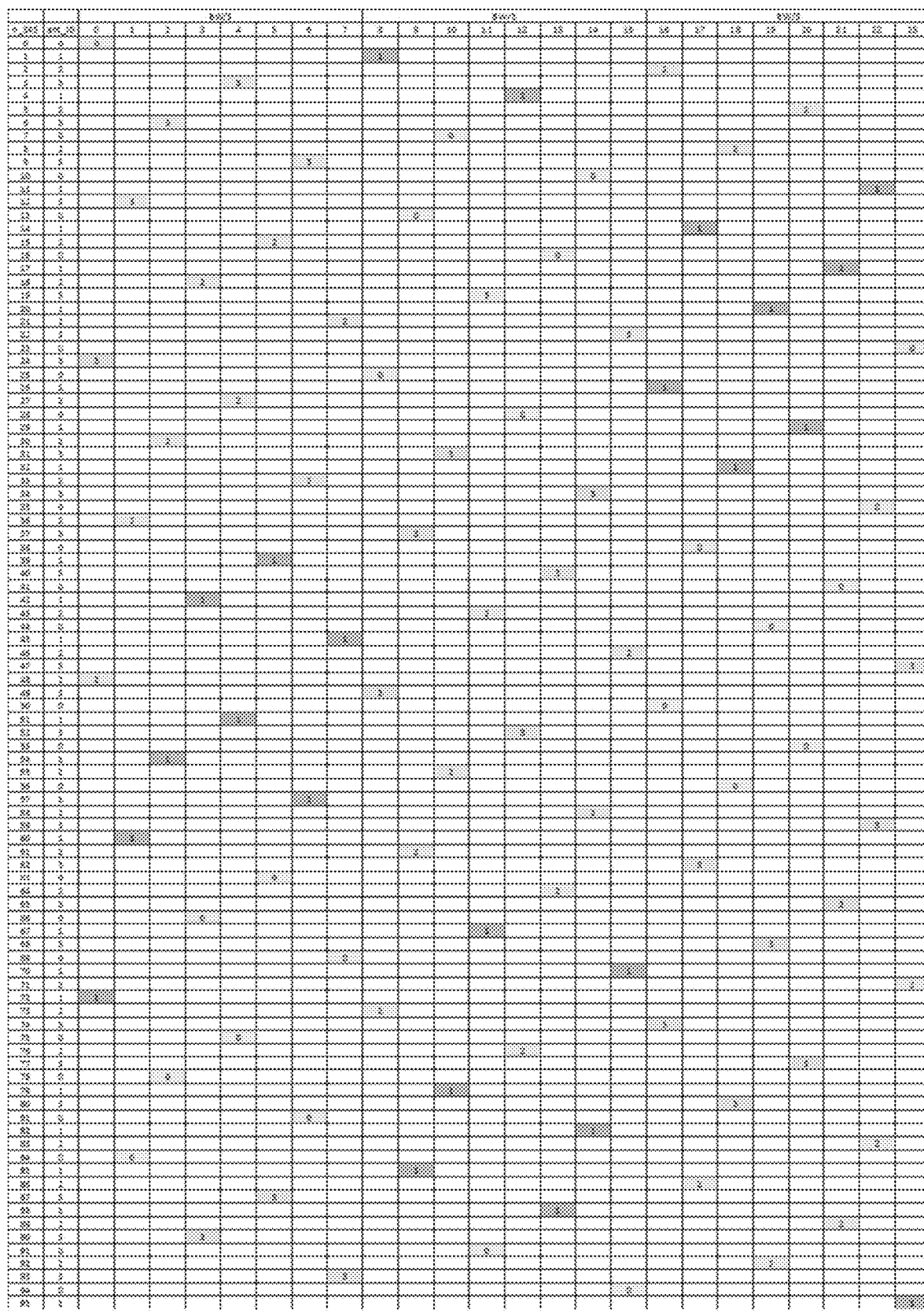
FIG. 20 illustrates an SRS 1T4R pattern that includes a first exemplary shift in accordance with the configuration of parameters associated with FIG. 19.
Figure 21:
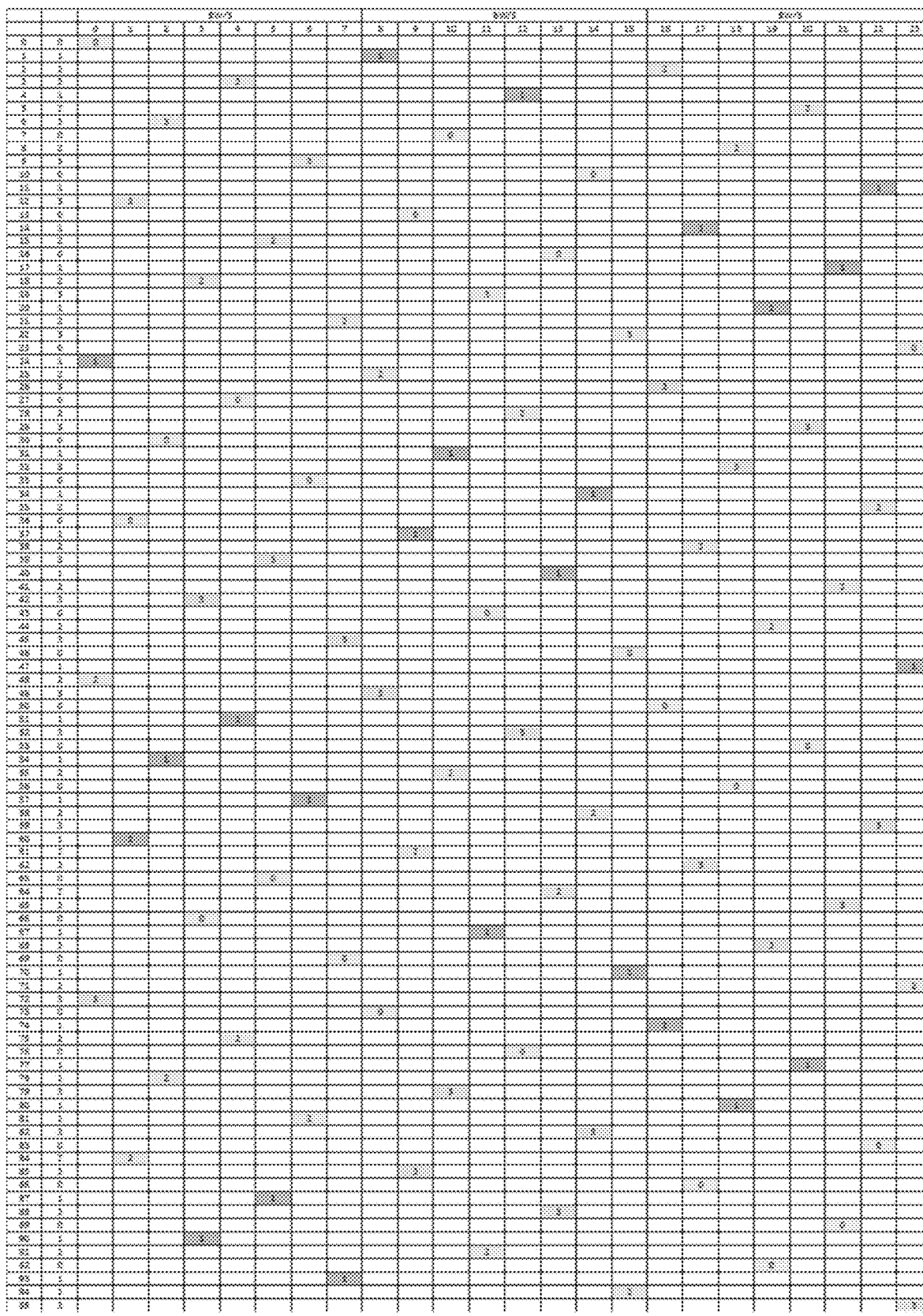
FIG. 21 illustrates an SRS 1T4R pattern that includes a second exemplary shift in accordance with the configuration of parameters associated with FIG. 19.

Similar to the K=12 cases, when K=24, there is also a first case where $N_1$=2 and $N_2$=2, and a second case where $N_1$=3 and $N_2$=2. For the case where $N_1$=3 and $N_2$=2, various SRS patterns are provided for comparison in FIGS. 19-21, wherein FIG. 19 shows the pattern with no additional shift; FIG. 20 shows the pattern with the additional shift of $\lfloor n_{SRS}/4 \rfloor$; and FIG. 21 shows the pattern with the additional shift of $\lfloor n_{SRS}/4 \rfloor \bmod \lfloor K/4 \rfloor$. As illustrated, FIG. 19, shows that the antenna port 0 is equally distributed in each subband of BW/3 within the first K=24 instances, whereas, due to the shift of $\lfloor n_{SRS}/4 \rfloor$ in FIG. 20 and the shift of $\lfloor n_{SRS}/4 \rfloor \bmod \lfloor K/4 \rfloor$ in FIG. 21, these SRS patterns take a longer time to get the antenna's SRS on all BW/3 subbands.

Based on a comparison of FIGS. 13-15 and FIGS. 16-18, it is apparent that adding the additional shift disclosed herein when $N_1$=2 and $N_2$=2 is more desirable than depending on K.

Figure 22:
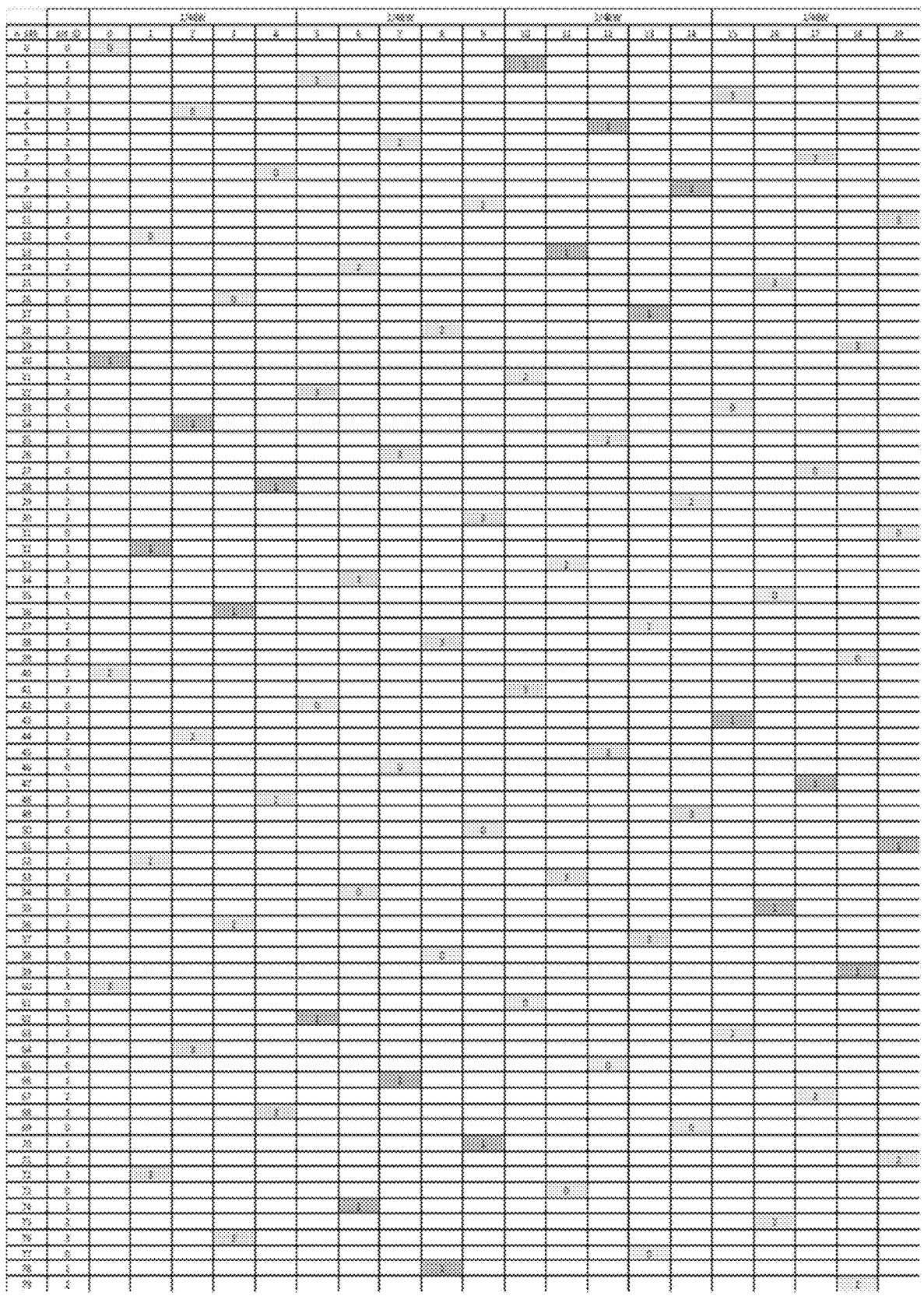
FIG. 22 illustrates an exemplary SRS 1T4R pattern in accordance with a fourth configuration of parameters.
Figure 23:
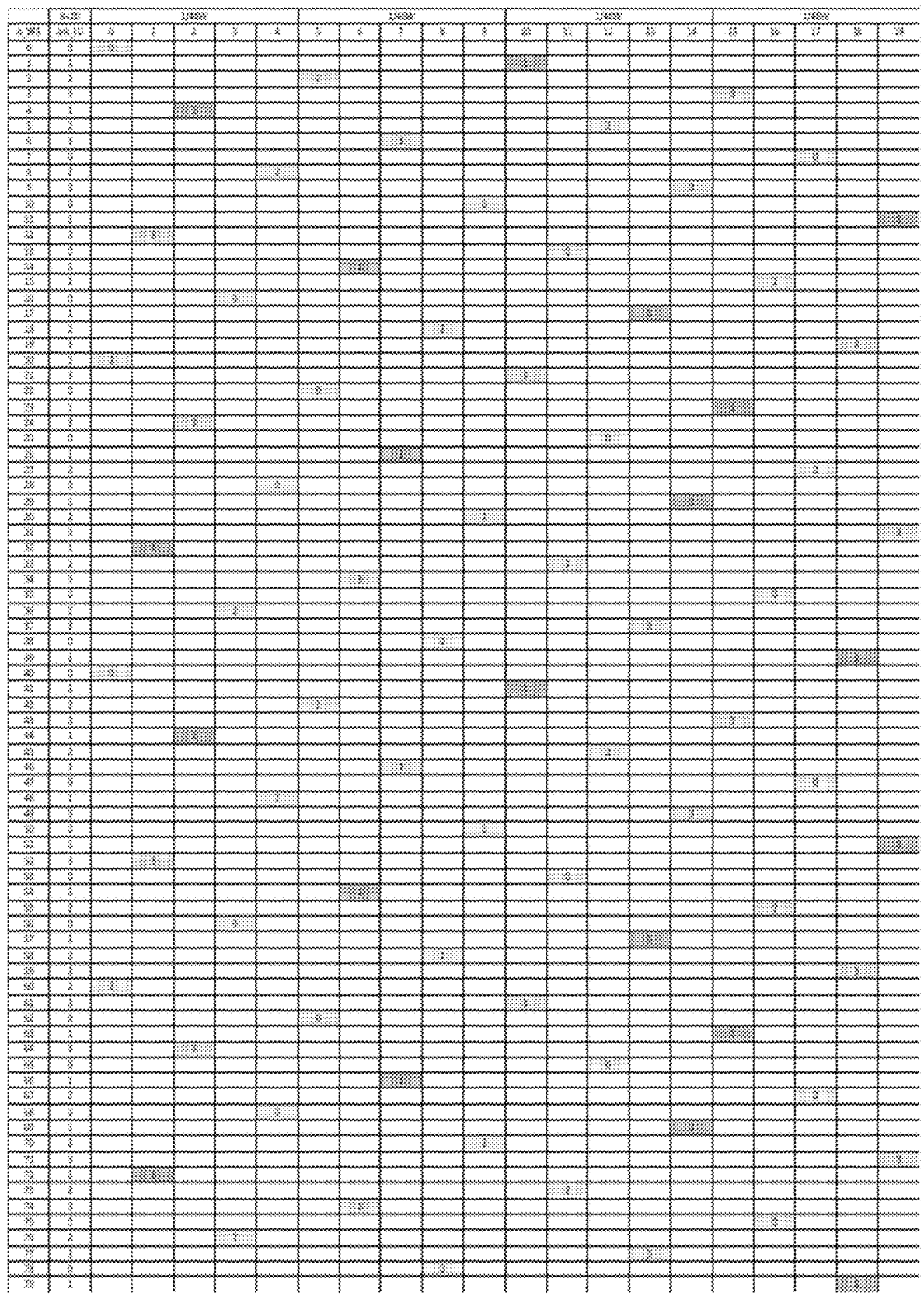
FIG. 23 illustrates an SRS 1T4R pattern that includes a first exemplary shift in accordance with the configuration of parameters associated with FIG. 22.
Figure 24:
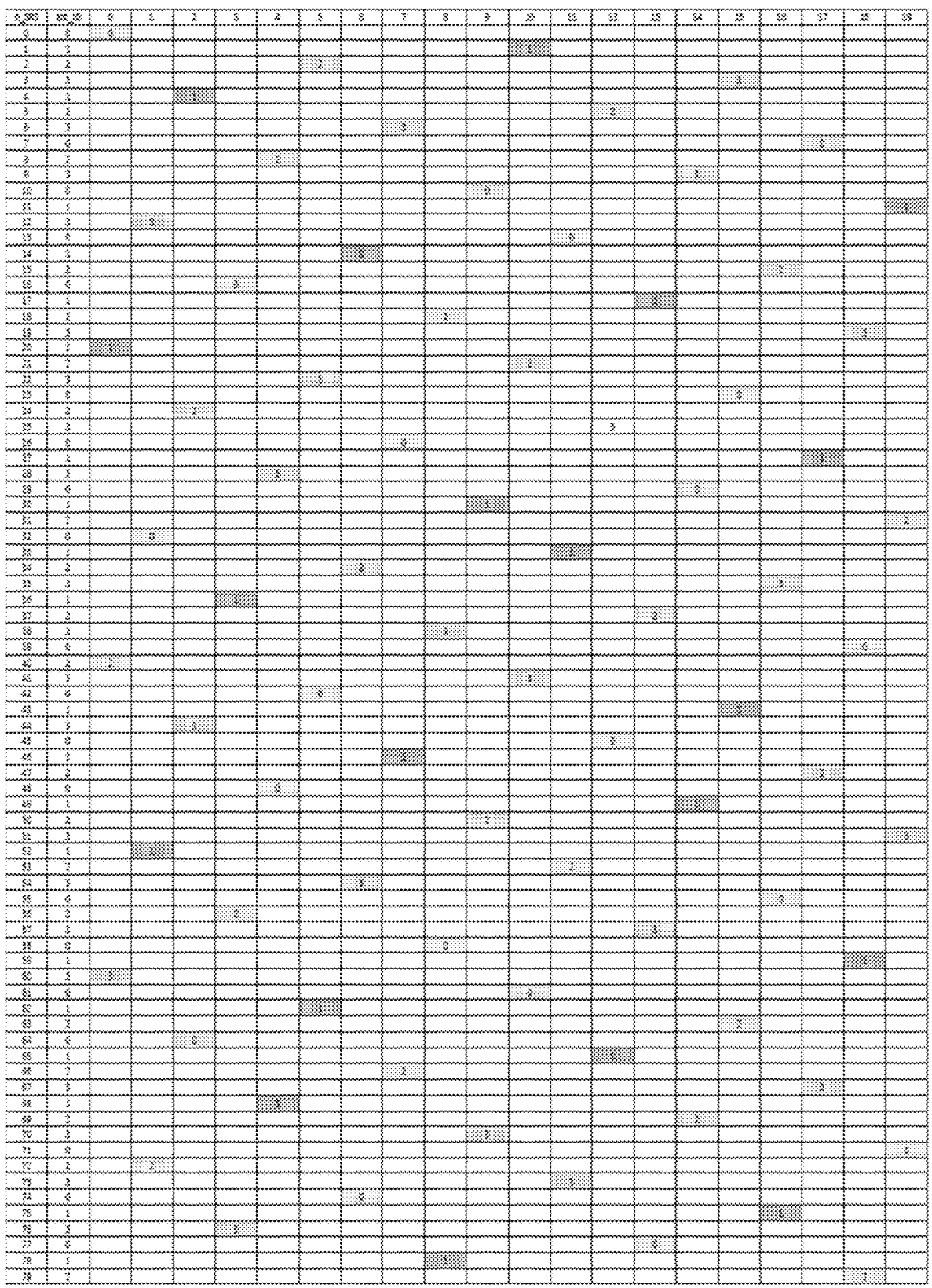
FIG. 24 illustrates an SRS 1T4R pattern that includes a second exemplary shift in accordance with the configuration of parameters associated with FIG. 22.

Referring next to FIGS. 22-24, SRS 1T4R patterns are also compared for when K=20 where $N_1$=2 and $N_2$=2, wherein FIG. 22 shows the pattern with no additional shift; FIG. 23 shows the pattern with the additional shift of $\lfloor n_{SRS}/4 \rfloor$; and FIG. 24 shows the pattern with the additional shift of $\lfloor n_{SRS}/4 \rfloor \bmod \lfloor K/4 \rfloor$. As illustrated in FIG. 22 where no additional shift is included, the antenna port 0 is sent in the $1^{st}$ BW/4 during the first K=20 instances. Also, it can be seen that using the additional shift of $\lfloor n_{SRS}/4 \rfloor$ illustrated in FIG. 23 cannot work since the same pattern is repeated every 40 instances, which means the antenna port 0 is sent twice in the $1^{st}$ subband of BW/20 at $n_{SRS}$=0 and $n_{SRS}$=40, but never sent in the $2^{nd}$ subband of BW/20. As illustrated in FIG. 24, the shift of $\lfloor n_{SRS}/4 \rfloor \bmod \lfloor k/4 \rfloor$ can solve these issues for K=20, similar to the case where K=12.

Referring next to Table 2 below, a summary is provided for how to desirably apply the additional shift disclosed herein for SRS 1T4R with four antennas. Here, in every K SRS instances, it can be seen that the same antenna port is sent in the same BW/4 when $N_1$=2 and $N_2$=2, if no additional shift is applied. For instance, this occurs when K={8, 12, 16, 20, 24} where $N_1$=2 and $N_2$=2. It is also observed that, although adding a shift of $\lfloor n_{SRS}/4 \rfloor$ does not work for K=12 and K=20 where $N_1$=2 and $N_2$=2, adding the disclosed additional shift of $\lfloor n_{SRS}/4 \rfloor \bmod \lfloor K/4 \rfloor$ instead of $\lfloor n_{SRS}/4 \rfloor$ can solve the problem. Furthermore, when K=12 or 24 where $N_1$=3 and $N_2$=2, it can be seen that an SRS pattern with no additional shift performs better than using an SRS pattern with tan additional shift of $\lfloor n_{SRS}/4 \rfloor$ or $\lfloor n_{SRS}/4 \rfloor \bmod \lfloor K/4 \rfloor$.

TABLE 2

Additional shift for SRS 1T4R with $\Lambda_p$ = 4

| K | $N_0$ | $N_1$ | $N_2$ | $N_3$ | $\lfloor n_{SRS}/4 \rfloor \bmod \lfloor K/4 \rfloor$ shift? | $\lfloor n_{SRS}/4 \rfloor$ shift? |
|---|---|---|---|---|---|---|
| 2 | 1 | 2 | 1 | 1 | | |
| 4 | 1 | 4 | 1 | 1 | | |
| 6 | 1 | 6 | 1 | 1 | | |
| 8 | 1 | 2 | 2 | 2 | Add shift of $\lfloor n_{SRS}/4 \rfloor \bmod \lfloor K/4 \rfloor$ | Add shift of $\lfloor n_{SRS}/4 \rfloor$ |
| 10 | 1 | 2 | 5 | 1 | | |
| 12 | 1 | 2 | 2 | 3 | Add shift of $\lfloor n_{SRS}/4 \rfloor \bmod \lfloor K/4 \rfloor$ | |
| 12 | 1 | 3 | 2 | 2 | | |
| 16 | 1 | 2 | 2 | 4 | Add shift of $\lfloor n_{SRS}/4 \rfloor \bmod \lfloor K/4 \rfloor$ | Add shift of $\lfloor n_{SRS}/4 \rfloor$ |
| 18 | 1 | 3 | 2 | 3 | $\lfloor n_{SRS}/4 \rfloor \bmod \lfloor K/4 \rfloor$ | |

TABLE 2-continued

Additional shift for SRS 1T4R with $\Lambda_p = 4$

| K | $N_0$ | $N_1$ | $N_2$ | $N_3$ | $\lfloor n_{SRS}/4 \rfloor \bmod \lfloor K/4 \rfloor$ shift? | $\lfloor n_{SRS}/4 \rfloor$ shift? |
|---|---|---|---|---|---|---|
| 20 | 1 | 2 | 2 | 5 | Add shift of $\lfloor n_{SRS}/4 \rfloor \bmod \lfloor K/4 \rfloor$ | |
| 24 | 1 | 2 | 2 | 6 | Add shift of $\lfloor n_{SRS}/4 \rfloor \bmod \lfloor K/4 \rfloor$ | Add shift of $\lfloor n_{SRS}/4 \rfloor$ |
| 24 | 1 | 3 | 2 | 4 | | Add shift of $\lfloor n_{SRS}/4 \rfloor$ |

As disclosed herein, an SRS equation for introducing the disclosed additional shift of $\lfloor n_{SRS}/4 \rfloor \bmod \lfloor K/4 \rfloor$ for $\Lambda_p = 4$ may be defined as:

$$a(n_{SRS}) = \begin{cases} \left(n_{SRS} + \left\lfloor \frac{n_{SRS}}{\max(\Lambda_p, K)} \right\rfloor + \beta \left( \left\lfloor \frac{n_{SRS}}{\Lambda_p} \right\rfloor \bmod \left\lfloor \frac{\max(\Lambda_p, K)}{\Lambda_p} \right\rfloor \right) \right) \bmod \Lambda_p, & \text{if } K \text{ is even for even } \Lambda_p, \text{ or } K \bmod \Lambda_p = 0 \text{ for odd } \Lambda_p \\ n_{SRS} \bmod \Lambda_p & \text{otherwise} \end{cases}$$

with $\beta = \begin{cases} 1, & \text{if } N_1 = 2, N_2 = 2 \\ 0, & \text{otherwise} \end{cases}$ for SRS 1T4R with $\Lambda_p = 4$.

Figure 26:
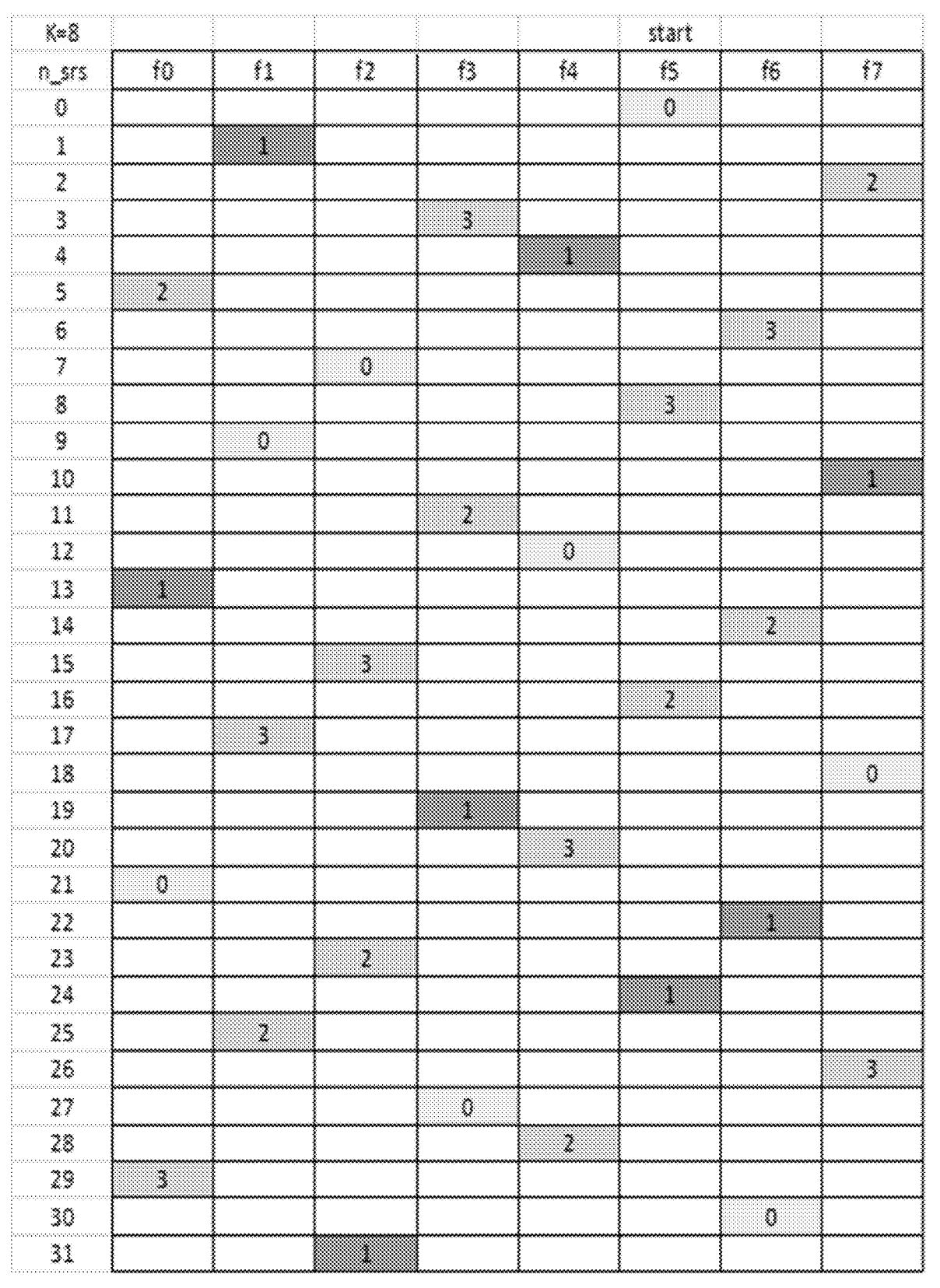

Referring next to FIGS. 25-27, various SRS 1T4R patterns are provided for when K=8, wherein FIG. 25 shows the pattern with no additional shift; FIG. 26 shows the pattern with the additional shift of $\lfloor n_{SRS}/4 \rfloor$; and FIG. 27 shows the pattern with the additional shift of $\lfloor n_{SRS}/4 \rfloor \bmod \lfloor K/4 \rfloor$. As illustrated, in FIG. 25 where no shift is included, the selected $a(n_{SRS})$ when $n_{SRS}=\{0, 1, 2, 3, \ldots\}$ is $a(n_{SRS})=\{0, 1, 2, 3, 0, 1, 2, 3, 1, 2, 3, 0, 1, 2, 3, 0, 2, 3, 0, 1, 2, 3, 0, 1, 3, 2, 1, 0, 3, 2, 1, 0, \ldots\}$; in FIG. 26 where an additional shift of $\lfloor n_{SRS}/4 \rfloor$ is included, the selected $a(n_{SRS})$ when $n_{SRS}=\{0, 1, 2, 3, \ldots\}$ is $a(n_{SRS})=\{0, 1, 2, 3, 1, 2, 3, 0, 3, 0, 1, 2, 0, 1, 2, 3, 2, 3, 0, 1, 3, 0, 1, 2, 1, 2, 3, 0, 2, 3, 0, 1, \ldots\}$; and in FIG. 27 where an additional shift of $\lfloor n_{SRS}/4 \rfloor \bmod \lfloor K/4 \rfloor$ is included, the selected $a(n_{SRS})$ when $n_{SRS}=\{0, 1, 2, 3, \ldots\}$ is $a(n_{SRS})=\{0, 1, 2, 3, 1, 2, 3, 0, 1, 2, 3, 0, 2, 3, 0, 1, 2, 3, 0, 1, 3, 0, 1, 2, 3, 0, 1, 2, 0, 1, 2, 3, \ldots\}$. Namely, FIG. 25 shows the mapping of $a(n_{SRS})$ to physical frequency hopping positions based on an Orthogonal Variable Spreading Factor (OVSF) tree for SRS 1T4R when frequency hopping is enabled with K=8. When an additional shift of $\lfloor n_{SRS}/4 \rfloor$ is introduced, as shown in FIG. 26, the UE antenna 0 is at adjacent subbands f2 and f1 when $n_{SRS}=7$ and 9, with only one SRS instance separating them, which is even less desirable than the SRS pattern illustrated in FIG. 25. Here, it should be noted that such cases frequently occur (e.g., antenna 1 in subband f6 and f5 at $n_{SRS}=22$ and 24; antenna 2 in subband f6 and f5 at $n_{SRS}=14$ and 16, and in f2 and f1 at $n_{SRS}=23$ and 25; and antenna 3 in f6 and f5 at $n_{SRS}=6$ and 8, and in f2 and f1 at $n_{SRS}=15$ and 17. As shown in FIG. 27, the UE antenna 0 is distributed in different BW/2 and is also sent at adjacent subbands f2 and f1 with a larger time distance relative to the SRS pattern illustrated in FIG. 26.

Figure 28:
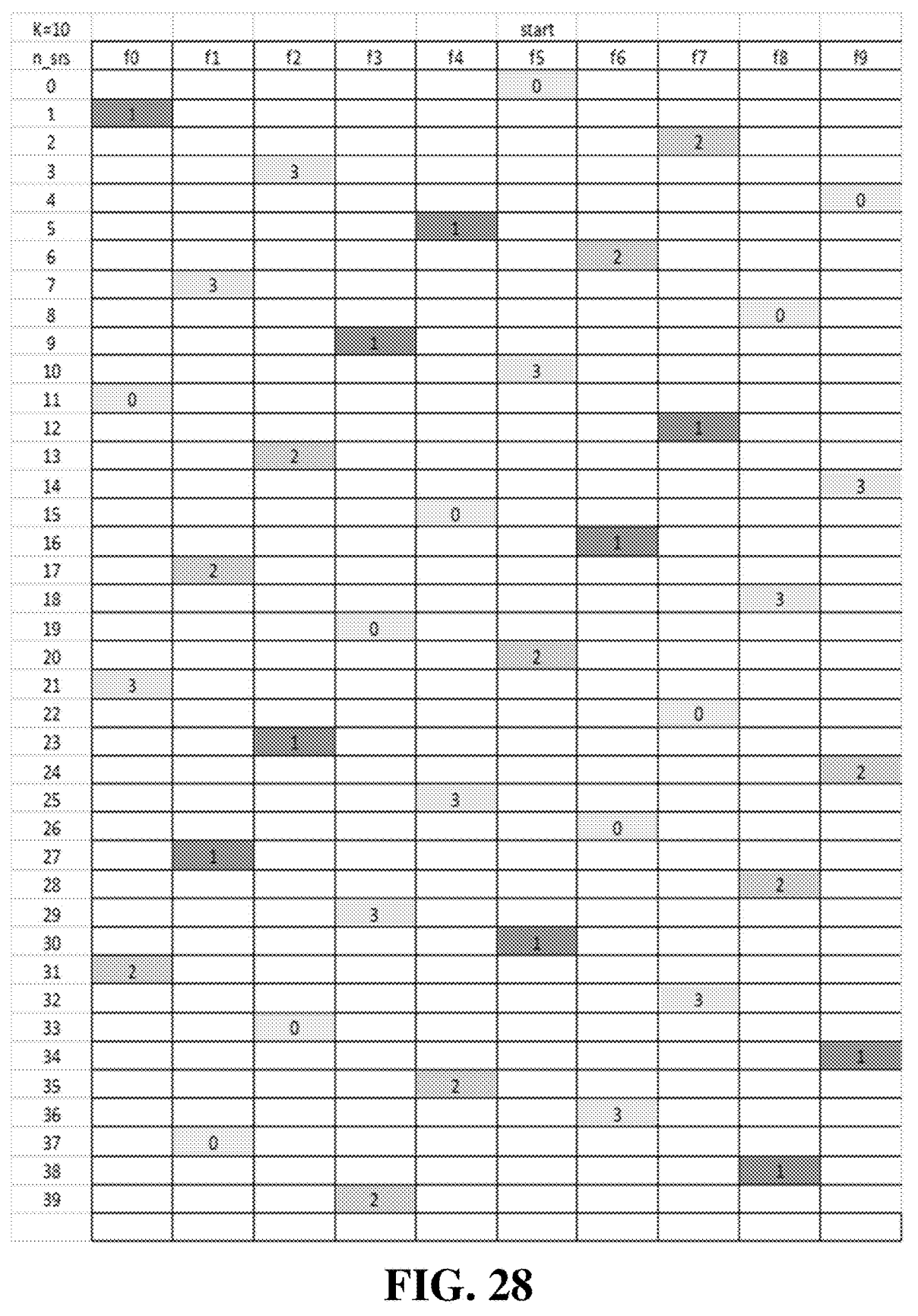

Referring next to FIG. 28, an exemplary SRS 1T4R pattern is provided for switching four UE antennas when frequency hopping is enabled with K=10, wherein there is no additional shift of $\lfloor n_{SRS}/4 \rfloor$ since K mod 8 is unequal to 0. As illustrated, the same antenna is sent on adjacent subbands every four SRS instances, in a similar way as that of K=8 in FIG. 25. Therefore, it is contemplated that introducing a special shift of $\lfloor n_{SRS}/4 \rfloor$ might not be necessary for SRS 1T4R where K=8 or K=16.

Exemplary Modifications of SRS 2T4R Patterns

With respect to SRS 2T4R implementations, it should be noted that the aforementioned modifications disclosed herein for 1T4R can be readily extended for SRS 2T4R where $\Lambda_p=2$. Namely, if $N_1=2$, $F_1=\{01010101 \ldots\}$, which defines SRS location of BW/2 subband; if $N_1=4$, $F_1=\{02130213 \ldots\}$, where $\{0, 1\}$ is in one BW/2 and $\{2, 3\}$ is in another BW/2; and if $N_1=6$, $F_1=\{03142503-1425 \ldots\}$, where $\{0, 1, 2\}$ is in one BW/2 and $\{3, 4, 5\}$ is in another BW/2. Therefore, each of the two antenna pairs for SRS 2T4R can be mapped into the same BW/2 subband with the same F1 every two SRS instances within the first K instances. For instance, the cases with $N_1=2$ include K=2, K=8, K=10, K=12, K=16, K=20, K=24, wherein each of the two antenna pairs can be mapped into the BW/2 subband with $F_1=0$ or $F_1=1$ every two SRS instances within the first K instances. Here, it should be noted that similar behavior is observed where $N_1=4$ for K=4, and where $N_1=6$ for K=6. Also, if it is assumed that $\beta=1$ when $N_1$ mod 2=0, it is further noted that the modifications disclosed herein yield SRS 2T4R patterns that perform in a similar manner as SRS 1T2R patterns yielded by the legacy equations directly applied to two antenna pairs.

Figure 29:
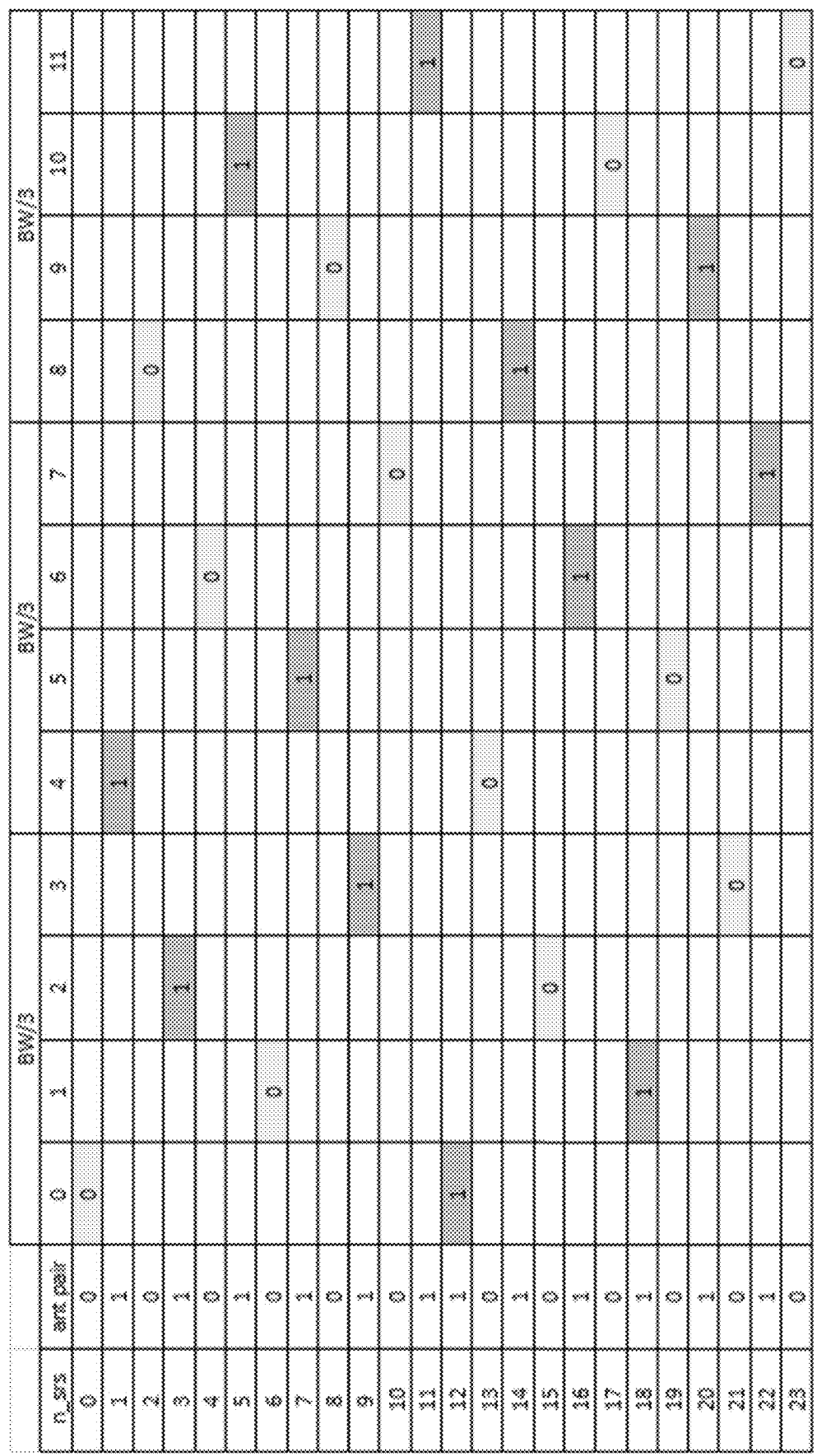
FIG. 29 illustrates an exemplary SRS 2T4R pattern in accordance with a first configuration of parameters.
Figure 30:
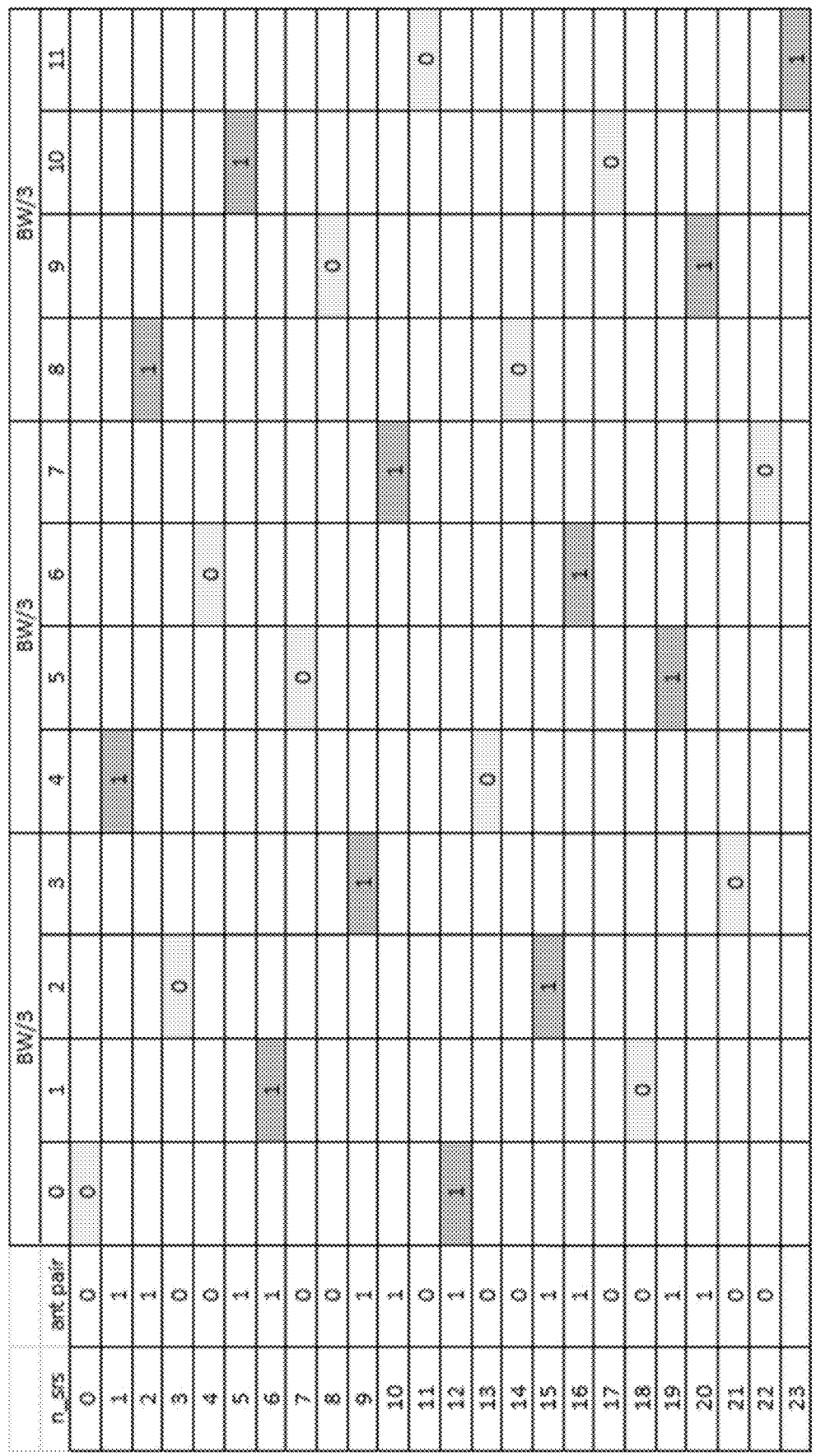
FIG. 30 illustrates an SRS 2T4R pattern that includes an exemplary shift in accordance with the configuration of parameters associated with FIG. 29.

Referring next to FIGS. 29-30, exemplary SRS 2T4R patterns are included for when K=12 and $N_1=3$, wherein FIG. 29 illustrates an SRS pattern without a shift, and wherein FIG. 30 illustrates an SRS pattern with an additional shift of $\lfloor n_{SRS}/2 \rfloor \bmod \lfloor K/2 \rfloor$. As illustrated, the SRS pattern in FIG. 29 can distribute antenna pair 0 on each BW/3 subband within every six instances, whereas introducing the additional shift of $\lfloor n_{SRS}/2 \rfloor \bmod \lfloor K/2 \rfloor$ illustrated in FIG. 30 requires twelve instances, which is double the number of instances required without a shift.

Referring next to Table 3 below, a summary is provided for how to desirably apply the additional shift disclosed herein for SRS 2T4R with two antenna pairs. Here, for every K SRS instance, it can be observed that the same antenna port is sent in the same BW/2 when $N_1$ mod 2=0 if no additional shift is applied (e.g., when K={2, 4, 6, 8, 10, 12, 16, 20, 24} with $N_1$ mod 2=0). However, by including an additional shift of $\lfloor n_{SRS}/2 \rfloor \bmod \lfloor K/2 \rfloor$ as disclosed herein, this issue can be resolved. As noted in Table 3, it is also contemplated that the legacy equation for SRS 1T2R can be used, which performs similarly to using the additional shift of $\lfloor n_{SRS}/2 \rfloor \bmod \lfloor K/2 \rfloor$ disclosed herein, but only covers the case of K={2, 4, 6, 8, 10, 12, 16, 24} without K=20. Also, for the case where K=12, 18 or 24 and $N_1=3$, it should be noted that the SRS pattern with no additional shift performs better than when a shift of $\lfloor n_{SRS}/4 \rfloor \bmod \lfloor K/4 \rfloor$ is included, and also better than when the legacy equation for SRS 1T2R is reused.

TABLE 3

Additional shift for SRS 2T4R with $\Lambda_p = 2$

| K | $N_0$ | $N_1$ | $N_2$ | $N_3$ | Proposed shift | Reusing legacy SRS 1T2R |
|---|---|---|---|---|---|---|
| 2 | 1 | 2 | 1 | 1 | $\lfloor n_{SRS}/K \rfloor + \lfloor n_{SRS}/2 \rfloor \bmod \lfloor K/2 \rfloor$ | $\lfloor n_{SRS}/2 \rfloor$ |

TABLE 3-continued

Additional shift for SRS 2T4R with $\Lambda_p = 2$

| K | $N_0$ | $N_1$ | $N_2$ | $N_3$ | Proposed shift | Reusing legacy SRS 1T2R |
|---|---|---|---|---|---|---|
| 4 | 1 | 4 | 1 | 1 | $\lfloor n_{SRS}/K \rfloor +$ $\lfloor n_{SRS}/2 \rfloor \bmod \lfloor K/2 \rfloor$ | $\lfloor n_{SRS}/2 \rfloor + \lfloor n_{SRS}/K \rfloor$ |
| 6 | 1 | 6 | 1 | 1 | $\lfloor n_{SRS}/K \rfloor +$ $\lfloor n_{SRS}/2 \rfloor \bmod \lfloor K/2 \rfloor$ | $\lfloor n_{SRS}/2 \rfloor$ |
| 8 | 1 | 2 | 2 | 2 | $\lfloor n_{SRS}/K \rfloor +$ $\lfloor n_{SRS}/2 \rfloor \bmod \lfloor K/2 \rfloor$ | $\lfloor n_{SRS}/2 \rfloor + \lfloor n_{SRS}/K \rfloor$ |
| 10 | 1 | 2 | 5 | 1 | $\lfloor n_{SRS}/K \rfloor +$ $\lfloor n_{SRS}/2 \rfloor \bmod \lfloor K/2 \rfloor$ | $\lfloor n_{SRS}/2 \rfloor$ |
| 12 | 1 | 2 | 2 | 3 | $\lfloor n_{SRS}/K \rfloor +$ $\lfloor n_{SRS}/2 \rfloor \bmod \lfloor K/2 \rfloor$ | $\lfloor n_{SRS}/2 \rfloor + \lfloor n_{SRS}/K \rfloor$ |
| 12 | 1 | 3 | 2 | 2 | $\lfloor n_{SRS}/K \rfloor$ | $\lfloor n_{SRS}/2 \rfloor + \lfloor n_{SRS}/K \rfloor$ |
| 16 | 1 | 2 | 2 | 4 | $\lfloor n_{SRS}/K \rfloor +$ $\lfloor n_{SRS}/2 \rfloor \bmod \lfloor K/2 \rfloor$ | $\lfloor n_{SRS}/2 \rfloor + \lfloor n_{SRS}/K \rfloor$ |
| 18 | 1 | 3 | 2 | 3 | $\lfloor n_{SRS}/K \rfloor$ | $\lfloor n_{SRS}/2 \rfloor$ |
| 20 | 1 | 2 | 2 | 5 | $\lfloor n_{SRS}/K \rfloor +$ $\lfloor n_{SRS}/2 \rfloor \bmod \lfloor K/2 \rfloor$ | $\lfloor n_{SRS}/2 \rfloor$ |
| 24 | 1 | 2 | 2 | 6 | $\lfloor n_{SRS}/K \rfloor +$ $\lfloor n_{SRS}/2 \rfloor \bmod \lfloor K/2 \rfloor$ | $\lfloor n_{SRS}/2 \rfloor + \lfloor n_{SRS}/K \rfloor$ |
| 24 | 1 | 3 | 2 | 4 | $\lfloor n_{SRS}/K \rfloor$ | $\lfloor n_{SRS}/2 \rfloor + \lfloor n_{SRS}/K \rfloor$ |

As disclosed herein, an SRS equation for introducing the disclosed additional shift of $\lfloor n_{SRS}/2 \rfloor \bmod \lfloor K/2 \rfloor$ for $\Lambda_p=2$ may be defined as:

$$a(n_{SRS}) = \begin{cases} \left(\left(n_{SRS} + \left\lfloor \frac{n_{SRS}}{\max(\Lambda_p, K)} \right\rfloor\right) + \beta\left(\left\lfloor \frac{n_{SRS}}{\Lambda_p} \right\rfloor \bmod \left\lfloor \frac{\max(\Lambda_p, K)}{\Lambda_p} \right\rfloor\right)\right) \bmod \Lambda_p, & \text{if } K \text{ is even for even } \Lambda_p, \text{ or } K \bmod \Lambda_p = 0 \text{ for odd } \Lambda_p \\ n_{SRS} \bmod \Lambda_p & \text{otherwise} \end{cases}$$

with $\beta = \begin{cases} 1, & \text{if } N_1 \bmod 2 = 0 \\ 0, & \text{otherwise} \end{cases}$ for SRS $2T4R \Lambda_p = 2$.

Figure 31:
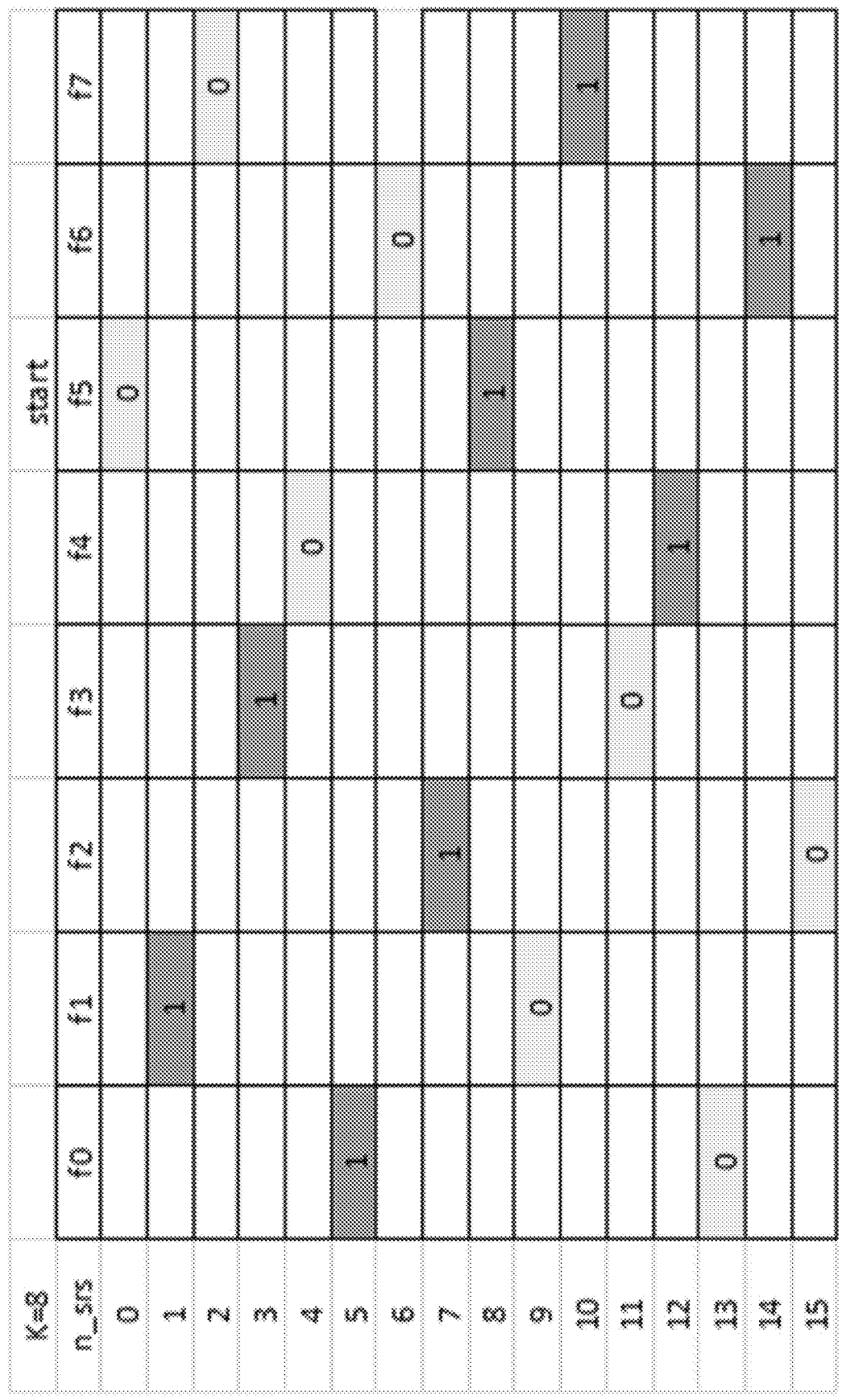
FIG. 31 illustrates an exemplary SRS 2T4R pattern in accordance with a second configuration of parameters.
Figure 32:
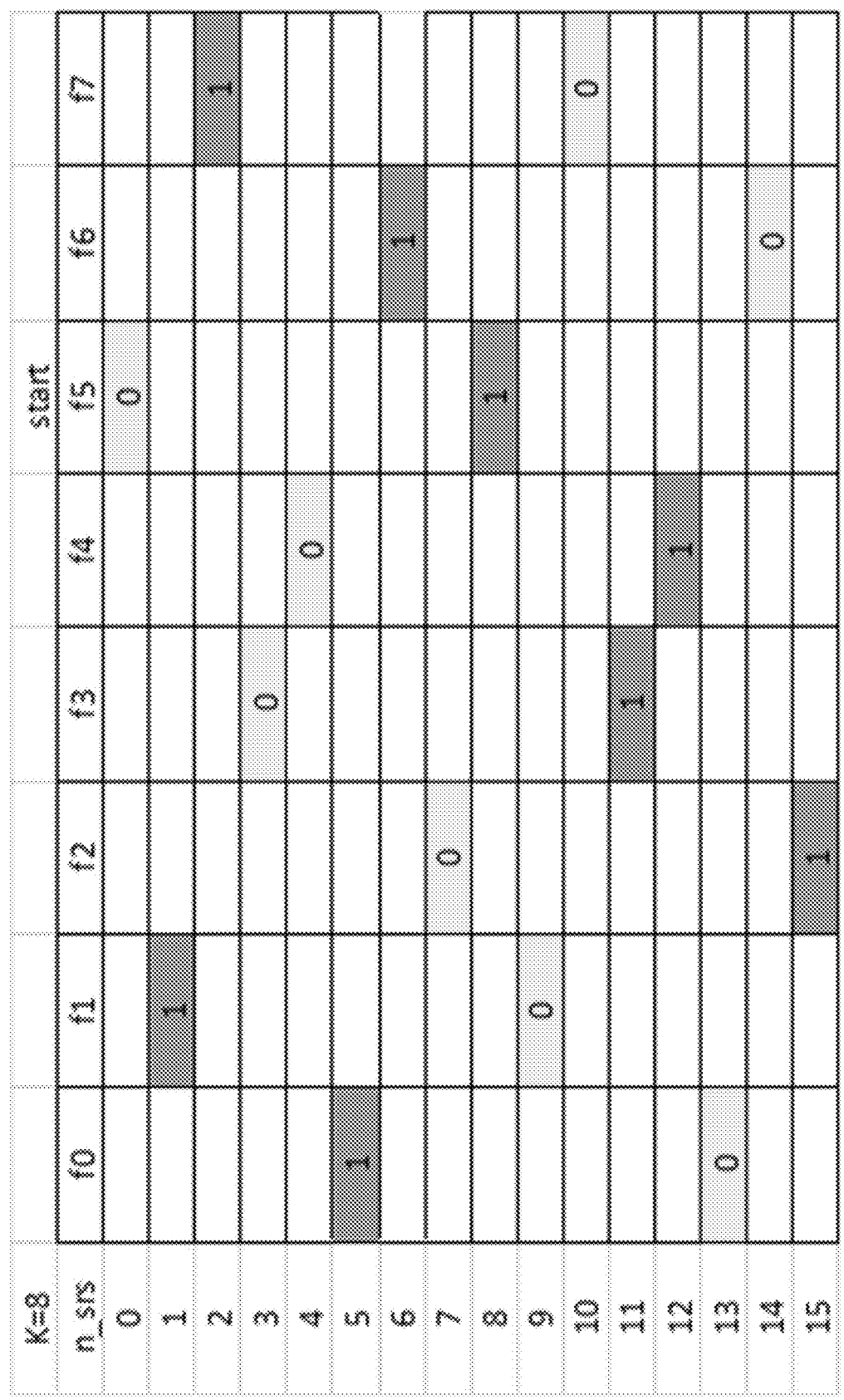
FIG. 32 illustrates an SRS 2T4R pattern that includes an exemplary shift in accordance with the configuration of parameters associated with FIG. 31.

Referring next to FIGS. 31-32, SRS 2T4R patterns are provided for when K=8, wherein FIG. 31 shows the pattern with no additional shift, and wherein FIG. 32 shows the pattern with the additional shift of $\lfloor n_{SRS}/2 \rfloor$. As illustrated, in FIG. 31 where no shift is included, the selected $a(n_{SRS})$ when $n_{SRS}=\{0, 1, 2, 3, \ldots\}$ is $a(n_{SRS})=\{0, 1, 0, 1, 0, 1, 0, 1, 1, 0, 1, 0, 1, 0, 1, 0, \ldots\}$, whereas in FIG. 26 where an additional shift of $\lfloor n_{SRS}/2 \rfloor$ is included, the selected $a(n_{SRS})$ when $n_{SRS}=\{0, 1, 2, 3, \ldots\}$ is $a(n_{SRS})=\{0, 1, 1, 0, 0, 1, 1, 0, 1, 0, 0, 1, 1, 0, 0, 1, \ldots\}$. Namely, FIG. 31 shows the mapping of $a(n_{SRS})$ to physical frequency hopping positions based on an Orthogonal Variable Spreading Factor (OVSF) tree for SRS 2T4R when frequency hopping is enabled with K=8, whereas FIG. 32, includes an additional shift of $\lfloor n_{SRS}/2 \rfloor$. As illustrated, in the first eight instances, the antenna pair 0 is concentrated in only one BW/2 in FIG. 31, but distributed in each BW/2 in FIG. 32. In FIG. 32, however, the UE antenna pair 0 are sent in adjacent sub-bands f3 and f4 when $n_{SRS}=3$ and 4 in consecutive SRS instances, which is less desirable than the SRS pattern illustrated in FIG. 31. Here, it should be noted that similar cases frequently occur (e.g., UE antenna pair 0 in subbands f2 and f1 at $n_{SRS}=7$ and 9; and antenna pair 1 in subbands f6 and f5 at $n_{SRS}=6$ and 8, and in subbands f3 and f4 at $n_{SRS}=11$ and 12).

Exemplary Benefits of Modifying Equations for SRS Antenna Switching

For each of the above modifications, particular benefits will be readily apparent to those of ordinary skill in the art. For example, such modifications may desirably facilitate designs in which the same antenna port/antenna pair may be distributed in an upper/lower bandwidth within K instances. Such modifications also facilitate designs in which a large time interval of the same antenna port/antenna pair may be kept in adjacent sub-bands across multiple K instances.

With respect to UL MIMO communications in the Physical Uplink Shared Channel (PUSCH), it should be noted that current LTE SRS antenna switching only supports 1T2R when UL MIMO is disabled (i.e., in transmit mode 1 (TM1) where only one transmit antenna is used). In 3GPP TS36.213, it is specified that "A UE configured with transmit antenna selection for a serving cell is not expected to be configured with more than one antenna port for any uplink physical channel or signal for any configured serving cell", which is for SRS 1T2R. Namely, if the UE utilizes UL MIMO, rather than operating in switching mode, the current LTE specification indicates that the UE should use SRS in "MIMO mode" (i.e., in transmit mode 2 (TM2) utilizing a 2T2R configuration for Transmit Diversity, which is the default MIMO mode). The current LTE specification thus does not support performing SRS antenna switching simultaneously with an UL MIMO transmission.

Aspects disclosed herein, however, are directed towards the simultaneous support of SRS antenna switching and UL MIMO communications where the UE has at least four antennas (e.g., 1T4R or 2T4R). To this end, it should first be noted that operating in 2T4R mode typically forces the UE to reserve two transmit chains. If the two transmit chains are only used for SRS antenna switching, but one of the transmit chains is a spare transmit chain and not used for another UL transmission, such as PUSCH, PUCCH, the UE could support SRS antenna switching with 2T4R when TM1 is used for PUSCH. Therefore, if there is a limitation on the usage of the transmit chain for PUSCH/PUCCH, the UE configured with SRS antenna selection for 2T4R could be configured with one antenna port for UL physical channel or signal for the configured serving cell. If there is no spare transmit chain, however, it is contemplated that the UE should tie 2T4R with PUSCH TM2, so that both transmit chains are more efficiently used. If there is no limitation on the usage of the transmit train for UL transmission, the UE configured with SRS antenna selection for 2T4R could be configured with more than one antenna port for UL physical channel or signal for the configured serving cell. Here, it should be noted that the number of transmit chains are also represented by the number of transmit antenna ports, whereas the number of UE antenna ports is the number of the UE receive antennas.

Moreover, when only one transmit chain is available for uplink transmission, it is contemplated that PUSCH has no MIMO capability when SRS antenna switching for 1T4R (i.e., the same as legacy 1T2R), which means the UE configured with SRS antenna selection for 1T4R is configured with one antenna port for the UL physical channel or signal for the configured serving cell. On the other hand, in some special case, the UE has two transmit trains but limited capability on the antenna switching, e.g., not all the transmit chains are switchable. For example, where the $1^{st}$ transmit train is fixed to the UE antenna 0 but the 2nd transmit chain can be switched between UE antenna 1, 2 and 3. In such case, even if the PUSCH is using more than one transmit chain (i.e., more than one antenna port) for UL MIMO, the SRS antenna switching with 1T4R can be configured, where the $1^{st}$ transmit chain or $2^{nd}$ transmit chain are switched in different SRS instances. Another option is that the eNB configures the SRS antenna switching for 2T4R but using only a subset of the UE antenna pair combinations based on the reported limitation of the UE antenna switching, such as {0,1}, {0,2}, {0,3} UE antenna pairs. The SRS configuration is based on UE reporting of its capability band by band.

Various implementations are disclosed herein for simultaneously supporting SRS antenna switching and UL MIMO capability in PUSCH. For instance, in a first implementation, it is contemplated that the number of UE antenna ports (the number of UE receive antennas) used for SRS antenna switching is different than the number of antenna ports used for UL MIMO in PUSCH. For such implementation, it is proposed that two pairs of UE antennas be selected for simultaneously supporting SRS antenna switching but UL MIMO in PUSCH use only the UE antenna pair 0. For instance, in the 2T4R example illustrated in Table 4 below, SRS 2T4R switched between {0,1} and {2,3} UE antenna pair, but PUSCH UL MIMO via only antenna pair {0, 1}. The antenna pair {0,1} may have to be sounded simultaneously to provide phase coherence (e.g., for beamforming in TM2), so that the 2×2 MIMO codebooks for TM2 may be used for PUSCH. In such case, SRS can use antenna switching for 2T4R but PUSCH can only use 2T2R UL MIMO.

TABLE 4

|  | SRS 2T4R Antenna Switching | PUSCH UL MIMO with 2 Ports |
| --- | --- | --- |
| UE Antenna Port Pair 0 | {0, 1} | {0, 1} |
| UE Antenna Port Pair 1 | {2, 3} | n/a |

In another implementation disclosed herein, it is contemplated that the number of antenna ports used for SRS antenna switching is equal to the number of antenna ports used for UL MIMO in PUSCH. For such implementation, a first option is proposed in which predefined UE antenna pairs are used for simultaneously supporting SRS antenna switching and UL MIMO capability in PUSCH. For instance, in the 2T4R example illustrated in Table 5 below, two particular antenna pairs of the six possible antenna pair combinations are predefined, wherein 4×2 MIMO codebooks for TM2 may be used (See e.g., FIG. 33). In such case, SRS can use antenna switching for 2T4R and PUSCH can also use 2T4R with antenna selection together with UL MIMO, where the UE antenna pairs are pre-defined. The 4×2 UL MIMO codebook with rank equal to one or two is defined based on the predefined UE antenna pairs. Instead of signaling the selected precoding vector based on 4×2 codebook in FIG. 33, another signaling method for PUSCH with antenna selection and UL MIMO is to use 1-bit RRC signaling to explicitly indicate which antenna pair is selected semi-statically between the two pre-defined antenna pairs, e.g., {0,1} or {2,3} in Table 5, and then signaling the precoding vector based on 2×2 codebook specified in 3GPP TS36.211. Alternatively, the signaling method for PUSCH with antenna selection and UL MIMO can use the two LTE downlink control information (DCI) cyclic redundancy check (CRC) masks via PDCCH to implicitly indicate which antenna pair is selected dynamically between the two pre-defined antenna pairs, e.g., {0,1} or {2,3} in Table 5, and then signaling the precoding vector based on 2×2 codebook specified in 3GPP TS36.211.

TABLE 5

|  | SRS 2T4R Antenna Switching | PUSCH UL MIMO with 4 Ports |
| --- | --- | --- |
| UE Antenna Port Pair 0 | {0, 1} | Select from {0, 1} or {2, 3} |
| UE Antenna Port Pair 1 | {2, 3} |  |

Similar to Table 5, a special case is contemplated for configuring a predefined subset with three UE antenna pairs for SRS antenna switching due to the limited UE capability of the antenna switching, e.g., where not all the transmit chains are switchable. For example, the $1^{st}$ transmit chain is fixed to the UE antenna port 0 but the $2^{nd}$ transmit chain can be switched between UE antenna port 1, 2 and 3. If the eNB configures the SRS antenna switching for 2T4R, the only selected UE antenna pair combinations are based on the reported limitation of the UE antenna switching, such as {0,1}, {0,2}, {0,3} UE antenna pairs. For instance, in the 2T4R example illustrated in Table 6 below, a subset of six possible antenna pair combinations are configured, e.g., {0,1}, {0,2} and {0,3}, wherein 4×2 MIMO codebooks for TM2 may be used (See e.g., FIG. 34). Similar as the case of Table 5, SRS can use antenna switching for 2T4R and PUSCH can also use 2T4R with antenna selection together with UL MIMO, where the UE antenna pairs for SRS and PUSCH are a pre-defined subset based on the UE antenna switching capability. The UL MIMO codebook with rank equal to one or two is defined based on all possible UE antenna pairs.

Instead of signaling selected precoding vector based on 4×2 codebook in FIG. 34, another signaling method for PUSCH with antenna selection and UL MIMO is to use 2-bit RRC signaling to explicitly indicate which antenna pair is selected semi-statically between the six antenna pairs, e.g., {0,1}, {0,2}, {0,3} in Table 6, and then signaling the precoding vector based on 2×2 codebook specified in 3GPP TS36.211. Alternatively, the signaling method for PUSCH with antenna selection and UL MIMO can use the two LTE DCI CRC masks plus newly defined additional DCI CRC mask via PDCCH to implicitly indicate which antenna pair is selected dynamically between the three antenna pairs, e.g., {0,1}, {0,2}, {0,3} in Table 6, and then signaling the precoding vector based on 2×2 codebook specified in 3GPP TS36.211.

TABLE 6

|  | SRS 2T4R Antenna Switching | PUSCH UL MIMO with 4 Ports |
| --- | --- | --- |
| UE Antenna Port Pair 0 | {0, 1} | Select from {0, 1}, {0, 2}, or {0, 3} |
| UE Antenna Port Pair 1 | {0, 2} |  |
| UE Antenna Port Pair 1 | {0, 3} |  |

Alternatively, when the number of antenna ports used for SRS antenna switching is equal to the number of antenna ports used for UL MIMO in PUSCH, a second option is proposed in which all possible UE antenna pairs are used for simultaneously supporting SRS antenna switching and UL MIMO capability in PUSCH. For instance, in the 2T4R example illustrated in Table 7 below, each of the six possible antenna pair combinations are listed, wherein 4×2 MIMO codebooks for TM2 may be used (See e.g., FIG. 35). In such case, SRS can use antenna switching for 2T4R and PUSCH can also use 2T4R with antenna selection together with UL MIMO, where the UE antenna pairs are not pre-defined. The UL MIMO codebook with rank equal to one or two is defined based on all possible UE antenna pairs. Instead of signaling selected precoding vector based on 4×2 codebook in FIG. 35, another signaling method for PUSCH with antenna selection and UL MIMO is to use 3-bit RRC signaling to explicitly indicate which antenna pair is selected semi-statically between the six antenna pairs, e.g., {0,1}, {2,3}, {0,2}, {1,3}, {0,3}, {1,2} in Table 7, and then signaling the precoding vector based on 2×2 codebook specified in 3GPP TS36.211. Alternatively, the signaling method for PUSCH with antenna selection and UL MIMO can use the two LTE DCI CRC masks plus newly defined four DCI CRC masks via PDCCH to implicitly indicate which antenna pair is selected dynamically between the six antenna pairs, e.g., {0,1}, {2,3}, {0,2}, {1,3}, {0,3}, {1,2} in Table 7, and then signaling the precoding vector based on 2×2 codebook specified in 3GPP TS36.211.

TABLE 7

| | SRS 2T4R Antenna Switching | PUSCH UL MIMO with 4 Ports |
|---|---|---|
| UE Antenna Port Pair 0 | {0, 1} | Select from {0, 1}, {2, 3}, |
| UE Antenna Port Pair 1 | {2, 3} | {0, 2}, {1, 3}, {0, 3}, |
| UE Antenna Port Pair 2 | {0, 2} | or {1, 2} |
| UE Antenna Port Pair 3 | {1, 3} | |
| UE Antenna Port Pair 4 | {0, 3} | |
| UE Antenna Port Pair 5 | {1, 2} | |

A special case of Table 7 is to configure a subset of six UE antenna pair for SRS antenna switching. For instance, in the 2T4R example illustrated in Table 8 below, a subset of six possible antenna pair combinations are configured, e.g., {0,1}, {2,3} and {0,2}, wherein 4×2 MIMO codebooks for TM2 may be used (See e.g., FIG. 35). The channel/phase of other antenna pairs, e.g., {1,3}, {0,3} and {1,2}, are calculated based on the measured/estimated channel/phase of {0,1}, {2,3} and {0,2}. Similar as the case of Table 7, SRS can use antenna switching for 2T4R and PUSCH can also use 2T4R with antenna selection together with UL MIMO, where the UE antenna pairs for SRS are a pre-defined subset to save the SRS overhead but there is no limitation on the UE antenna pairs for PUSCH. The UL MIMO codebook with rank equal to one or two is defined based on all possible UE antenna pairs. Instead of signaling a selected precoding vector based on 4×2 codebook in FIG. 35, another signaling method for PUSCH with antenna selection and UL MIMO is to use 3-bit RRC signaling to explicitly indicate which antenna pair is selected semi-statically between the six antenna pairs, e.g., {0,1}, {2,3}, 10,4 {1,3}, {0,3}, {1,2} in Table 7, and then signaling the precoding vector based on 2×2 codebook specified in 3GPP TS36.211. Alternatively, the signaling method for PUSCH with antenna selection and UL MIMO can use the two LTE DCI CRC masks plus newly defined four DCI CRC masks via PDCCH to implicitly indicate which antenna pair is selected dynamically between the six antenna pairs, e.g., {0,1}, {2,3}, {0,2}, {1,3}, {0,3}, {1,2} in Table 7, and then signaling the precoding vector based on 2×2 codebook specified in 3GPP TS36.211.

TABLE 8

| | SRS 2T4R Antenna Switching | PUSCH UL MIMO with 4 Ports |
|---|---|---|
| UE Antenna Port Pair 0 | {0, 1} | Select from {0, 1}, {2, 3}, |
| UE Antenna Port Pair 1 | {2, 3} | {0, 2}, {1, 3}, {0, 3}, |
| UE Antenna Port Pair 1 | {0, 2} | or {1, 2} |

Aspects related to PUSCH closed-loop antenna selection are also disclosed herein. For instance, as a first option, it is contemplated that SRS 1T4R is enabled but PUSCH antenna selection for 1T2R is configured, where the number of UE antenna ports for SRS is different from the number of UE antenna ports used for PUSCH. Namely, it is contemplated that the UE is configured with PUSCH antenna selection in TM1 using 1T2R but SRS antenna switching using 1T4R, wherein the network (e.g., an eNB) can choose the UE's first two transmission antenna ports and apply the two cyclic redundancy check (CRC) masks. It should be noted that this is similar to the aforementioned procedure for PUSCH MIMO, but here only one transmission antenna is allowed at one time.

Alternatively, as a second option, it is contemplated that the number of UE antenna ports for SRS is the same as the number of UE antenna ports used for PUSCH and similar to SRS 1T4R, and PUSCH antenna selection is extended to PUSCH 1T4R, wherein the network (e.g., an eNB) is allowed to choose any of the two antennas. Such selection can be enabled in various ways. For instance, two additional CRC masks may be added on top of two existing LTE DCI CRC masks to select one of the four antennas. Alternatively, downlink control information (DCI) may include an additional bit to select between the two antenna sets, and the CRC may then be used to pick one antenna from the selected antenna set.

In another aspect of the disclosure, it should be noted that the UE may be configured to report its capability to support transmission antenna selection per band of band combination. For the bands in which the UE supports transmission antenna selection, the UE signals to the network whether it supports 1T2R, 1T4R, and/or 2T4R. And for the bands in which the UE supports UL MIMO, the UE may be deemed capable of SRS 2T4R by default. Exceptions to the SRS 2T4R configuration, however, can be made when the UE capability reporting reveals a special case. For instance, when a UE reports limited radio frequency (RF) switching capability in a particular band (e.g., some OEMs may choose not to have all the transmission RF chain switchable), the network (e.g., an eNB) may configure the UE with a 1T4R configuration instead of 2T4R. Similarly, for a UE that reports limited transmission power in a particular band, the network (e.g., an eNB) may configure the UE with a 1T4R configuration instead of 2T4R. Additionally, for bands where the UE does not support UL MIMO or antenna switching, such as vehicle-to-everything (V2X) or licensed assisted access (LAA), it should be noted that no additional signal is needed.

Exemplary Scheduling Entity

Figure 36:
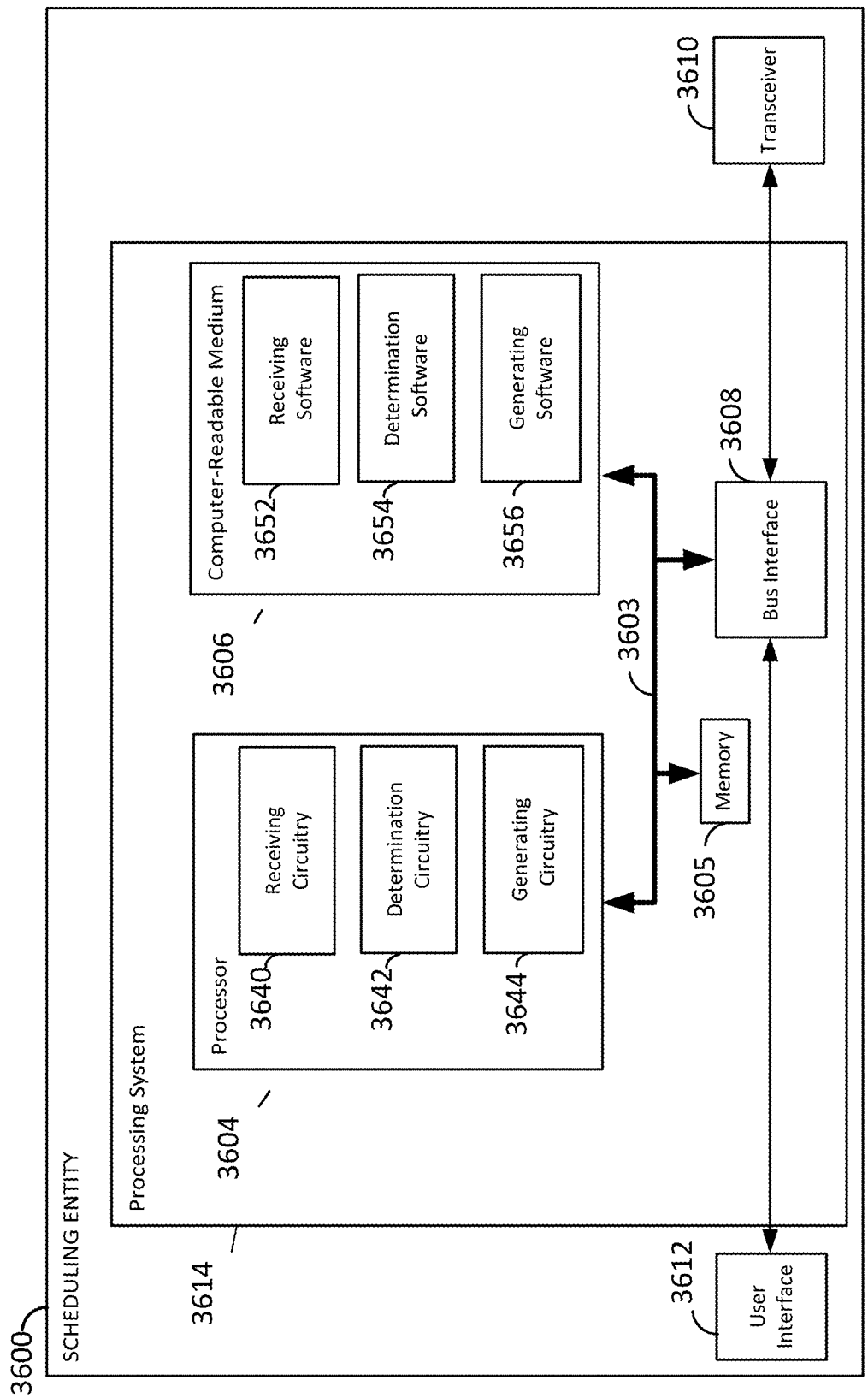
FIG. 36 is a block diagram illustrating an example of a hardware implementation for a scheduling entity employing a processing system in accordance with aspects disclosed herein.

FIG. 36 is a block diagram illustrating an example of a hardware implementation for a scheduling entity 3600 employing a processing system 3614. For example, the scheduling entity 3600 may be a user equipment (UE) as illustrated in any one or more of the FIGs. disclosed herein. In another example, the scheduling entity 3600 may be a base station as also illustrated in any one or more of the FIGs. disclosed herein.

The scheduling entity 3600 may be implemented with a processing system 3614 that includes one or more processors 3604. Examples of processors 3604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 3600 may be configured to perform any one or more of the functions described herein. That is, the processor 3604, as utilized in a scheduling entity 3600, may be used to implement any one or more of the processes and procedures described below and illustrated in FIG. 37.

In this example, the processing system 3614 may be implemented with a bus architecture, represented generally by the bus 3602. The bus 3602 may include any number of interconnecting buses and bridges depending on the specific application of the processing system 3614 and the overall design constraints. The bus 3602 communicatively couples together various circuits including one or more processors (represented generally by the processor 3604), a memory 3605, and computer-readable media (represented generally by the computer-readable medium 3606). The bus 3602 may also link various other circuits such as timing sources, peripherals, voltage regulators, and power management circuits, which are well known in the art, and therefore, will not be described any further. A bus interface 3608 provides an interface between the bus 3602 and a transceiver 3610. The transceiver 3610 provides a communication interface or means for communicating with various other apparatus over a transmission medium. Depending upon the nature of the apparatus, a user interface 3612 (e.g., keypad, display, speaker, microphone, joystick) may also be provided.

In some aspects of the disclosure, the processor 3604 may include a receiving circuitry 3640 configured for various functions, including, for example, to receive a transmission capability reporting from a scheduled entity (e.g., scheduled entity 3800), wherein the scheduled entity comprises at least four antennas. As illustrated, the processor 3604 may also include a determination circuitry 3642 configured for various functions. For instance, the determination circuitry 3642 may be configured to perform a determination based on the transmission capability reporting of whether the scheduled entity (e.g., scheduled entity 3800) may simultaneously support sounding reference signal (SRS) antenna switching and an uplink (UL) multiple-input multiple-output (MIMO) communication. The processor 3604 may further include generating circuitry 3644 configured for various functions, including, for example, to generate an SRS configuration for the scheduled entity (e.g., scheduled entity 3800) based on the determination, wherein a default SRS configuration comprises configuring at least one of the at least four antennas to simultaneously support the SRS antenna switching and the UL MIMO communication. To this end, it should be appreciated that, the combination of the receiving circuitry 3640, the determination circuitry 3642, and the generating circuitry 3644 may be configured to implement one or more of the functions described herein.

Various other aspects for scheduling entity 3600 are also contemplated. For instance, it is contemplated that the generating circuitry 3644 may be configured to generate an SRS 1T4R configuration for a scheduled entity (e.g., scheduled entity 3800) with four antennas and configured to operate in a 1T4R mode, wherein the SRS 1T4R configuration configures one of the four antennas to simultaneously support the SRS antenna switching and the UL MIMO communication. For instance, the generating circuitry 3644 may be configured to generate an SRS 1T4R configuration to simultaneously support 1T4R SRS antenna switching and 1T2R antenna selection of the UL MIMO communication.

It is also contemplated that the generating circuitry 3644 may be configured to generate an SRS 2T4R configuration for a scheduled entity (e.g., scheduled entity 3800) with four antennas and configured to operate in a 2T4R mode, wherein the SRS 2T4R configuration configures two of the four antennas to simultaneously support the SRS antenna switching and the UL MIMO communication. Such SRS configuration for 2T4R may, for example, comprise having an unequal number of antennas configured to support the SRS antenna switching in a first UL channel and the UL MIMO communication in a second UL channel (e.g., having the four antennas configured to support the SRS antenna switching, and a pair of the four antennas configured to simultaneously support the SRS antenna switching in a first UL channel and the UL MIMO communication in a second UL channel).

In another aspect of the disclosure, it is contemplated that the generating circuitry 3644 may be configured to generate an SRS configuration to include having an equal number of antennas configured to support the SRS antenna switching in a first UL channel and the UL MIMO communication in a second UL channel. For instance, the generating circuitry 3644 may be configured to generate an SRS configuration to include having the scheduled entity (e.g., scheduled entity 3800) utilize a predetermined subset of all antenna pair combinations associated with the four antennas to simultaneously support the SRS antenna switching in a first UL channel and the UL MIMO communication in a second UL channel. Alternatively, the generating circuitry 3644 may be configured to generate an SRS configuration to include having the scheduled entity (e.g., scheduled entity 3800) utilize all antenna pair combinations associated with the four antennas to simultaneously support the SRS antenna switching in a first UL channel and the UL MIMO communication in a second UL channel. The generating circuitry 3644 may also be configured to generate an SRS configuration to include having the scheduled entity utilize a subset of antenna pair combinations associated with the four antennas to support the SRS antenna switching in a first UL channel. For instance, in an exemplary implementation, the generating circuitry 3644 may be configured to predefine antenna pairs {0,1} and {2,3} of the four antennas to support the SRS antenna switching in 2T4R. In another exemplary implementation, the generating circuitry 3644 may be configured to predefine antenna pairs {0,1}, {0,2}, and {0,3} of the four antennas to support the SRS antenna switching in 2T4R.

In a further aspect of the disclosure, it is contemplated that the generating circuitry 3644 may be configured to generate an SRS configuration to include an SRS pattern that is shifted based on a parameter associated with the scheduled entity. For instance, for SRS 1T4R configurations, the SRS pattern may be shifted based on the total number of antennas included in the scheduled entity (e.g., scheduled entity 3800), whereas the SRS pattern may be shifted based on the total number of configured antenna pairs included in the scheduled entity (e.g., scheduled entity 3800) for 2T4R configurations.

Generating circuitry 3644 may also be configured to generate an SRS configuration to include an SRS pattern that is shifted based on whether the scheduled entity (e.g., scheduled entity 3800) is enabled for frequency hopping. For instance, when frequency hopping is not enabled, the SRS pattern for 1T4R SRS antenna switching may be defined as $a(n_{SRS})=n_{SRS}$ mod 4, whereas the SRS pattern for 2T4R SRS antenna switching may be defined as $a(n_{SRS})=n_{SRS}$ mod $\Lambda$ with $\Lambda_p=2$ or 3. When frequency hopping is enabled, however, the SRS pattern for 1T4R SRS antenna switching may be defined as:

$$a(n_{SRS}) = \begin{cases} \left(n_{SRS} + \left\lfloor \frac{n_{SRS}}{\max(4,K)} \right\rfloor + \beta\left(\left\lfloor \frac{n_{SRS}}{4} \right\rfloor \mod \left\lfloor \frac{\max(4,K)}{4} \right\rfloor\right)\right) \mod 4, & \text{when } K \text{ is even} \\ n_{SRS} \mod 4, & \text{otherwise} \end{cases}$$

with $\beta = \begin{cases} 1, & \text{if } N_1 = 2, N_2 = 2 \\ 0, & \text{otherwise} \end{cases}$ whereas the SRS pattern for 2T4R SRS antenna switching may be defined as:

$$a(n_{SRS}) = \begin{cases} \left(n_{SRS} + \left\lfloor \frac{n_{SRS}}{\Lambda} \right\rfloor + \beta\left(\left\lfloor \frac{n_{SRS}}{K} \right\rfloor\right)\right) \mod \Lambda, & \text{when } K \text{ is odd} \\ n_{SRS} \mod \Lambda, & \text{otherwise} \end{cases}$$

with $\Lambda = 2$ or 3

Referring back to the remaining components of scheduling entity 3600, it should be appreciated that the processor 3604 is responsible for managing the bus 3602 and general processing, including the execution of software stored on the computer-readable medium 3606. The software, when executed by the processor 3604, causes the processing system 3614 to perform the various functions described below for any particular apparatus. The computer-readable medium 3606 and the memory 3605 may also be used for storing data that is manipulated by the processor 3604 when executing software.

One or more processors 3604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 3606. The computer-readable medium 3606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 3606 may reside in the processing system 3614, external to the processing system 3614, or distributed across multiple entities including the processing system 3614. The computer-readable medium 3606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 3606 may include receiving software 3652 configured for various functions, including, for example, to receive a transmission capability reporting from a scheduled entity (e.g., scheduled entity 3800), wherein the scheduled entity comprises at least four antennas. As illustrated, the computer-readable storage medium 3606 may also include determination software 3654 configured for various functions. For instance, the determination software 3654 may be configured to perform a determination based on the transmission capability reporting of whether the scheduled entity (e.g., scheduled entity 3800) may simultaneously support SRS antenna switching and an UL MIMO communication. The computer-readable storage medium 3606 may further include generating software 3656 configured for various functions, including, for example, to generate an SRS configuration for the scheduled entity (e.g., scheduled entity 3800) based on the determination, wherein a default SRS configuration comprises configuring at least one of the at least four antennas to simultaneously support the SRS antenna switching and the UL MIMO communication.

In a particular configuration, it is also contemplated that the scheduling entity 3600 includes means for receiving a transmission capability reporting, means for performing a determination of whether a scheduled entity (e.g., scheduled entity 3800) may simultaneously support SRS antenna switching and an UL MIMO communication, and means for generating an SRS configuration. In one aspect, the aforementioned means may be the processor(s) 3604 configured to perform the functions recited by the aforementioned means. In another aspect, the aforementioned means may be a circuit or any apparatus configured to perform the functions recited by the aforementioned means.

Figure 37:
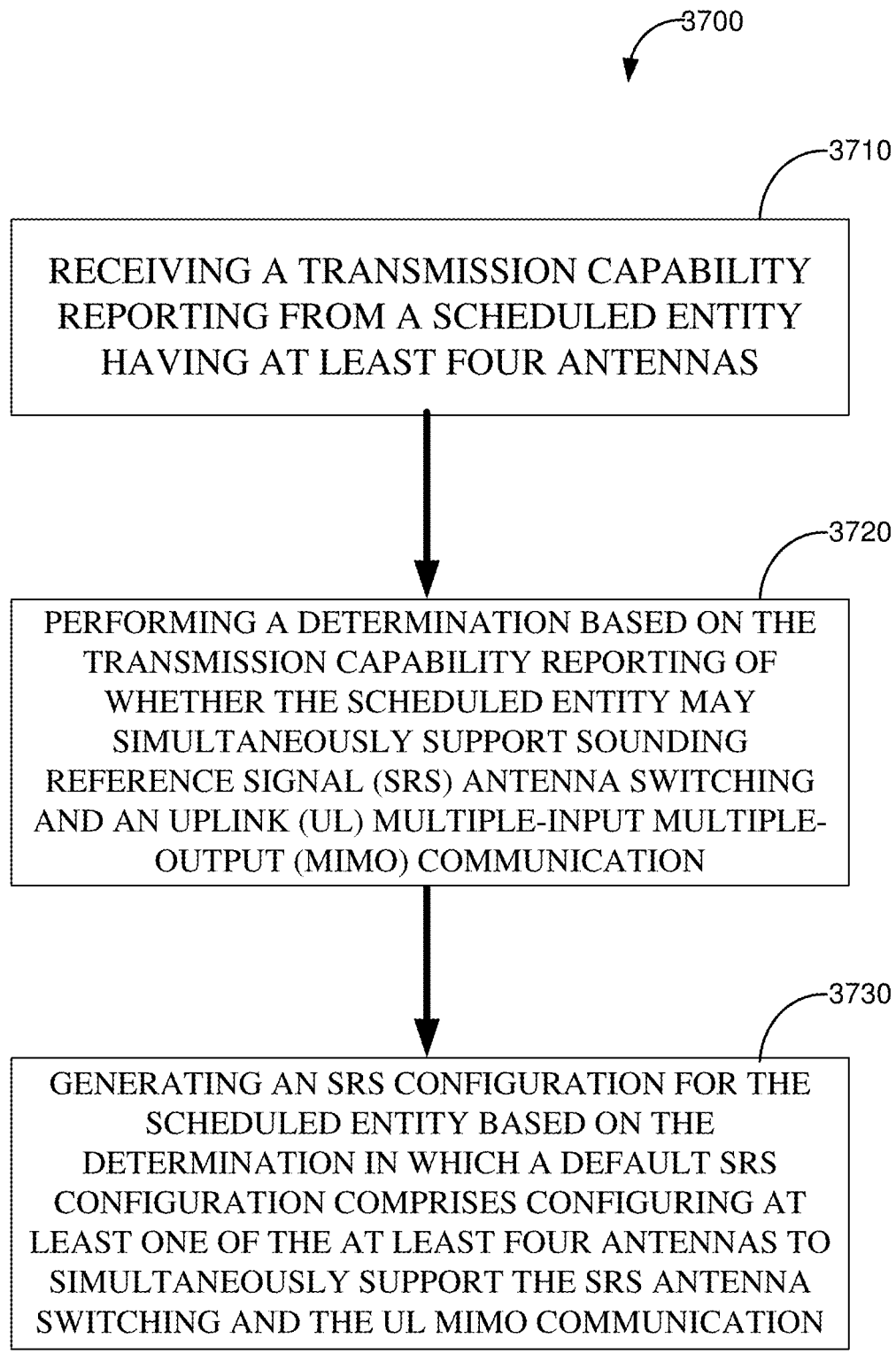
FIG. 37 is a flow chart illustrating an exemplary scheduling entity process that facilitates some aspects of the disclosure.

Of course, in the above examples, the circuitry included in the processor 3604 is merely provided as an example, and other means for carrying out the described functions may be included within various aspects of the present disclosure, including but not limited to the instructions stored in the computer-readable storage medium 3606, or any other suitable apparatus or means described herein and utilizing, for example, the processes and/or algorithms described in relation to FIG. 37.

In FIG. 37, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for implementation of all embodiments. In some examples, the process 3700 may be carried out by the scheduling entity 3600 illustrated in FIG. 36. In some examples, the process 3700 may be carried out by any suitable apparatus or means for carrying out the functions or algorithm described below.

Process 3700 begins at block 3710 with the scheduling entity 3600 receiving a transmission capability reporting from a scheduled entity (e.g., scheduled entity 3800) having at least four antennas. Process 3700 then proceeds to block 3720 where the scheduling entity 3600 performs a determination based on the transmission capability reporting of whether the scheduled entity (e.g., scheduled entity 3800) may simultaneously support SRS antenna switching and an UL MIMO communication. Process 3700 then concludes at block 3730 where the scheduling entity 3600 generates an SRS configuration for the scheduled entity (e.g., scheduled entity 3800) based on the determination in which a default SRS configuration comprises configuring at least one of the at least four antennas to simultaneously support the SRS antenna switching and the UL MIMO communication.

Exemplary Scheduled Entity

Figure 38:
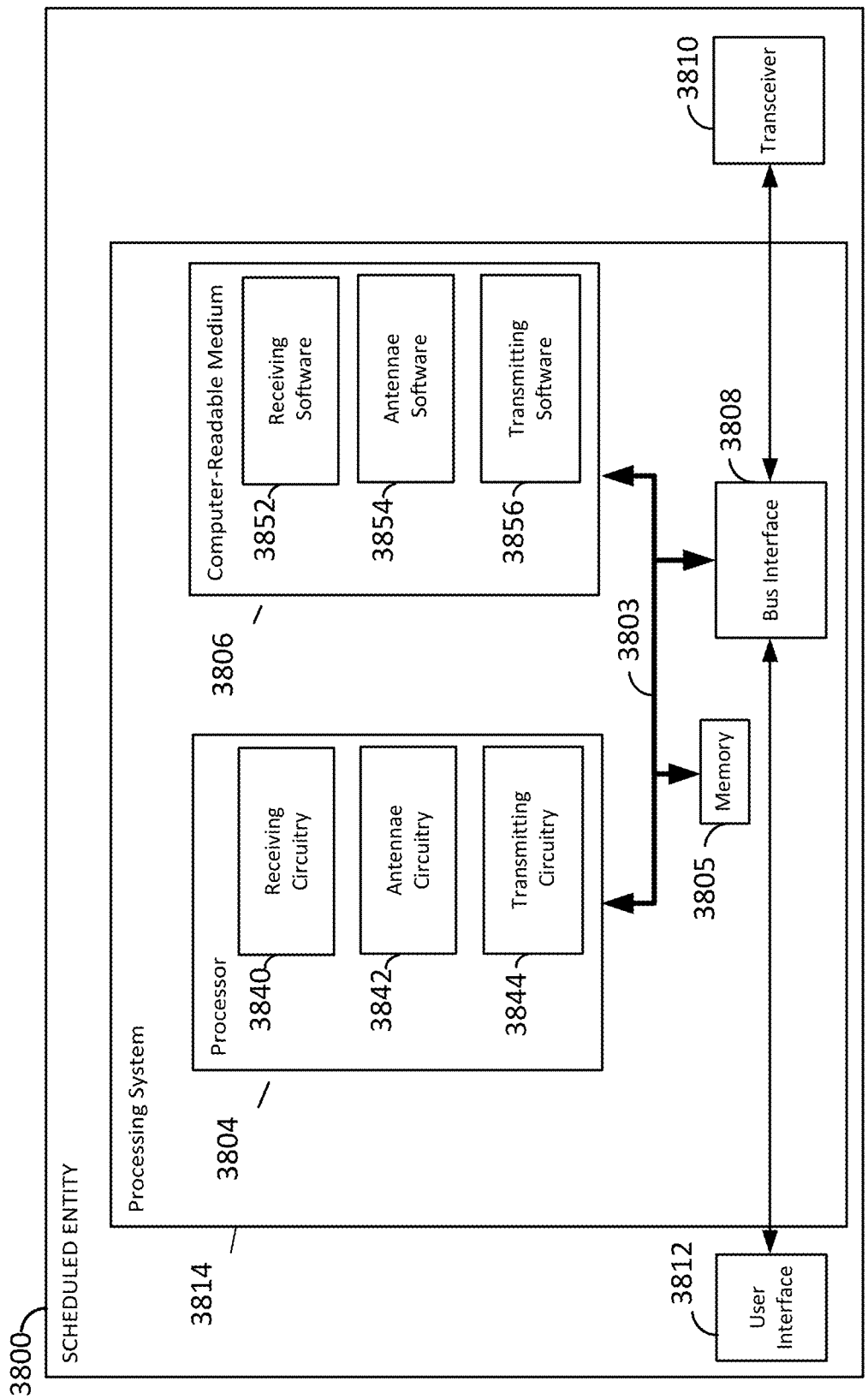
FIG. 38 is a block diagram illustrating an example of a hardware implementation for a scheduled entity employing a processing system in accordance with aspects disclosed herein.

FIG. 38 is a conceptual diagram illustrating an example of a hardware implementation for an exemplary scheduled entity 3800 employing a processing system 3814. In accordance with various aspects of the disclosure, an element, or any portion of an element, or any combination of elements may be implemented with a processing system 3814 that includes one or more processors 3804. For example, the scheduled entity 3800 may be a user equipment (UE) as illustrated in any one or more of the FIGs. disclosed herein.

The processing system 3814 may be substantially the same as the processing system 3614 illustrated in FIG. 36, including a bus interface 3808, a bus 3802, memory 3805, a processor 3804, and a computer-readable medium 3806. Furthermore, the scheduled entity 3800 may include a user interface 3812 and a transceiver 3810 substantially similar to those described above in FIG. 36. That is, the processor 3804, as utilized in a scheduled entity 3800, may be used to implement any one or more of the processes described below and illustrated in the various figures.

In some aspects of the disclosure, the processor 3804 may include a receiving circuitry 3840 configured for various functions, including, for example, to receive a sounding reference signal (SRS) configuration from a network (e.g., scheduling entity 3600). As illustrated, the processor 3804 may also include antennae circuitry 3842 configured for various functions. For instance, antennae circuitry 3842 may be configured to configure at least four antennas of the scheduled entity 3800 based on the SRS configuration, wherein the SRS configuration configures at least one of the at least four antennas to simultaneously support SRS antenna switching and an uplink (UL) multiple-input multiple-output (MIMO) communication. The processor 3804 may further include transmitting circuitry 3844 configured for various functions, including, for example, to transmit an SRS communication according to the SRS configuration. To this end, it should be appreciated that, the combination of the receiving circuitry 3840, the antennae circuitry 3842, and the transmitting circuitry 3844 may be configured to implement one or more of the functions described herein.

Various other aspects for scheduled entity 3800 are also contemplated. For instance, it is contemplated that the transmitting circuitry 3844 may be configured to report to the network a UE capability of transmitting an SRS communication. Such UE capability may, for example, encompass the capabilities of the at least four antennas, which includes the capability of the scheduled entity 3800 to support SRS antenna switching via one of the at least four antennas or one pair of two or three pairs of the at least four antennas.

It is also contemplated that the scheduled entity 3800 may comprise four antennas configured to operate in a 1T4R mode, wherein the antennae circuitry 3842 is configured to configure the scheduled entity 3800 according to an SRS 1T4R configuration in which one of the four antennas is configured to simultaneously support the SRS antenna switching and the UL MIMO communication. For instance, the antennae circuitry 3842 may be configured to configure the scheduled entity 3800 to simultaneously support 1T4R SRS antenna switching and 1T2R antenna selection of the UL MIMO communication.

It is also contemplated that the scheduled entity 3800 may comprise four antennas configured to operate in a 2T4R mode, wherein the antennae circuitry 3842 is configured to configure the scheduled entity 3800 according to an SRS 2T4R configuration in which two of the four antennas are configured to simultaneously support the SRS antenna switching and the UL MIMO communication. Such SRS configuration for 2T4R may, for example, comprise having an unequal number of antennas configured to support the SRS antenna switching in a first UL channel and the UL MIMO communication in a second UL channel (e.g., having the four antennas configured to support the SRS antenna switching, and a pair of the four antennas configured to simultaneously support the SRS antenna switching in a first UL channel and the UL MIMO communication in a second UL channel).

In another aspect of the disclosure, it is contemplated that the antennae circuitry 3842 may configure the scheduled entity 3800 to have an equal number of antennas configured to support the SRS antenna switching in a first UL channel and the UL MIMO communication in a second UL channel. For instance, the antennae circuitry 3842 may configure the scheduled entity 3800 to utilize a predetermined subset of all antenna pair combinations associated with the four antennas to simultaneously support the SRS antenna switching in a first UL channel and the UL MIMO communication in a second UL channel. Alternatively, the antennae circuitry 3842 may configure the scheduled entity 3800 to utilize all antenna pair combinations associated with the four antennas to simultaneously support the SRS antenna switching in a first UL channel and the UL MIMO communication in a second UL channel. The antennae circuitry 3842 may also configure the scheduled entity 3800 to utilize a subset of antenna pair combinations associated with the four antennas to support the SRS antenna switching in a first UL channel. For instance, in an exemplary implementation, the antennae circuitry 3842 may be configured to predefine antenna pairs {0,1} and {2,3} of the four antennas to support the SRS antenna switching in 2T4R. In another exemplary implementation, the antennae circuitry 3842 may be configured to predefine antenna pairs {0,1}, {0,2}, and {0,3} of the four antennas to support the SRS antenna switching in 2T4R In a further aspect of the disclosure, it is contemplated that the antennae circuitry 3842 may configure the at least four antennas to implement an SRS pattern that is shifted based on a parameter associated with the scheduled entity 3800. For instance, for SRS 1T4R configurations, the SRS pattern may be shifted based on the total number of antennas included in the scheduled entity 3800, whereas the SRS pattern may be shifted based on the total number of configured antenna pairs included in the scheduled entity 3800 for 2T4R configurations.

Antennae circuitry 3842 may also be configured to implement an SRS pattern that is shifted based on whether the scheduled entity 3800 is enabled for frequency hopping. For instance, when frequency hopping is not enabled, the SRS pattern for 1T4R SRS antenna switching may be defined as $a(n_{SRS})=n_{SRS}$ mod 4, whereas the SRS pattern for 2T4R SRS antenna switching may be defined as $a(n_{SRS})=n_{SRS}$ mod A with $\Lambda_p=2$ or 3. When frequency hopping is enabled, however, the SRS pattern for 1T4R SRS antenna switching may be defined as:

$$a(n_{SRS}) = \begin{cases} \left(n_{SRS} + \left\lfloor \frac{n_{SRS}}{\max(4, K)} \right\rfloor + \beta\left(\left\lfloor \frac{n_{SRS}}{4} \right\rfloor \mod \left\lfloor \frac{\max(4, K)}{4} \right\rfloor\right)\right) \mod 4, & \text{when } K \text{ is even} \\ n_{SRS} \mod 4, & \text{otherwise} \end{cases}$$

with $\beta = \begin{cases} 1, & \text{if } N_1 = 2, N_2 = 2 \\ 0, & \text{otherwise} \end{cases}$ whereas the SRS pattern for 2T4R SRS antenna switching may be defined as:

$$a(n_{SRS}) = \begin{cases} \left(n_{SRS} + \left\lfloor \frac{n_{SRS}}{\Lambda} \right\rfloor + \beta\left(\left\lfloor \frac{n_{SRS}}{K} \right\rfloor\right)\right) \mod \Lambda, & \text{when } K \text{ is odd} \\ n_{SRS} \mod \Lambda, & \text{otherwise} \end{cases}$$

with $\Lambda = 2$ or 3

Similar to processor 3604, processor 3804 is responsible for managing the bus 3802 and general processing, including the execution of software stored on the computer-readable medium 3806. The software, when executed by the processor 3804, causes the processing system 3814 to perform the various functions described below for any particular apparatus. The computer-readable medium 3806 and the memory 3805 may also be used for storing data that is manipulated by the processor 3804 when executing software.

One or more processors 3804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 3806. Similar to computer-readable medium 3606, computer-readable medium 3806 may be a non-transitory computer-readable medium comprising characteristics that are substantially similar. The computer-readable medium 3806 may reside in the processing system 3814, external to the processing system 3814, or distributed across multiple entities including the processing system 3814. It should also be appreciated that, similar to computer-readable medium 3606, computer-readable medium 3806 may be embodied in a computer program product comprising characteristics that are substantially similar.

In one or more examples, the computer-readable storage medium 3806 may include receiving software 3852 configured for various functions, including, for example, to receive an SRS configuration from a network (e.g., scheduling entity 3600). As illustrated, the computer-readable medium 3806 may also include antennae software 3854 configured for various functions. For instance, antennae software 3854 may be configured to configure at least four antennas of the scheduled entity 3800 based on the SRS configuration, wherein the SRS configuration configures at least one of the at least four antennas to simultaneously support SRS antenna switching and an UL MIMO communication. The computer-readable medium 3806 may further include transmitting software 3856 configured for various functions, including, for example, to transmit an SRS communication according to the SRS configuration. To this end, it should be appreciated that, the combination of the receiving software 3852, the antennae software 3854, and the transmitting software 3856 may be configured to implement one or more of the functions described herein.

In a particular configuration, it is also contemplated that the scheduled entity 3800 includes means for receiving an SRS configuration, means for configuring at least four antennas of a scheduled entity 3800 based on the SRS configuration, and means for transmitting an SRS communication according to the SRS configuration. In one aspect, the aforementioned means may be the processor(s) 3804 configured to perform the functions recited by the aforementioned means. In another aspect, the aforementioned means may be a circuit or any apparatus configured to perform the functions recited by the aforementioned means.

Figure 39:
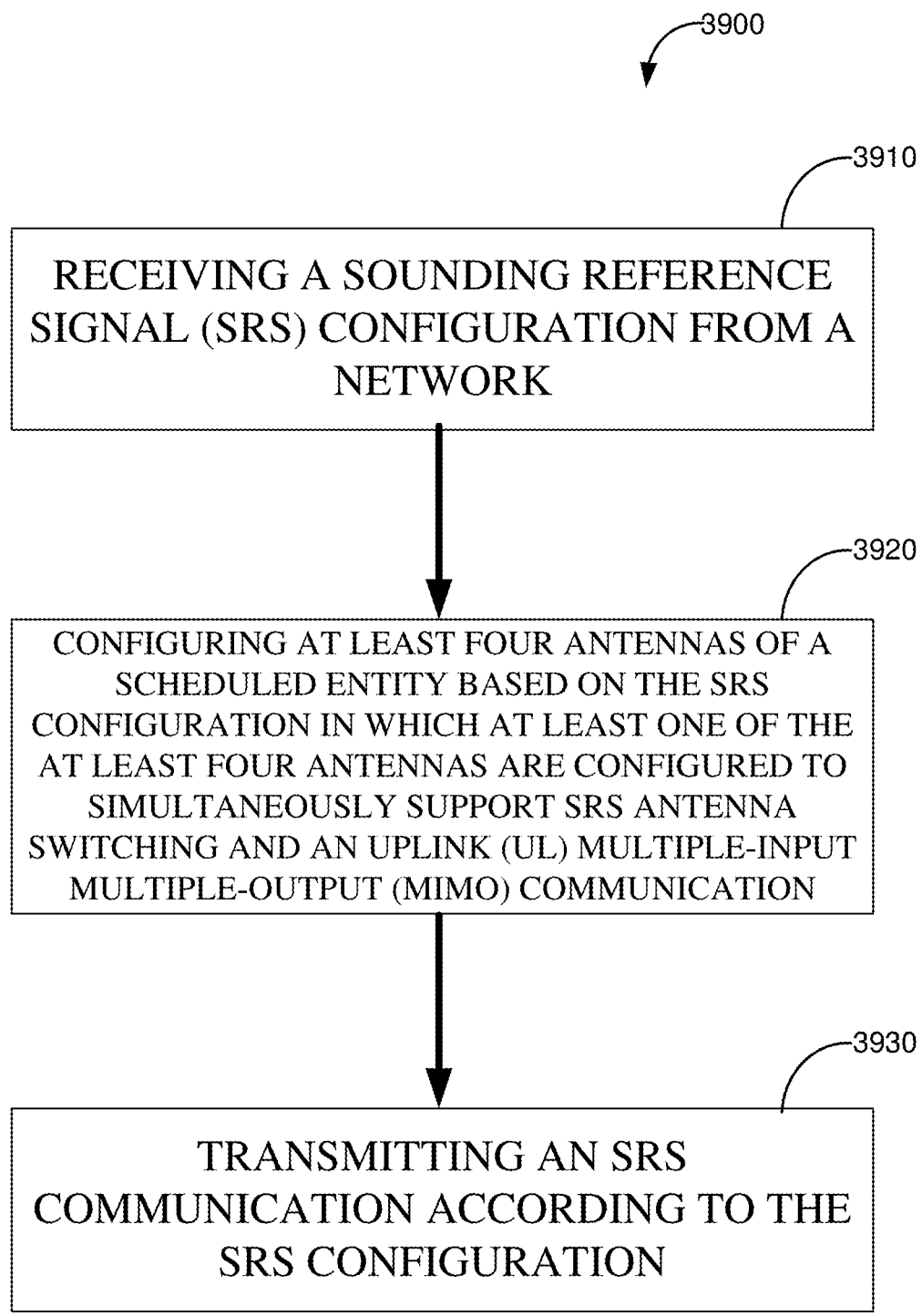
FIG. 39 is a flow chart illustrating an exemplary scheduled entity process that facilitates some aspects of the disclosure.

Of course, in the above examples, the circuitry included in the processor 3804 is merely provided as an example, and other means for carrying out the described functions may be included within various aspects of the present disclosure, including but not limited to the instructions stored in the computer-readable storage medium 3806, or any other suitable apparatus or means described herein, and utilizing, for example, the processes and/or algorithms described in relation to FIG. 39.

In FIG. 39, a flow chart is provided, which illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 3900 may be carried out by the scheduled entity 3800 illustrated in FIG. 38. In some examples, the process 3900 may be carried out by any suitable apparatus or means for carrying out the functions or algorithm described below.

Process 3900 begins at block 3910 with the scheduled entity 3800 receiving an SRS configuration from a network (e.g., scheduling entity 3600). Once the SRS configuration is received at block 3910, process 3900 proceeds to block 3920 where at least four antennas of the scheduled entity 3800 are configured based on the SRS configuration in which at least one of the at least four antennas are configured to simultaneously support SRS antenna switching and an UL MIMO communication. Process 3900 then concludes at block 3930 where the scheduled entity 3800 transmits an SRS communication according to the SRS configuration.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-39 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-39 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   receiving a sounding reference signal (SRS) configuration from a network;
   configuring at least four antennas of a scheduled entity based on the SRS configuration, wherein the SRS configuration configures at least one of the at least four antennas to simultaneously support SRS antenna switching and an uplink (UL) multiple-input multiple-output (MIMO) communication, and wherein the SRS configuration configures the scheduled entity to simultaneously support 1T4R SRS antenna switching and 1T2R antenna selection of the UL MIMO communication;
   performing the SRS antenna switching simultaneously with the UL MIMO communication on the at least one of the at least four antennas; and
   transmitting an SRS communication according to the SRS configuration.

2. The method of claim 1, further comprising reporting to the network a user equipment (UE) capability of transmitting the SRS communication.

3. The method of claim 1, wherein the scheduled entity comprises four antennas configured to operate in a 2T4R mode, and wherein the configuring comprises configuring the scheduled entity according to an SRS 2T4R configuration in which two of the four antennas are configured to simultaneously support the SRS antenna switching and the UL MIMO communication.

4. The method of claim 1, wherein the configuring comprises having an unequal number of antennas configured to support the SRS antenna switching in a first UL channel and the UL MIMO communication in a second UL channel.

5. The method of claim 4, wherein the configuring comprises having the four antennas configured to support the SRS antenna switching, and a pair of the four antennas configured, based on the SRS configuration to simultaneously support the SRS antenna switching in a first UL channel and the UL MIMO communication in a second UL channel.

6. The method of claim 1, wherein the configuring comprises having an equal number of antennas configured to support the SRS antenna switching in a first UL channel and the UL MIMO communication in a second UL channel.

7. The method of claim 6, wherein the configuring comprises having the scheduled entity utilize a predetermined subset of all antenna pair combinations associated with the four antennas to simultaneously support the SRS antenna switching in a first UL channel and the UL MIMO communication in a second UL channel.

8. The method of claim 6, wherein the configuring comprises having the scheduled entity utilize any of a plurality of predetermined subsets of all antenna pair combinations associated with the four antennas to simultaneously support the SRS antenna switching in a first UL channel and the UL MIMO communication in a second UL channel.

9. The method of claim 6, wherein the configuring comprises having the scheduled entity utilize a subset of antenna pair combinations associated with the four antennas to support the SRS antenna switching in a first UL channel.

10. The method of claim 9, further comprising predefining antenna pairs {0,1} and {2,3} of the four antennas to support the SRS antenna switching in 2T4R.

11. The method of claim 9, further comprising predefining antenna pairs {0,1}, {0,2}, and {0,3} of the four antennas to support the SRS antenna switching in 2T4R.

12. The method of claim 1, wherein the configuring comprises configuring the scheduled entity to implement an SRS pattern that is shifted based on a parameter associated with the scheduled entity.

13. The method of claim 12, wherein the SRS pattern is an SRS pattern for 2T4R SRS antenna switching, wherein the SRS pattern for 2T4R SRS antenna switching is based on a number of configured antenna pairs.

14. The method of claim 1, and further comprising:
generating a transmission capability report indicative that the scheduled entity wireless communication device is capable of simultaneously supporting the SRS antenna switching and the UL MIMO communication; and
transmitting the transmission capability report to the network, and wherein the SRS configuration is received in response to the transmission capability report.

15. A scheduled entity wireless communication device comprising:
a plurality of antennas;
a transceiver coupled to at least four antennas of the plurality of antennas;
at least one memory; and
at least one processor coupled to the transceiver and the at least one memory and configured to:
receive a sounding reference signal (SRS) configuration from a network via the transceiver;
configure the at least four antennas based on the SRS configuration, wherein the SRS configuration configures at least one of the at least four antennas to simultaneously support SRS antenna switching and an uplink (UL) multiple-input multiple-output (MIMO) communication, and wherein the SRS configuration configures simultaneous support of 1T4R SRS antenna switching and 1T2R antenna selection of the UL MIMO communication;
perform the SRS antenna switching simultaneously with the UL MIMO communication on the at least one of the at least four antennas; and
initiate transmission of an SRS communication based on the SRS configuration via the transceiver.

16. The scheduled entity wireless communication device of claim 15, wherein the at least four antennas are configured to implement an SRS pattern that is shifted based on a parameter associated with the scheduled entity wireless communication device.

17. The scheduled entity wireless communication device of claim 16, wherein the parameter is based on a total number of the plurality of antennas.

18. The scheduled entity wireless communication device of claim 16, wherein the parameter is based on a total number of antenna pairs in the plurality of antennas.

19. The scheduled entity wireless communication device of claim 16, wherein the parameter corresponds to whether the scheduled entity wireless communication device is enabled for frequency hopping.

20. The scheduled entity wireless communication device of claim 15, wherein the processor is further configured to:
generate a transmission capability report indicative that the scheduled entity wireless communication device is capable of simultaneously supporting the SRS antenna switching and the UL MIMO communication; and
initiate transmission of the transmission capability report to the network via the transceiver, and wherein the SRS configuration is based, at least in part, on the transmission capability report.

\* \* \* \* \*